US009294743B2

(12) United States Patent
Moriguchi et al.

(10) Patent No.: US 9,294,743 B2
(45) Date of Patent: Mar. 22, 2016

(54) PIXEL INTERPOLATION APPARATUS, IMAGE CAPTURE APPARATUS, STORAGE MEDIUM, AND INTEGRATED CIRCUIT

(71) Applicant: MegaChips Corporation, Osaka-shi (JP)

(72) Inventors: Junji Moriguchi, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/556,535

(22) Filed: Dec. 1, 2014

(65) Prior Publication Data

US 2015/0156468 A1 Jun. 4, 2015

(30) Foreign Application Priority Data

Dec. 2, 2013 (JP) .................................. 2013-249480

(51) Int. Cl.
*H04N 9/04* (2006.01)
*H04N 9/67* (2006.01)
(Continued)

(52) U.S. Cl.
CPC ................. *H04N 9/045* (2013.01); *H04N 9/67* (2013.01); *H04N 9/68* (2013.01)

(58) Field of Classification Search
CPC ........... H04N 9/045; H04N 9/67; H04N 9/68; G06T 3/4007; G06T 2207/10024; G06K 9/64; G06K 9/66
USPC .............. 348/222.1, 273–283, 276, 277, 280, 348/254, 671, 362, 221.1; 382/162, 167, 382/169, 274, 278, 300
See application file for complete search history.

(56) References Cited

U.S. PATENT DOCUMENTS 6,853,748 B2 * 2/2005 Endo ..................... G06T 3/4015
348/273
7,551,214 B2 6/2009 Hasegawa
(Continued)

FOREIGN PATENT DOCUMENTS

JP 2006-186965 7/2006
JP 2009-130764 6/2009

OTHER PUBLICATIONS

U.S. Appl. No. 14/427,835, filed Mar. 12, 2015, Hasegawa.
(Continued)

*Primary Examiner* — Tuan Ho
*Assistant Examiner* — Marly Camargo
(74) *Attorney, Agent, or Firm* — Oblon, McClelland, Maier & Neustadt, L.L.P.

(57) ABSTRACT

An image capture apparatus 1000 includes an image capture unit C1, a signal processor unit C2, and a pixel interpolation unit 100. In the image capture apparatus 1000, with respect to an image signal captured by the image capture unit C1 which includes a single image sensor having three-color filters in arbitrary colors, a plurality of pairs of correlation degrees of two directions which are perpendicular to each other are obtained using image data of pixels provided around an observed pixel, and a pixel interpolation process is carried out using the correlation degrees as a reference for determination. Then, in the image capture apparatus 1000, even if a color component pixel in the same color as a color component pixel on which the pixel interpolation process is to be carried out is not provided in a direction where there is strong correlation, a rate of change in a direction perpendicular to the direction where there is strong correlation is obtained using a pixel value which is obtained though color space conversion in the direction perpendicular to the direction where there is strong correlation. Thus, a pixel interpolation process is carried out based on the obtained rate of change.

13 Claims, 30 Drawing Sheets

(51) Int. Cl.
*H04N 9/68* (2006.01)
*G06T 3/40* (2006.01)

(56) References Cited

U.S. PATENT DOCUMENTS

| | | | | |
|---|---|---|---|---|
| 7,982,787 B2 * | 7/2011 | Nonaka | ................ | H04N 5/335 348/272 |
| 8,018,501 B2 * | 9/2011 | Sasaki | .................... | H04N 9/045 348/223.1 |
| 2004/0218075 A1 * | 11/2004 | Tsuruoka | ............... | H04N 9/646 348/272 |
| 2006/0114526 A1 | 6/2006 | Hasegawa | | |
| 2009/0136153 A1 | 5/2009 | Hasegawa | | |

OTHER PUBLICATIONS

U.S. Appl. No. 14/429,909, filed Mar. 20, 2015, Hasegawa.

* cited by examiner

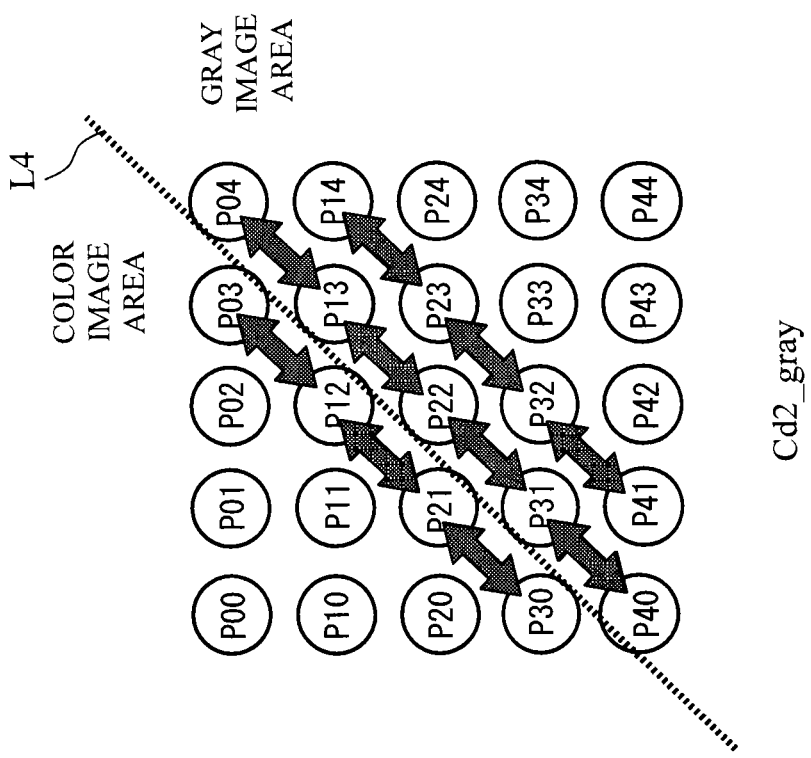

PIXEL INTERPOLATION APPARATUS, IMAGE CAPTURE APPARATUS, STORAGE MEDIUM, AND INTEGRATED CIRCUIT

BACKGROUND OF THE INVENTION

1. Field of the Invention

The present invention relates to signal processing carried out in an image capture apparatus such as a digital camera. Particularly, the present invention relates to techniques of pixel interpolation.

2. Description of the Background Art

In an image sensor such as a CCD image sensor and a CMOS image sensor which are used in an image capture apparatus such as a digital camera, light received via a color filter is converted into an electrical signal through photoelectric conversion, to be output as a pixel signal. As an example of such a color filter, an RGB-type color filter and a YMCK-type color filter can be cited. Then, a single image sensor outputs a pixel signal of a single color for a single pixel. For example, in a case where an RGB-type color filter is employed, a pixel signal of any color component out of red (R), green (G), and blue (B) color components, is output for one pixel.

Hence, for a pixel signal output from a single color image sensor, there is a need to obtain pixel signals of the other color components by an interpolation process. An interpolation process uses various algorithms. For example, according to one possible method, a degree of correlation in a horizontal direction and a degree of correlation in a vertical direction are calculated, and an interpolation process is carried out using pixels arranged in the horizontal direction or the vertical direction, in whichever there is stronger correlation. Also, according to another possible method, weighting is conducted in accordance with a distance between an observed pixel and its peripheral pixel, and then, an interpolation process is carried out.

According to techniques disclosed in Japanese Patent Application Publication No. 2006-186965, in an image captured by an image sensor with Bayer array (RGB-color filters), a gray area and a color area are distinguished from each other, and a kind of a pixel interpolation process which is suitable for the characteristics of each of the areas in the image is applied. Particularly, according to the techniques of Japanese Patent Application Publication No. 2006-186965, it is designed so as to suppress occurrence of a false color in an area of a border between a gray area and a color area. More specifically, according to the techniques of Japanese Patent Application Publication No. 2006-186965, for the area of the border between a gray area and a color area, a process of determining a correlation direction is carried out using a method of determining which is suitable for a gray image. On the other hand, a pixel interpolation process is carried out using a method of pixel interpolation which is suitable for a color image. This can suppress occurrence of a false color which is likely to occur by a pixel interpolation process, in the techniques of Japanese Patent Application Publication No. 2006-186965.

As described above, the techniques of Japanese Patent Application Publication No. 2006-186965 is predicated on the use of an image sensor with Bayer array (RGB-color filters). Thus, there is no description about specific techniques for carrying out a suitable pixel interpolation process on a pixel signal output from an image sensor with three-color filters in arbitrary colors which are different from R, G, and B.

Then, in view of the foregoing problems, it is an object of the present invention to implement a pixel interpolation apparatus, an image capture apparatus, a program, and an integrated circuit which can appropriately carry out a pixel interpolation process on an image signal captured by a single image sensor with three-color filters, in whatever pattern the three-color filters may be arranged.

SUMMARY OF THE INVENTION

The present invention is directed to a pixel interpolation apparatus, an image capture apparatus, a storage media, and an integrated circuit.

To solve the above-described problems, according to the first aspect, a pixel interpolation apparatus for carrying out a pixel interpolation process on an image signal which is obtained by an image capture unit including filters of a first color filter, a second color filter, and a third color filter in three different colors which are arranged in a predetermined pattern, the image signal including a first-color pixel signal obtained via the first color filter, a second-color pixel signal obtained via the second color filter, and a third-color pixel signal obtained via the third color filter, is provided.

The pixel interpolation apparatus includes a signal correction unit, a saturation evaluation value calculation unit, a gray correlation value calculation unit, a color correlation value calculation unit, a pixel interpolation method determination unit, an interpolation unit, and a correction unit.

The signal correction unit is configured to correct a signal level of each of the first-color pixel signal, the second-color pixel signal, and the third-color pixel signal, in accordance with its corresponding color filter, and to output an image signal including the first-, second-, and third-color pixel signals which are corrected, as a first image signal.

The saturation evaluation value calculation unit is configured to evaluate saturation of a predetermined image area in an image formed of the first image signal, based on the first image signal output from the signal correction unit, and to obtain a saturation evaluation value of the predetermined image area.

The gray correlation value calculation unit is configured to obtain correlation degrees of a plurality of pairs of two directions which are perpendicular to each other on the image formed of the first image signal, using data of those pixels that are located in an image area including and surrounding an observed pixel which is being processed, as a gray correlation degree.

The color correlation value calculation unit is configured to obtain correlation degrees of a plurality of pairs of two directions which are perpendicular to each other on the image formed of the image signal including the first-, second-, and third-color pixel signals, using data of those pixels that are located in an image area including and surrounding the observed pixel and are of the same color.

The pixel interpolation method determination unit is configured to determine a pixel interpolation method for the observed pixel, based on the saturation evaluation value obtained by the saturation evaluation value calculation unit, the gray correlation degree obtained by the gray correlation value calculation unit, and the color correlation degree obtained by the color correlation value calculation unit.

The interpolation unit is configured to carry out a pixel interpolation process on the observed pixel by the pixel interpolation method determined by the pixel interpolation method determination unit, to obtain a second image signal which is a signal provided after the pixel interpolation process.

The correction unit is configured to perform color space conversion on the second image signal obtained by the interpolation unit in accordance with an arrangement pattern of the color filters, to obtain a predetermined output image signal.

In the above-described pixel interpolation apparatus, the signal correction unit corrects a level of a signal in accordance with an arrangement pattern of the three-color filters of the image capture unit, and a saturation evaluation value calculation process and a gray correlation value calculation process are carried out using the image signal, level of which has been corrected. Therefore, in this pixel interpolation apparatus, in whatever pattern the three-color filters may be arranged, a pixel interpolation method is determined based on results obtained by the high-accuracy saturation evaluation value calculation process and the high-accuracy gray correlation value calculation process, so that a high-accuracy pixel interpolation process is carried out by the determined pixel interpolation method. Further, in this pixel interpolation apparatus, color space conversion is performed on the second image signal obtained by the interpolation unit in accordance with an arrangement pattern of the three-color filters, to thereby obtain the predetermined output image signal.

According to the second aspect, in the first aspect, the interpolation unit includes a color-image interpolation unit, a gray-image interpolation unit, a signal reverse correction unit, and a selector unit.

The color-image interpolation unit is configured to carry out a color-image pixel interpolation process on the image formed of the image signal including the first-, second-, and third-color pixel signals when the pixel interpolation method determination unit determines to carry out a pixel interpolation process by a color-image pixel interpolation method.

The gray-image interpolation unit is configured to carry out a gray-image pixel interpolation process on the image formed of the first image signal output from the signal correction unit when the pixel interpolation method determination unit determines to carry out a pixel interpolation process by a gray-image pixel interpolation method.

The signal reverse correction unit is configured to perform reverse correction of signal level, on the image signal on which the gray-image interpolation unit carries out the gray-image pixel interpolation process, such that a signal level which is corrected by the signal correction unit is almost equal to a signal level provided before being corrected.

The selector unit is configured to obtain an image signal which is processed by the color-image interpolation unit as the second image signal when the pixel interpolation method determination unit determines to carry out a pixel interpolation process by the color-image pixel interpolation method. The selector unit is configured to obtain an image signal which is processed by the signal reverse correction unit as the second image signal when the pixel interpolation method determination unit determines to carry out a pixel interpolation process by the gray-image pixel interpolation method. The selector unit is configured to output the obtained second image signal to the correction unit.

In the above-described pixel interpolation apparatus, the signal correction unit corrects a level of a signal in accordance with an arrangement pattern of the three-color filters of the image capture unit, and a saturation evaluation value calculation process, a gray correlation value calculation process, and a gray-image pixel interpolation process are carried out using the image signal, level of which has been corrected. Also, in this pixel interpolation apparatus, a color-image pixel interpolation process is carried out using an image signal, level of which is not corrected, and the image signal on which the gray-image pixel interpolation process has been carried out is then subjected to reverse correction for converting the corrected level back to the original level in the signal reverse correction unit. Hence, it is possible to make levels of signals which have been subjected to a pixel interpolation process and are output from the interpolation unit, almost equal to each other. That is, in this pixel interpolation apparatus, there would not be caused a radical difference in signal level between a case where a color-image pixel interpolation process is carried out and a case where a gray-image pixel interpolation process is carried out. This makes it easier to enhance accuracy also in subsequent processes which are to be carried out on the image signal on which a pixel interpolation process has been carried out.

According to the third aspect, in the first or second aspect, the correction unit includes a first matrix transformation unit, a color-space processing unit, a saturation obtaining unit, a color difference correction unit, and a second matrix transformation unit.

The first matrix transformation unit is configured to perform color space conversion on the second image signal obtained by the interpolation unit in accordance with an arrangement pattern of the color filters, to obtain an image signal in an RGB color space.

The color-space processing unit is configured to convert the image signal in an RGB color space which is obtained by the first matrix transformation unit, into an image signal in a YCbCr color space.

The saturation obtaining unit is configured to obtain a saturation signal from the image signal in an RGB color space which is obtained by the first matrix transformation unit.

The color difference correction unit is configured to carry out a correction process on a Cb-color component signal and a Cr-color component signal in the image signal in a YCbCr color space which is obtained by the color-space processing unit, based on the saturation signal obtained by the saturation obtaining unit.

The second matrix transformation unit is configured to perform color space conversion on a Y component signal in the image signal in a YCbCr color space which is obtained by the color-space processing unit and on the Cb- and Cr-color component signals which are corrected by the color difference correction unit, to obtain an image signal in an RGB color space.

In the above-described pixel interpolation apparatus, an image signal in RGB color space is obtained from the image signal on which a high-accuracy pixel interpolation process has been carried out, and further, a saturation signal is obtained (through RGB-HSV conversion, for example). Then, in this pixel interpolation apparatus, a correction process is carried out on a Cb-color component signal and a Cr-color component signal which are color difference signals obtained by the color-space processing unit, based on the obtained saturation signal. Thus, whether the observed pixel is included in a gray-image area or a color-image area can be determined appropriately by using a high-accuracy saturation signal, so that to correct the Cb-color component signal and the Cr-color component signal based on the saturation signal would lead to suppression of side effects such as occurrence of a false color.

According to the fourth aspect, in any of the first to third aspects, a border detection unit configured to detect a border between a color-image area and a gray-image area on the image formed of the image signal including the first-, second-, and third-color pixel signals, is further included.

When the border between the color-image area and the gray-image area which is detected by the border detection unit is included in an image area for gray correlation degree calculation, the gray correlation value calculation unit assigns greater weights upon pixels which are provided on a line parallel to a correlation direction in which the gray correlation degree calculation is to be performed and are included in a central area of the image area for the gray correlation degree calculation, to obtain the gray correlation degree while enhancing effectiveness of the pixels in the gray correlation degree calculation.

As a result of this, in the above-described pixel interpolation apparatus, accuracy in calculation of a correlation degree in the neighborhood of a border between a color-image area and a gray-image area can be ensured, so that it is possible to appropriately suppress occurrence of a false color which is likely to occur in the neighborhood of a border between a color-image area and a gray-image area.

According to the fifth aspect, in any of the first to fourth aspects, the gray correlation value calculation unit obtains correlation degrees in a horizontal direction and a vertical direction and correlation degrees in a first diagonal direction and a second diagonal direction which is perpendicular to the first diagonal direction, on the image formed of the first image signal.

The color correlation value calculation unit obtains correlation degrees in a horizontal direction and a vertical direction and correlation degrees in a first diagonal direction and a second diagonal direction which is perpendicular to the first diagonal direction, on the image formed of the image signal including the first-, second-, and third-color pixel signals.

As a result of this, in the above-described pixel interpolation apparatus, a pixel interpolation process can be carried out using correlation degrees in a horizontal direction, a vertical direction, a first diagonal direction, and a second diagonal direction.

Additionally, it is preferable that the first diagonal direction forms an angle of 45° with respect to either a horizontal direction or a vertical direction.

According to the sixth aspect, in any of the first to fifth aspects, the saturation evaluation value calculation unit evaluates saturation of an image area of five pixels by five pixels which centers on the observed pixel, to obtain a saturation evaluation value of the image area.

The gray correlation value calculation unit obtains the gray correlation degree in an image area of five pixels by five pixels which centers on the observed pixel.

The color correlation value calculation unit obtains the color correlation degree in an image area of five pixels by five pixels which centers on the observed pixel.

As a result of this, in the above-described pixel interpolation apparatus, an image area of five pixels by five pixels can be used in evaluating saturation and obtaining a correlation degree.

According to the seventh aspect, in the sixth aspect, the saturation evaluation value calculation unit carries out a process expressed by an equation of:

$$\begin{pmatrix} \text{color\_diff0} \\ \text{color\_diff1} \end{pmatrix} = \begin{pmatrix} k01 & k02 & k03 \\ k11 & k12 & k12 \end{pmatrix} \begin{pmatrix} \text{p00\_color1} \\ \text{p01\_color2} \\ \text{p10\_color3} \end{pmatrix} + \begin{pmatrix} \text{offset0} \\ \text{offset1} \end{pmatrix}$$

where an average of pixel values of first-color component pixels included in the image area of three pixels by three pixels which centers on the observed pixel is "p00_color1", an average of pixel values of second-color component pixels included in the image area of three pixels by three pixels which centers on the observed pixel is "p01_color2", an average of pixel values of third-color component pixels included in the image area of three pixels by three pixels which centers on the observed pixel is "p10_color3", coefficients for obtaining a predetermined color difference value are "k01", "k02", "k03", "k11", "k12", and "k13", and offset values are "offset0" and "offset1", to thereby obtain two color component difference values color_diff0 and color_diff1.

The saturation evaluation value calculation unit carries out a process expressed by an equation of "diff_ave_color=abs (color_diff0)+abs(color_diff1) where "abs(x)" is a function for obtaining an absolute value of "x", to thereby obtain an average color component difference evaluation value diff_ave_color. The saturation evaluation value calculation unit obtains the saturation evaluation value of the image area using the obtained average color component difference evaluation value diff_ave_color.

As a result of this, in the above-described pixel interpolation apparatus, a saturation evaluation value of an image area of three pixels by three pixels can be obtained based on the average color component difference evaluation value diff_ave_color which is obtained using the image area.

Also, in this pixel interpolation apparatus, the above-cited coefficients k01-k04 and k11-k14 and the offset values offset0 and offset1 are set based on each of the colors of the three-color filters and each of color-difference components as desired, so that the foregoing process corresponding to color space conversion (a process of obtaining a color component difference value) can be carried out, to thereby obtain a desired color component difference value, whatever color the three-color filters may have.

According to the eighth aspect, in the seventh aspect, the saturation evaluation value calculation unit carries out the following processes of:

(1) selecting a plurality of pairs of pixels which are vertically adjacent to each other in the image area of three pixels by three pixels which centers on the observed pixel, calculating a difference in pixel value between each of the selected pairs of pixels, and obtaining a vertical evaluation value v_color based on the calculated difference in pixel value between each of the selected pairs of pixels; and (2) selecting a plurality of pairs of pixels which are horizontally adjacent to each other in the image area of three pixels by three pixels which centers on the observed pixel, calculating a difference in pixel value between each of the selected pairs of pixels, and obtaining a horizontal evaluation value h_color based on the calculated difference in pixel value between each of the selected pairs of pixels.

Then, the saturation evaluation value calculation unit obtains the saturation evaluation value of the image area, based on at least one of the average color component difference evaluation value diff_ave_color, the vertical evaluation value v_color, and the horizontal evaluation value h_color.

As a result of this, in the above-described pixel interpolation apparatus, the saturation evaluation value of an image area of three pixels by three pixels can be obtained based on at least one of one of (1) the average color difference evaluation value diff_ave_color, (2) the vertical evaluation value v_color, and (3) the horizontal evaluation value h_color which are obtained using the image area.

According to the ninth aspect, in any of the first to fifth aspects, the first-color component pixel signal is a white pixel signal. The color space processing unit includes a brightness signal obtaining unit and a brightness signal output unit.

The brightness signal obtaining unit is configured to obtain a brightness signal from the image signal in an RGB color space. The brightness signal output unit is configured to select, when a direction where there is strong correlation is determined based on the correlation degrees, a signal used as a Y component signal of the image signal in a YCbCr color space, from the brightness signal obtained by the brightness signal obtaining unit and the white pixel signal included in the second image signal, based on the direction where there is strong correlation and a type of a color filter provided in a position of the observed pixel.

As a result of this, a Y component signal of the observed signal can be selected from the brightness signal generated from the image signal in RGB color space and the white pixel signal included in the second image signal, based on a direction where there is strong correlation and a color filter placed in the position of the observed pixel, so that a high-accuracy Y component signal can be obtained.

According to the tenth aspect, in any of the first to ninth aspect, the predetermined pattern is a pattern in which two first-color filters, one second-color filter, and one third-color filter are arranged in an area of two pixels by two pixels. The two first-color filters are filters for a white component and are arranged diagonally relative to each other in the area of two pixels by two pixels.

As a result of this, all of color component signals included in the image signal in RGB color space can be obtained for each of many pixels, so that a high-accuracy Y component signal can be obtained.

According to the eleventh aspect, an image capture apparatus includes: an image capture unit which includes color filters in three different colors which are arranged in a predetermined pattern, and is configured to capture an image signal from light of a subject; and the pixel interpolation apparatus in any of the first to tenth aspects.

As a result of this, an image capture apparatus onto which the pixel interpolation apparatus according to any of the first to tenth aspects is mounted can be implemented.

According to the twelfth aspect, a program which causes a computer to execute a pixel interpolation method for carrying out a pixel interpolation process on an image signal which is obtained by an image capture unit including color filters of a first color filter, a second color filter, and a third color filter in three different colors which are arranged in a predetermined pattern, the image signal including a first-color pixel signal obtained via the first color filter, a second-color pixel signal obtained via the second color filter, and a third-color pixel signal obtained via the third color filter, is provided.

The pixel interpolation method includes a signal correction step, a saturation evaluation value calculation step, a gray correlation value calculation step, a color correlation value calculation step, a pixel interpolation method determination step, an interpolation step, and a correction step.

The signal correction step is to correct a signal level of each of the first-color pixel signal, the second-color pixel signal, and the third-color pixel signal, in accordance with its corresponding color filter, and to output an image signal including the first-, second-, and third-color pixel signals which are corrected, as a first image signal.

The saturation evaluation value calculation step is to evaluate saturation of a predetermined image area in an image formed of the first image signal, based on the first image signal output from the signal correction step, and to obtain a saturation evaluation value of the predetermined image area.

The gray correlation value calculation step is to obtain correlation degrees of a plurality of pairs of two directions which are perpendicular to each other on the image formed of the first image signal, using data of those pixels that are located in an image area including and surrounding an observed pixel which is being processed, as a gray correlation degree.

The color correlation value calculation step is to obtain correlation degrees of a plurality of pairs of two directions which are perpendicular to each other on the image formed of the image signal including the first-, second-, and third-color pixel signals, using data of those pixels that are located in an image area including and surrounding the observed pixel and are of the same color.

The pixel interpolation method determination step is to determine a pixel interpolation method for the observed pixel, based on the saturation evaluation value obtained by the saturation evaluation value calculation step, the gray correlation degree obtained by the gray correlation value calculation step, and the color correlation degree obtained by the color correlation value calculation step.

The interpolation step is to carry out a pixel interpolation process on the observed pixel by the pixel interpolation method determined by the pixel interpolation method determination step, to obtain a second image signal which is a signal provided after the pixel interpolation process.

The correction step is to perform color space conversion on the second image signal obtained by the interpolation step in accordance with an arrangement pattern of the color filters, to obtain a predetermined output image signal.

As a result of this, a program which can cause a computer to execute a pixel interpolation method which provides the same effects as those provided according to the first aspect can be implemented.

According to the thirteenth aspect, an integrated circuit for carrying out a pixel interpolation process on an image signal which is obtained by an image capture unit including color filters of a first color filter, a second color filter, and a third color filter in three different colors which are arranged in a predetermined pattern, the image signal including a first-color pixel signal obtained via the first color filter, a second-color pixel signal obtained via the second color filter, and a third-color pixel signal obtained via the third color filter, is provided.

The integrated circuit includes a signal correction unit, a saturation evaluation value calculation unit, a gray correlation value calculation unit, a color correlation value calculation unit, a pixel interpolation method determination unit, an interpolation unit, and a correction unit.

The signal correction unit is configured to correct a signal level of each of the first-color pixel signal, the second-color pixel signal, and the third-color pixel signal, in accordance with its corresponding color filter, and to output an image signal including the first-, second-, and third-color pixel signals which are corrected, as a first image signal.

The saturation evaluation value calculation unit is configured to evaluate saturation of a predetermined image area in an image formed of the first image signal, based on the first image signal output from the signal correction unit, and to obtain a saturation evaluation value of the predetermined image area.

The gray correlation value calculation unit is configured to obtain correlation degrees of a plurality of pairs of two directions which are perpendicular to each other on the image formed of the first image signal, using data of those pixels that are located in an image area including and surrounding an observed pixel which is being processed, as a gray correlation degree.

The color correlation value calculation unit is configured to obtain correlation degrees of a plurality of pairs of two directions which are perpendicular to each other on the image formed of the image signal including the first-, second-, and third-color pixel signals, using data of those pixels that are located in an image area including and surrounding the observed pixel and are of the same color.

The pixel interpolation method determination unit is configured to determine a pixel interpolation method for the observed pixel, based on the saturation evaluation value obtained by the saturation evaluation value calculation unit, the gray correlation degree obtained by the gray correlation value calculation unit, and the color correlation degree obtained by the color correlation value calculation unit.

The interpolation unit is configured to carry out a pixel interpolation process on the observed pixel by the pixel interpolation method determined by the pixel interpolation method determination unit, to obtain a second image signal which is a signal provided after the pixel interpolation process.

The correction unit is configured to perform color space conversion on the second image signal obtained by the interpolation unit in accordance with an arrangement pattern of the color filters, to obtain a predetermined output image signal.

As a result of this, a program which can cause a computer to implement an integrated circuit which provides the same effects as those provided according to the first aspect can be implemented.

Therefore, it is an object of the present invention to implement a pixel interpolation apparatus, a pixel interpolation method, an image capture apparatus, and an integrated circuit which can appropriately achieve a pixel interpolation process on an image signal captured by a single image sensor including three-color filters, in whatever pattern the three-color filters may be arranged.

These and other objects, features, aspects and advantages of the present invention will become more apparent from the following detailed description of the present invention when taken in conjunction with the accompanying drawings.

BRIEF DESCRIPTION OF THE DRAWINGS

FIG. 29 is a view for describing a process of calculating a gray-image second diagonal correlation value Cd2_gray.

DESCRIPTION OF THE PREFERRED EMBODIMENTS

Hereinafter, with reference to figures, the preferred embodiments of the present invention will be discussed.

First Preferred Embodiment

Below, a first preferred embodiment will be described with reference to accompanying drawings.

<1.1 Structure of Image Capture Apparatus>

Figure 1:
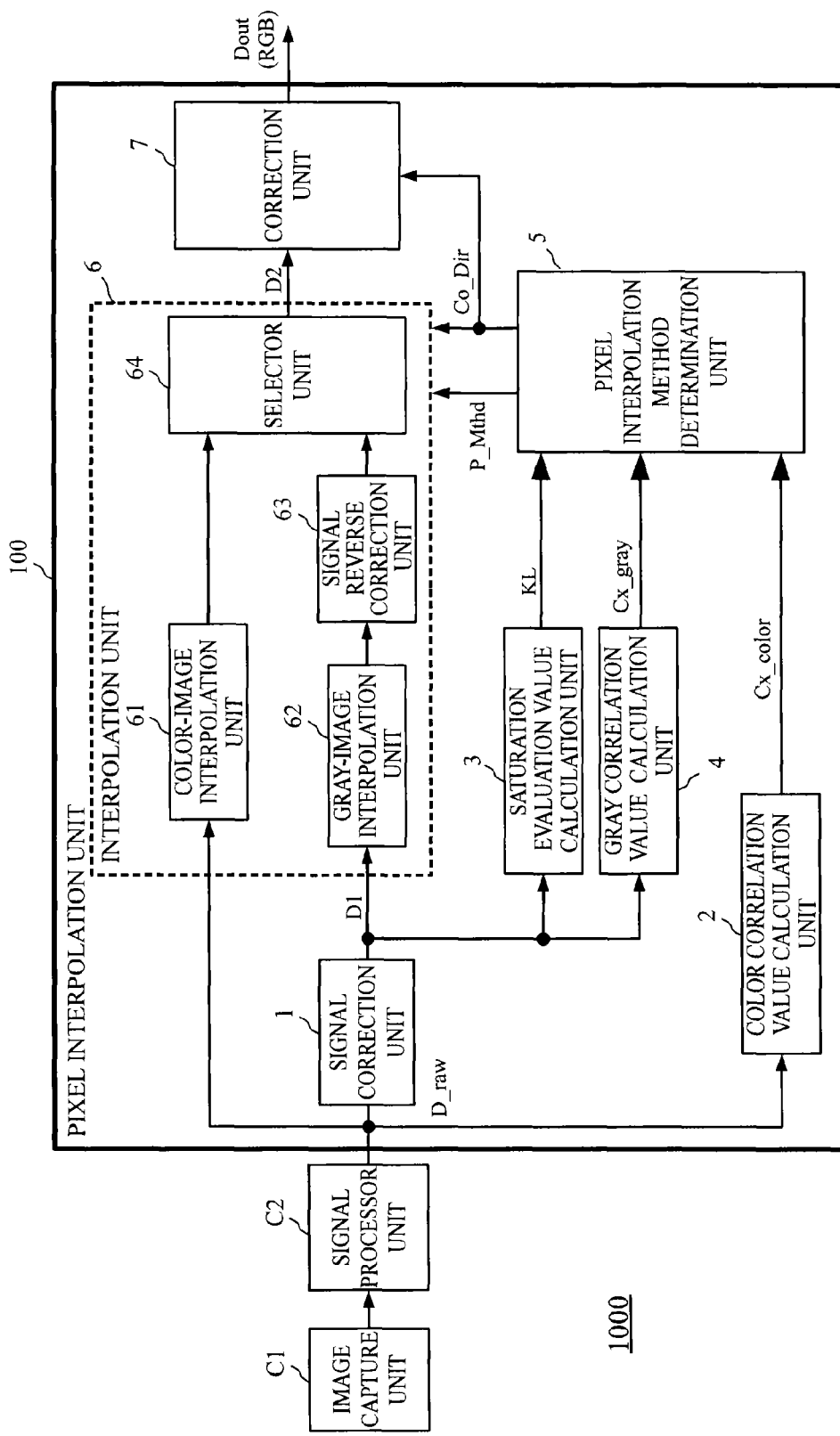
FIG. 1 is a schematic view of a structure of an image capture apparatus 1000 according to a first preferred embodiment.

FIG. 1 is a schematic view of a structure of an image capture apparatus 1000 according to the first preferred embodiment.

The image capture apparatus 1000 includes an image capture unit C1 which captures an image signal through photoelectric conversion of light of a subject, a signal processor unit C2 for carrying out predetermined signal processing on the image signal captured by the image capture unit C1, and a pixel interpolation unit 100 (pixel interpolation apparatus) for carrying out a pixel interpolation process on the image signal on which the signal processor unit C2 has carried out the predetermined signal processing, as shown in FIG. 1.

The image capture unit C1 includes an optical system, a three-color filter array in arbitrary three colors, and an image sensor.

It is noted that the following paragraphs will deal with a case where the "three-color filter array in arbitrary three colors" includes a white (W)-color filter, a yellow (Ye)-color filter, and a red (R)-color filter, as an example, for the sake of convenience in description.

The optical system includes one lens or a plurality of lenses, collects light of a subject, and forms an image on a surface of the image sensor with the collected light. Additionally, the optical system may have an exposure-adjustment function, a focus-adjustment function, and the like.

The W-Ye-R-color filter array includes three kinds of color filters of a color filter for a W-color component, a color filter for a Ye-color component, and a color filter for an R-color component. The three kinds of color filters are arranged in a predetermined pattern. The W-Ye-R-color filter array is placed on the surface of the image sensor. The color filter for a W-color component is a transparent filter which allows all colors to pass therethrough.

The image sensor includes a plurality of pixels. After light of a subject is collected by the optical system and an image is formed on the image sensor via the W-Ye-R-color filter array, the image sensor converts the formed image of a light of a subject into an image signal (electrical signal) through photoelectric conversion. The image sensor captures a W-color component pixel signal in a pixel for capturing a W-color component, captures a Ye-color component pixel signal in a pixel for capturing a Ye-color component, and captures an R-color component pixel signal in a pixel for capturing an R-color component. The image sensor outputs the pixel signals (W-color component pixel signal, Ye-color component pixel signal, and R-color component pixel signal) which are respectively captured in the plurality of pixels, to the signal processor unit C2, as an image signal.

The signal processor unit C2 receives the image signal output from the image capture unit C1, and carries out the predetermined signal processing (for example, gain adjustment, white balance adjustment, gamma adjustment, and the like) on the received image signal. The signal processor unit C2 outputs the image signal on which the predetermined signal processing has been carried out, to the pixel interpolation unit 100, as an image signal D_raw.

The pixel interpolation unit 100 includes a signal correction unit 1, a color correlation value calculation unit 2, a saturation evaluation value calculation unit 3, a gray correlation value calculation unit 4, a pixel interpolation method determination unit 5, an interpolation unit 6, and a correction unit 7, as shown in FIG. 1.

The signal correction unit 1 receives the image signal D_raw provided from the signal processor unit C2, and carries out a correction process on the received image signal D_raw. At that time, the signal correction unit 1 corrects the signal level of each of the color component pixel signals of the image signal D_raw, in accordance with each kind of color filter. Then, the signal correction unit 1 outputs the image signal on which the correction process has been carried out, to the saturation evaluation value calculation unit 3, the gray correlation value calculation unit 4, and a gray-image interpolation unit 62 of the interpolation unit 6, as an image signal D1.

The color correlation value calculation unit 2 receives the image signal D_raw output from the signal processor unit C2, (please note that one image (one frame image) formed of the image signal D_raw will be hereinafter also referred to as an "image D_raw"). The color correlation value calculation unit 2 calculates the following four color correlation values for an observed pixel (a pixel being processed) on the image D_raw (details thereof will be later provided).

(A1) A color-image vertical correlation value Cv_color
(A2) A color-image horizontal correlation value Ch_color
(A3) A color-image first diagonal correlation value Cd1_color
(A4) A color-image second diagonal correlation value Cd2_color The color correlation value calculation unit 2 outputs the above-cited four color correlation values which are obtained for each of pixels on the image D_raw, to the pixel interpolation method determination unit 5. It is additionally noted that the above-cited four color correlation values will be collectively referred to as color correlation values "Cx_color".

The saturation evaluation value calculation unit 3 receives the image signal D1 output from the signal correction unit 1. The saturation evaluation value calculation unit 3 calculates a saturation evaluation value L for an observed pixel (a pixel being processed) on the image D_raw, and further, obtains a saturation evaluation coefficient KL (0≤KL≤1). The saturation evaluation coefficient KL can be obtained by normalizing the saturation evaluation value L using a predetermined function (details thereof will be later provided). Then, the saturation evaluation value calculation unit 3 outputs the saturation evaluation coefficient KL which is obtained for each of pixels on the image D_raw, to the pixel interpolation method determination unit 5.

The gray correlation value calculation unit 4 receives the image signal D1 output from the signal correction unit 1. The gray correlation value calculation unit 4 calculates the following four gray correlation values for an observed pixel (a pixel being processed) on the image D_raw (details thereof will be later provided).

(B1) A gray-image vertical correlation value Cv_gray
(B2) A gray-image horizontal correlation value Ch_gray
(B3) A gray-image first diagonal correlation value Cd1_gray
(B4) A gray-image second diagonal correlation value Cd2_gray The gray correlation value calculation unit 4 outputs the above-cited four gray correlation values which are obtained for each of pixels on the image D_raw, to the pixel interpolation method determination unit 5. It is additionally noted that the above-cited four gray correlation values will be collectively referred to as gray correlation values "Cx_gray"

The pixel interpolation method determination unit 5 receives the saturation evaluation coefficient KL which is output from the saturation evaluation value calculation unit 3 for each of pixels, the color correlation values Cx_color which are output from the color correlation value calculation unit 2 for each of pixels, and the gray correlation values Cx_gray which are output from the gray correlation value calculation unit 4 for each of pixels. The pixel interpolation method determination unit 5 determines a correlation direction and a pixel interpolation method for each of pixels, based on the saturation evaluation coefficient KL, the color correlation values Cx_color, and the gray correlation values Cx_gray (details thereof will be later provided). Then, the pixel interpolation method determination unit 5 outputs information Co_Dir about a correlation direction and information P_Mthd about a pixel interpolation method which are determined for each of pixels, to the interpolation unit 6. Also, the pixel interpolation method determination unit 5 outputs the information about a correlation direction which is determined for each of pixels, to the correction unit 7.

The interpolation unit 6 receives the image signal D_raw output from the signal processor unit C2, the image signal D1 output from the signal correction unit 1, and information about a correlation direction and a pixel interpolation method, which is determined for each of pixels and is output from the pixel interpolation method determination unit 5. The interpolation unit 6 carries out a pixel interpolation process on each of pixels of the image D_raw using the correlation direction determined and the pixel interpolation method determined by the pixel interpolation method determination unit 5, so that each of the pixels can include three color components (W-color component, Ye-color component, and R-color component in the first preferred embodiment) (details thereof will be later provided). Then, the interpolation unit 6 outputs an image signal on which the pixel interpolation process has been carried out (i.e., an image signal including pixels each of which has a W-color component, a Ye-color component, and an R-color component), to the correction unit 7, as an image signal D2.

The interpolation unit 6 includes a color-image interpolation unit 61, a gray-image interpolation unit 62, a signal reverse correction unit 63, and a selector unit 64, for example, as shown in FIG. 1. It is noted that in FIG. 1, illustration of inputs and outputs at functional elements of the interpolation unit 6 is partly omitted for the sake of simplification.

The color-image interpolation unit 61 receives the image signal D_raw output from the signal processor unit C2. The color-image interpolation unit 61 carries out an interpolation process for a color image (color-image pixel interpolation process) on the image signal D_raw, based on the information Co_Dir about a correlation direction and the information P_Mthd about a pixel interpolation method which are output from the pixel interpolation method determination unit 5, and then outputs an image signal on which the color-image pixel interpolation process has been carried out, to the selector unit 64.

The gray-image interpolation unit 62 receives the image signal D1 output from the signal correction unit 1. The gray-image interpolation unit 62 carries out an interpolation process for a gray image (gray-image pixel interpolation process) on the image signal D1, based on the information Co_Dir about a correlation direction and the information P_Mthd about a pixel interpolation method which are output from the pixel interpolation method determination unit 5, and then outputs an image signal on which the gray-image pixel interpolation process has been carried out, to the signal reverse correction unit 63.

The signal reverse correction unit 63 receives the image signal output from the gray-image interpolation unit 62. The signal reverse correction unit 63 carries out a correction process which is reverse to a correction process carried out in the signal correction unit 1, on the image signal output from the gray-image interpolation unit 62. That is, the signal reverse correction unit 63 carries out a correction process which is reverse to a correction process carried out in the signal correction unit 1 (reverse correction process) so that a level of the image signal output from the gray-image interpolation unit 62 is almost equal to a level of a signal input to the signal correction unit 1. Then, the signal reverse correction unit 63 outputs the image signal on which the reverse correction process has been carried out, to the selector unit 64.

The selector unit 64 receives the image signal output from the color-image interpolation unit 61 and the image signal output from the signal reverse correction unit 63. The selector unit 64 selects either the image signal output from the color-image interpolation unit 61 or the image signal output from the signal reverse correction unit 63, based on the information Co_Dir about a correlation direction and the information P_Mthd about a pixel interpolation method which are output from the pixel interpolation method determination unit 5, and outputs a selected image signal to the correction unit 7, as the image signal D2.

The correction unit 7 receives the image signal D2 output from the interpolation unit 6 and the information Co_Dir about a correlation direction which is output from the pixel interpolation method determination unit 5. The correction unit 7 carries out a correction process, a conversion process, and the like on the image signal D2, to obtain an image signal Dout which is a signal in an RGB color space.

Figure 2:
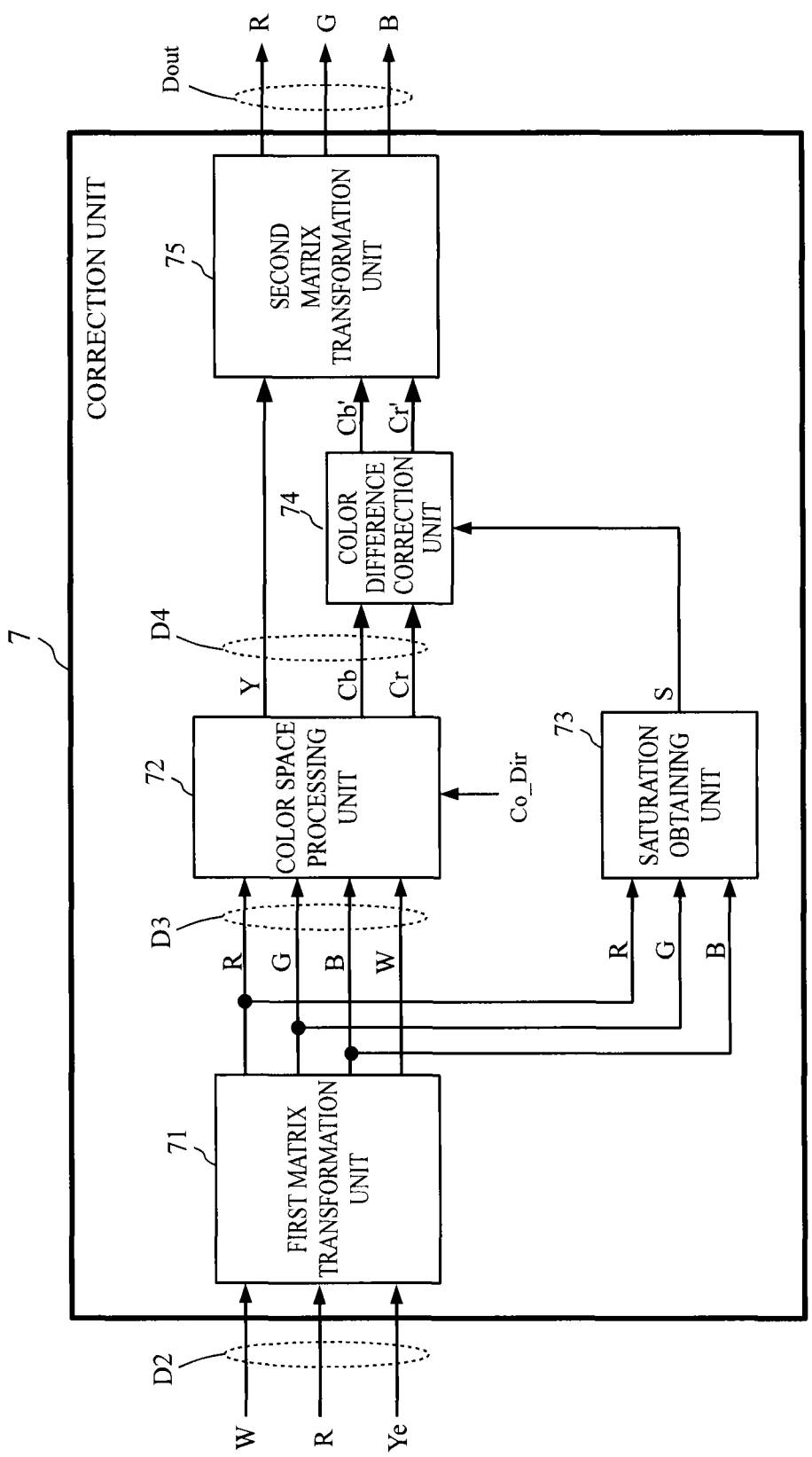
FIG. 2 is a schematic view of a structure of a correction unit 7 according to the first preferred embodiment.

The correction unit 7 includes a first matrix transformation unit 71, a color space processing unit 72, a saturation obtaining unit 73, a color difference correction unit 74, and a second matrix transformation unit 75, for example, as shown in FIG. 2.

The first matrix transformation unit 71 receives the image signal D2 output from the selector unit 64 of the interpolation unit 6. The first matrix transformation unit 71 performs matrix transformation on the image signal D2, to obtain an image signal D3 including a signal in an RGB color space and a W-color component pixel signal. The first matrix transformation unit 71 outputs the obtained image signal D3 to the color space processing unit 72.

Also, the first matrix transformation unit 71 outputs an R-color component pixel signal, a G-color component pixel signal, and B-color component pixel signal out of pixel signals included in the image signal D3, to the saturation obtaining unit 73.

The color space processing unit 72 receives the image signal D3 output from the first matrix transformation unit 71 and the information Co_Dir about a correlation direction which is output from the pixel interpolation method determination unit 5. The color space processing unit 72 obtains a Y component pixel signal (brightness signal) from the image signal D3, based on the information Co_Dir about a correlation direction. Also, the color space processing unit 72 obtains a Cb-color component pixel signal and a Cr-color component pixel signal from an R-color component pixel signal, a G-color component pixel signal, and a B-color component pixel signal which are included in the image signal D3, and the above-described Y component pixel signal. Then, the color space processing unit 72 outputs an image signal including the obtained pixel signals of the Y component pixel signal, the Cb-color component pixel signal, and the Cr-color component pixel signal (i.e., a signal in a YCbCr color space), as an image signal D4.

Figure 3A:
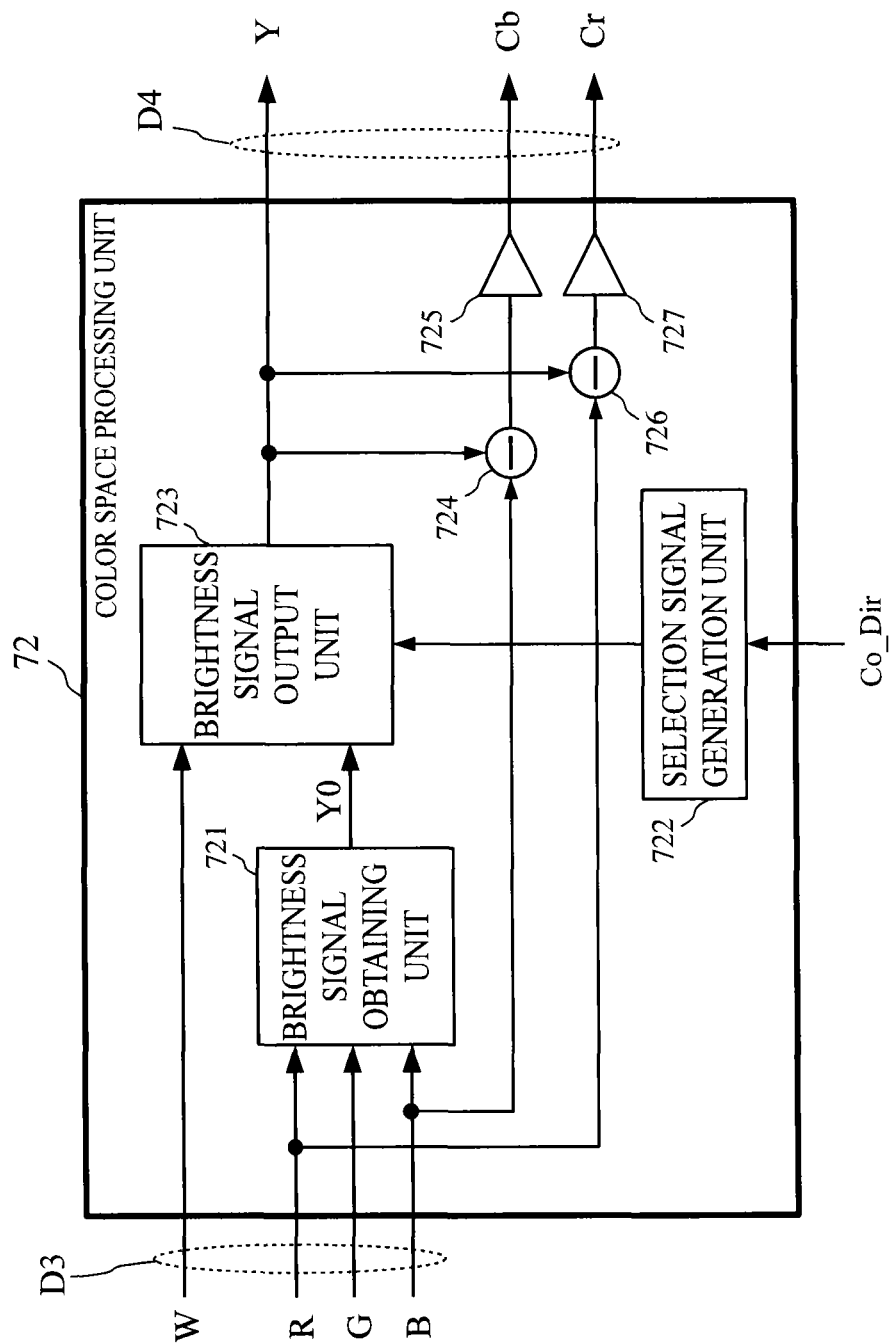
FIG. 3A is a schematic view of a structure of a color space processing unit 72 according to the first preferred embodiment.

The color space processing unit 72 includes a brightness signal obtaining unit 721, a selection signal generation unit 722, a brightness signal output unit 723, subtracters 724 and 726, and gain adjustment units 725 and 727, for example, as shown in FIG. 3A.

The brightness signal obtaining unit 721 receives an R-color component pixel signal, a G-color component pixel signal, and a B-color component pixel signal which are output from the first matrix transformation unit 71. The brightness signal obtaining unit 721 obtains a brightness component pixel signal Y0 from the input pixel signals of the R-color component pixel signal, the G-color component pixel signal, and the B-color component pixel signal, and outputs the brightness component pixel signal Y0 to the brightness signal output unit 723.

The selection signal generation unit 722 receives the information Co_Dir about a correlation direction which is output from the pixel interpolation method determination unit 5 for each of pixels, and generates a selection signal based on the information Co_Dir about a correlation direction. Then, the selection signal generation unit 722 outputs the generated selection signal to the brightness signal output unit 723.

The brightness signal output unit 723 receives the brightness component pixel signal Y0 output from the brightness signal obtaining unit 721, a W-color component pixel signal W output from the first matrix transformation unit 71, and the selection signal output from the selection signal generation unit 722. The brightness signal output unit 723 generates a brightness component pixel signal Y (Y component pixel signal) from the brightness component pixel signal Y0 and the W-color component pixel signal W, in accordance with the selection signal, and then outputs the generated brightness component pixel signal Y.

The subtracter 724 receives the brightness component pixel signal Y (Y component pixel signal) output from the brightness signal output unit 723 and a B-color component pixel signal output from the first matrix transformation unit 71, and performs subtraction. As a result, the subtracter 724 obtains a B-Y signal (=B-color component signal minus brightness component pixel signal Y), and outputs the obtained B-Y signal to the gain adjustment unit 725.

The gain adjustment unit 725 performs predetermined gain adjustment on the B-Y signal output from the subtracter 724, to thereby obtain a Cb-color component pixel signal. Then, the gain adjustment unit 725 outputs the obtained Cb-color component pixel signal.

The subtracter 726 receives the brightness component pixel signal Y (Y component pixel signal) output from the brightness signal output unit 723 and an R-color component pixel signal output from the first matrix transformation unit 71, and performs subtraction. As a result, the subtracter 726 obtains an R-Y signal (=R-color component signal minus brightness component pixel signal Y), and outputs the obtained R-Y signal to the gain adjustment unit 727.

The gain adjustment unit 727 performs predetermined gain adjustment on the R-Y signal output from the subtracter 726, to thereby obtain a Cr-color component pixel signal. Then, the gain adjustment unit 727 outputs the obtained Cr-color component pixel signal.

Thus, the color space processing unit 72 outputs the image signal (a signal in YCbCr color space) including the obtained pixel signals of the Y component pixel signal, the Cb-color component pixel signal, and the Cr-color component pixel signal, as the image signal D4. Specifically, the color space processing unit 72 outputs the Y component pixel signal in the image signal D4 to the second matrix transformation unit 75, and outputs the Cb-color component pixel signal and the Cr-color component pixel signal in the image signal D4 to the color difference correction unit 74.

Figure 3B:
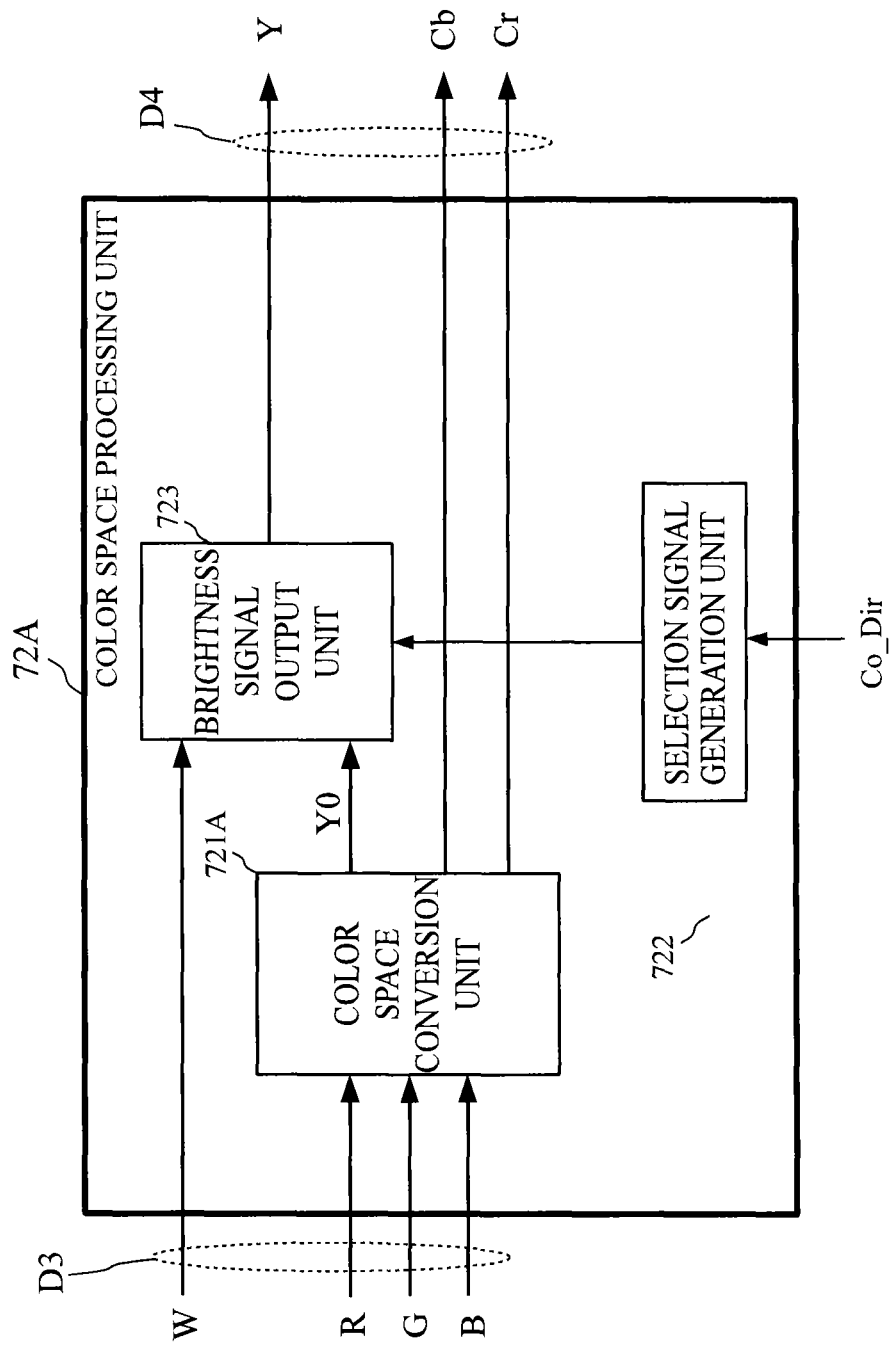
FIG. 3B is a schematic view of a structure of a color space processing unit 72A according to the first preferred embodiment.

The color space processing unit 72 may be configured to include a color space conversion unit 721A, the selection signal generation unit 722, and the brightness signal output unit 723, for example, as shown FIG. 3B.

The color space conversion unit 721A receives the R-color component pixel signal, the G-color component pixel signal, and the B-color component pixel signal which are output from the first matrix transformation unit 71. The color space conversion unit 721A performs RGB-YCbCr color space conversion on the received R-, G-, B-color component pixel signals, to thereby obtain the brightness component pixel signal Y0, a Cb-color component pixel signal, and a Cr-color component pixel signal. Then, the color space conversion unit 721A outputs the brightness component pixel signal Y0 to the brightness signal output unit 723, and outputs the Cb-color component pixel signal and the Cr-color component pixel signal to the color difference correction unit 74.

The selection signal generation unit 722 and the brightness signal output unit 723 are identical to those described above.

The color space processing unit 72 outputs the image signal (a signal in YCbCr color space) including the obtained pixel signals of the Y component pixel signal, the Cb-color component pixel signal, and the Cr-color component pixel signal, as the image signal D4. Specifically, the color space processing unit 72 outputs the Y component pixel signal in the image signal D4 to the second matrix transformation unit 75, and outputs the Cb-color component pixel signal and the Cr-color component pixel signal in the image signal D4 to the color difference correction unit 74.

The saturation obtaining unit 73 receives the R-color component pixel signal, the G-color component pixel signal, and the B-color component pixel signal in the image signal D3 output from the first matrix transformation unit 71. The saturation obtaining unit 73 obtains a saturation value S from the R-color component pixel signal, the G-color component pixel signal, and the B-color component pixel signal. Then, the saturation obtaining unit 73 outputs the obtained saturation value S (saturation signal S) to the color difference correction unit 74.

The color difference correction unit 74 receives the Cb-color component pixel signal and the Cr-color component pixel signal which are output from the color space processing unit 72, and the saturation value S (saturation signal S) output from the saturation obtaining unit 73. The color difference correction unit 74 carries out a color difference correction process on the Cb-color component pixel signal and the Cr-color component pixel signal which are output from the color space processing unit 72, based on the saturation value S, and outputs the Cb-color component pixel signal and the Cr-color component pixel signal on which the color difference correction process has been carried out, to the second matrix transformation unit 75.

The second matrix transformation unit 75 receives the Y component pixel signal output from the color space processing unit 72 and the Cb-color component pixel signal and the Cr-color component pixel signal which have been subjected to the color difference correction process and are output from the color difference correction unit 74. The second matrix transformation unit 75 carries out a process for converting a YCbCr color space into an RGB color space, on the received pixel signals, to thereby obtain an R-color component pixel signal, a G-color component pixel signal, and a B-color component pixel signal. The second matrix transformation unit 75 outputs an image signal including the obtained R-, G-, and B-color component pixel signals, as an image signal Dout.

<1.2 Operations of Image Capture Apparatus>

Below, operations of the image capture apparatus 1000 configured as described above will be discussed.

Figure 4:
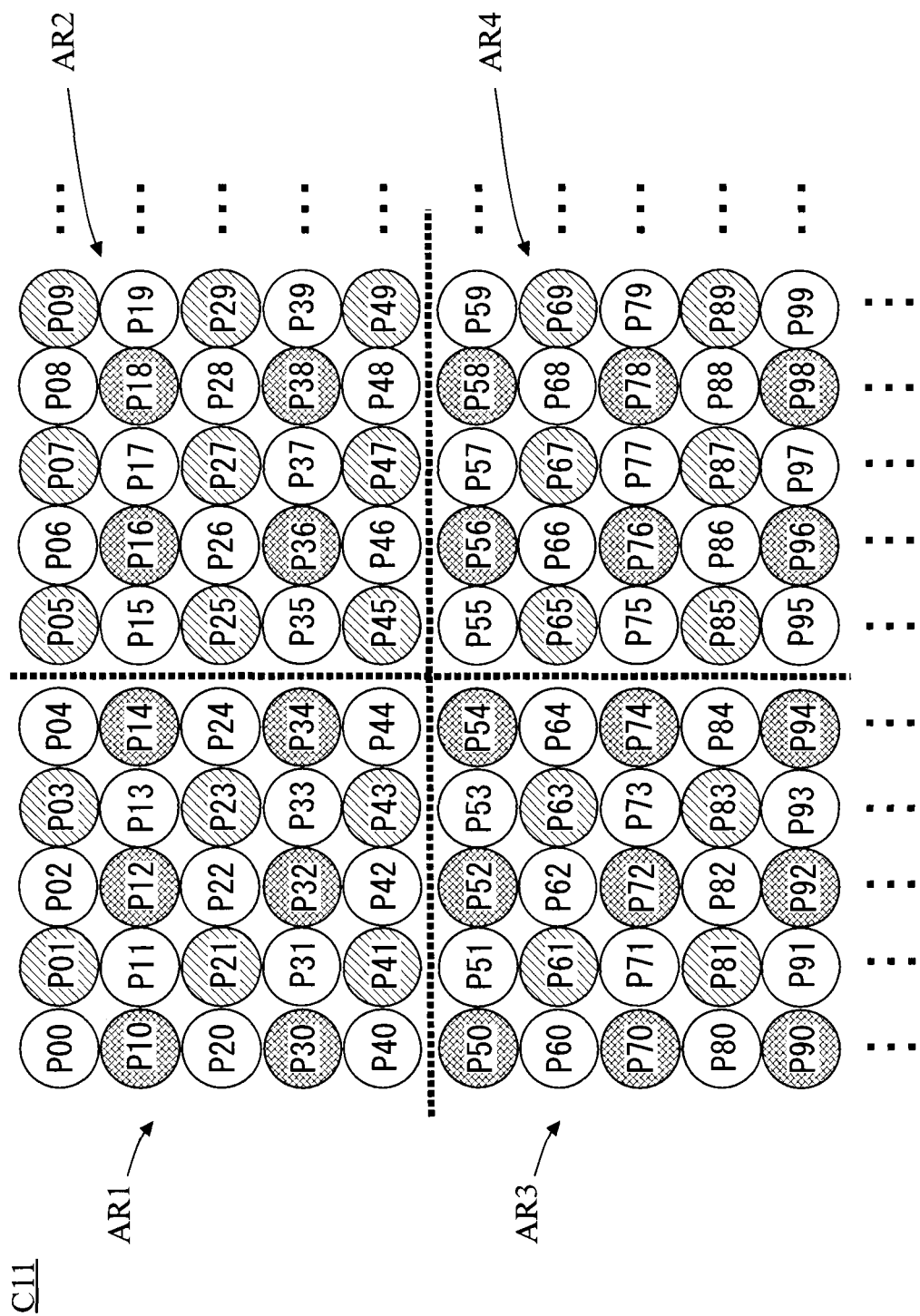
FIG. 4 shows an example of an arrangement pattern of a first-color component color filter, a second-color component color filter and a third-color component color filter in a three-color filter array C11 in arbitrary three colors, which is placed on an image capture unit C1.

FIG. 4 shows an example of an arrangement pattern of a first-color component color filter, a second-color component color filter, and a third-color component color filter in a three-color filter array C11 in arbitrary three colors, which is placed in the image capture unit C1. In the example of FIG. 4, the first-color component color filter is white (W), the second-color component color filter is yellow (Ye), and the third-color component color filter is red (R). As shown in FIG. 4, in the three-color filter array, the first-color component color filter and the second-color component color filter are alternately arranged in a certain horizontally-extending row, in order of the first-color component color filter, the second-color component color filter, the first-color component color filter, the second-color component color filter, . . . . Then, in the next row, the third-color component color filter and the first-color component color filter are alternately arranged, in order of the third-color component color filter, the first-color component color filter, the third-color component color filter, the first-color component color filter, . . . . Thus, the first-color component color filter, the second-color component color filter, and the third-color component color filter are arranged in an area of two pixels wide by two pixels high, and two first-color component color filters are arranged diagonally with each other in the area.

<<Way of Description of Pixels in Three-Color Pixel Array>>

Now, a way of description of pixels in a three-color filter array will be explained. First, pixels in a matrix area of five pixels by five pixels are illustrated as can be seen in an upper-left area AR1 in FIG. 4. An alphabet "P" in the upper-left area AR1 in FIG. 4 means that it is not considered what color component a pixel is related to (this will hold true for the other areas AR2, AR3, and AR4 in FIG. 4). In contrast thereto, when there is a need to identify a color component of each pixel, a symbol using an alphabet which indicates a certain color is described in a circle denoting a pixel. For example, in a case of a three-color filter array including white (W), yellow (Ye), and red (R) color filters, a W-color component pixel is denoted by an alphabet "W" and two-digit numbers which indicate a pixel position, a Ye-color component pixel is denoted by an alphabet "Y" and two-digit numbers which indicate a pixel position, and an R-color component pixel is denoted by an alphabet "R" and two-digit numbers which indicate a pixel position.

Out of two-digit numbers following alphabets, "P", "W", "Y", and "R", the first number (located closer to an alphabet) represents a row number of a pixel in a matrix area, and the second number represents a column number of a pixel in a matrix area. This way of description will be applied to pixel arrays in the other drawings. Further, in description of preferred embodiments and mathematical expressions, alphabets, "P", "W", "Y", and "R" may denote a pixel value. For example, a symbol "P00" denotes a pixel value of a pixel which is located in the first row and the first column, as well as denotes the pixel itself which is located in the first row and the first column, Light provided from a subject is collected by the optical system (not shown) of the image capture unit C1, and is incident upon the image sensor (not shown) of the image capture unit C1 via the W-Ye-R-color filter array C11 placed on the surface of the image sensor. It is noted that the following description will be made, assuming that the W-Ye-R-color filter array C11 has an arrangement pattern shown in FIG. 4.

The image sensor of the image capture unit C1 converts incident light provided from the subject into an electrical signal (pixel signal) through photoelectric conversion, for each of pixels. In other words, a W-color component pixel value is obtained in a W-color component pixel, and a Ye-color component pixel value is obtained in a Ye-color component pixel. Further, an R-color component pixel value is obtained in an R-color component pixel. Then, pixel signals obtained in the above-described manner (pixel signals each having any of a W-color component pixel value, a Ye-color component pixel value, and an R-color component pixel value, depending on each pixel) are output from the image capture unit C1 to the signal processor unit C2.

The signal processing unit C2 carries out predetermined signal processing (for example, gain adjustment, white balance adjustment, gamma adjustment and the like), on the image signal provided from the image capture unit C1. Then, the image signal on which the predetermined signal processing has been carried out (image signal D_raw) is output to the signal correction unit 1, the color correlation value calculation unit 2, and the color-image interpolation unit 61 of the interpolation unit 6, which are included in the pixel interpolation unit 100.

(1.2.1 Signal Correction Process)

The signal correction unit 1 carries out a correction process on the received image signal D_raw. At that time, the signal correction unit 1 corrects the signal level of each of color component pixel signals (color component pixel values) in the image signal D_raw, in accordance with each kind of color filter. Specifically, when a W-color component pixel signal, a Ye-color component pixel signal, and an R-color component pixel signal which are included in the image signal D_raw are represented by "Win", "Yein", and "Rin", respectively, and a gain for correcting a W-color filter, a gain for correcting a Ye-color filter, and a gain for correcting an R-color filter are represented by "Gain_sig_W", "Gain_sig_Ye", and "Gain_sig_R", respectively, the signal correction unit 1 carries out a process which is expressed by the following equations:

$$W\text{out}=W\text{in}\times \text{Gain\_sig\_}W$$

$$Y\text{eout}=Y\text{ein}\times \text{Gain\_sig\_}Ye$$

$$R\text{out}=R\text{in}\times \text{Gain\_sig\_}R$$

The gains for correcting the respective color filters ("Gain_sig_W", "Gain_sig_Ye", and "Gain_sig_R" in the above equations) are determined depending on each kind of a color filter placed on the image capture unit C1. For example, in a case where achromatic light of 100% of W is received by the image sensor of the image capture unit C1, the achromatic light of 100% of W is occasionally unconverted into an electrical signal (pixel signal) at the same level, after passing through respective color filters. This is because the degree of energy loss and the sensitivity of the image sensor to light including many certain color components vary with the kind of color filter. In order to smooth out differences in signal level after photoelectric conversion, which is caused as a result of passage of such the light through a color filter, the correction gains for respective color filters ("Gain_sig_W", "Gain_sig_Ye", and "Gain_sig_R" in the above equations) are provided. As described above, while the W-color filter is transparent, energy loss or the like is caused as a result of passage of the light of 100% of W through the W-color filter. For this reason, the signal correction unit 1 corrects a signal level of the W-color component pixel signal also.

Thus, the above-described signal correction process allows differences in signal level after photoelectric conversion, which are caused by passage of light through a color filter, to be smoothed out. As a result, each of pixel signals provided after the signal correction process has appropriate brightness information. Accordingly, to employ each of pixel signals provided after the signal correction process in carrying out the gray-image pixel interpolation process, the gray correlation value calculation process, or the saturation evaluation value calculation process could enhance accuracy in each of the processes.

As described above, the signal correction unit 1 carries out the foregoing processes, to thereby obtain the W-color component pixel signal Wout which has been subjected to the signal correction process, the Ye-color component pixel signal Yeout which has been subjected to the signal correction process, and the R-color component pixel signal Rout which has been subjected to the signal correction process.

Then, the image signal D1 obtained by the signal correction unit 1 is output to the gray-image interpolation unit 62 of the interpolation unit 6, the saturation evaluation value calculation unit 3, and the gray correlation value calculation unit 4.

The saturation evaluation value calculation unit 3 calculates a saturation evaluation value for each of pixels, based on the image signal D1 (image D1) output from the signal correction unit 1. Further, the saturation evaluation value calculation unit 3 obtains the saturation evaluation coefficient KL ($0 \le KL \le 1$) which is obtained by normalizing the saturation evaluation value L using a predetermined function. Below, this matter will be described in detail.

(1.2.2. Saturation Evaluation Value Calculation Process)

The saturation evaluation value calculation unit 3 defines an image area of five pixels by five pixels, which centers on an observed pixel (which area will hereinafter be referred to as a "matrix area"), in the received image D1. The saturation evaluation value calculation unit 3 analyzes variation of respective color components in the defined matrix area, to thereby calculate a saturation evaluation value of the matrix area (saturation evaluation value of the observed pixel).

More specifically, the saturation evaluation value calculation unit 3 calculates the following three evaluation values (1), (2), and (3) in the matrix area including the observed pixel, and employs the smallest value among the three calculated evaluation values, as the saturation evaluation value L.
(1) An average color component difference evaluation value diff_ave_color
(2) A vertical evaluation value v_color
(3) A horizontal evaluation value h_color
Processes of calculating the above-cited three evaluation values (1), (2), and (3) will be described below.

<<(1) Average Color Component Difference Evaluation Value diff_ave_color>>

First, a process of calculating an average color component difference evaluation value diff_ave_color will be discussed with reference to FIG. 4.

The saturation evaluation value calculation unit 3 classifies matrix areas into four patterns.

In FIG. 4, let us assume that pixels P00 and P11 are first-color component pixels (W), a pixel P01 is a second-color component pixel (Ye), and a pixel P10 is a third-color component pixel (R). Then, matrix areas AR1, AR2, AR3, and AR4 in FIG. 4, each of five pixels by five pixels, are classified as follows.
(A) The matrix area AR1 of five pixels by five pixels in FIG. 4 is classified as a matrix area in which a central pixel is a first-color component pixel (a pixel P22 in the same color as the pixel P00) and a pixel located at the side of the central pixel is a pixel in the same color as a second-color component pixel.
(B) The matrix area AR2 of five pixels by five pixels in FIG. 4 is classified as a matrix area in which a central pixel is a second-color component pixel (a pixel P27 in the same color as the pixel P01).

(C) The matrix area AR3 of five pixels by five pixels in FIG. 4 is classified as a matrix area in which a central pixel is a third-color component pixel (a pixel P72 in the same color as the pixel P10).
(D) The matrix area AR4 of five pixels by five pixels in FIG. 4 is classified as a matrix area in which a central pixel is a first-color component pixel (a pixel P77 in the same color as the pixel P11) and a pixel located at the side of the central pixel is a pixel in the same color as a third-color component pixel.

Then, the saturation evaluation value calculation unit 3 calculates an average p00_color1 of pixel values of first-color component pixels (W), an average p01_color2 of pixel values of second-color component pixels (Ye), and an average p10_color3 of pixel values of third-color component pixels (R), for each of the matrix areas each of five pixels by five pixels, which are classified as above, as follows.
(A) In a case where an area of five pixels by five pixels is classified as the above (A), the following equations are employed.

$$p00\_color1 = (P11+P13+P31+P33+P22)/5$$

$$p01\_color2 = (P21+P23)/2$$

$$p10\_color3 = (P12+P32)/2$$

(B) In a case where an area of five pixels by five pixels is classified as the above (B), the following equations are employed.

$$p00\_color1 = (P12+P21+P23+P32)/4$$

$$p01\_color2 = P22$$

$$p10\_color3 = (P11+P13+P31+P33)/4$$

(C) In a case where an area of five pixels by five pixels is classified as the above (C), the following equations are employed.

$$p00\_color1 = (P12+P21+P23+P32)/4$$

$$p01\_color2 = (P11+P13+P31+P33)/4$$

$$p10\_color3 = P22$$

(D) In a case where an area of five pixels by five pixels is classified as the above (D), the following equations are employed.

$$p00\_color1 = (P11+P13+P31+P33+P22)/5$$

$$p01\_color2 = (P12+P32)/2$$

$$p10\_color3 = (P21+P23)/2$$

Then, the saturation evaluation value calculation unit 3 carries out a process expressed by the following equation [Equation 2], to thereby obtain two color component difference values color_diff0 and color_diff1.

$$\begin{pmatrix} color\_diff0 \\ colof\_diff1 \end{pmatrix} = \begin{pmatrix} k01 & k02 & k03 \\ k11 & k12 & k12 \end{pmatrix} \begin{pmatrix} p00\_color1 \\ p01\_color2 \\ p10\_color3 \end{pmatrix} + \begin{pmatrix} offset0 \\ offset1 \end{pmatrix} \qquad [\text{Equation 2}]$$

It is noted that in the above equation, coefficients k01, k02, k03, k11, k12, and k13 are set in accordance with a color component difference value which is to be obtained. Also, variables offset0 and offset1 are values for providing offsets (offset values).

The saturation evaluation value calculation unit 3 sets the above-cited coefficients k01-k03 and k11-k13 based on respective colors of three-color filters and color differences which are desired. As a result, it is possible to obtain a desired color component difference value by carrying out the above-described process which corresponds to a color-space conversion process (a process of obtaining a difference in pixel value between color components), in whatever color three-color filters may be.

In a case where three-color filters form a W-Ye-R-color filter array, a first-color component pixel is white, a second-color component pixel is yellow, and a third-color component pixel is red, the following settings are made:

$k01=1$ $k02=-1$ $k03=0$ $k11=1$ $k12=0$ $k13=-1$ offset0=offset1=0

Then, the process expressed by the above equation, [Equation 2] is equivalent to a process expressed by the following equations.

color_diff0=p00_color1−p01_color2 color_diff1=p00_color1−p10_color3

That is, in this case, the saturation evaluation value calculation unit 3 can obtain the value color_diff0 which is a (W-Ye)-color component and the value color_diff1 which is a (W-R)-color component, by carrying out the above-described process.

The saturation evaluation value calculation unit 3 uses the color component difference values color_diff0 and color_diff1 which are obtained in the above-described manner, in carrying out a process expressed by the following equation.

diff_ave_color=abs(color_diff0)+abs(color_diff1)

where "abs(x)" represents a function for obtaining an absolute value of "x".

Then, the average color component difference evaluation value diff_ave_color can be obtained.

<<(3) Vertical Evaluation Value v_color>>

Next, a process of calculating a vertical evaluation value v_color will be described with reference to FIGS. 5(*a*), (*b*), and (*c*).

Figure 5:
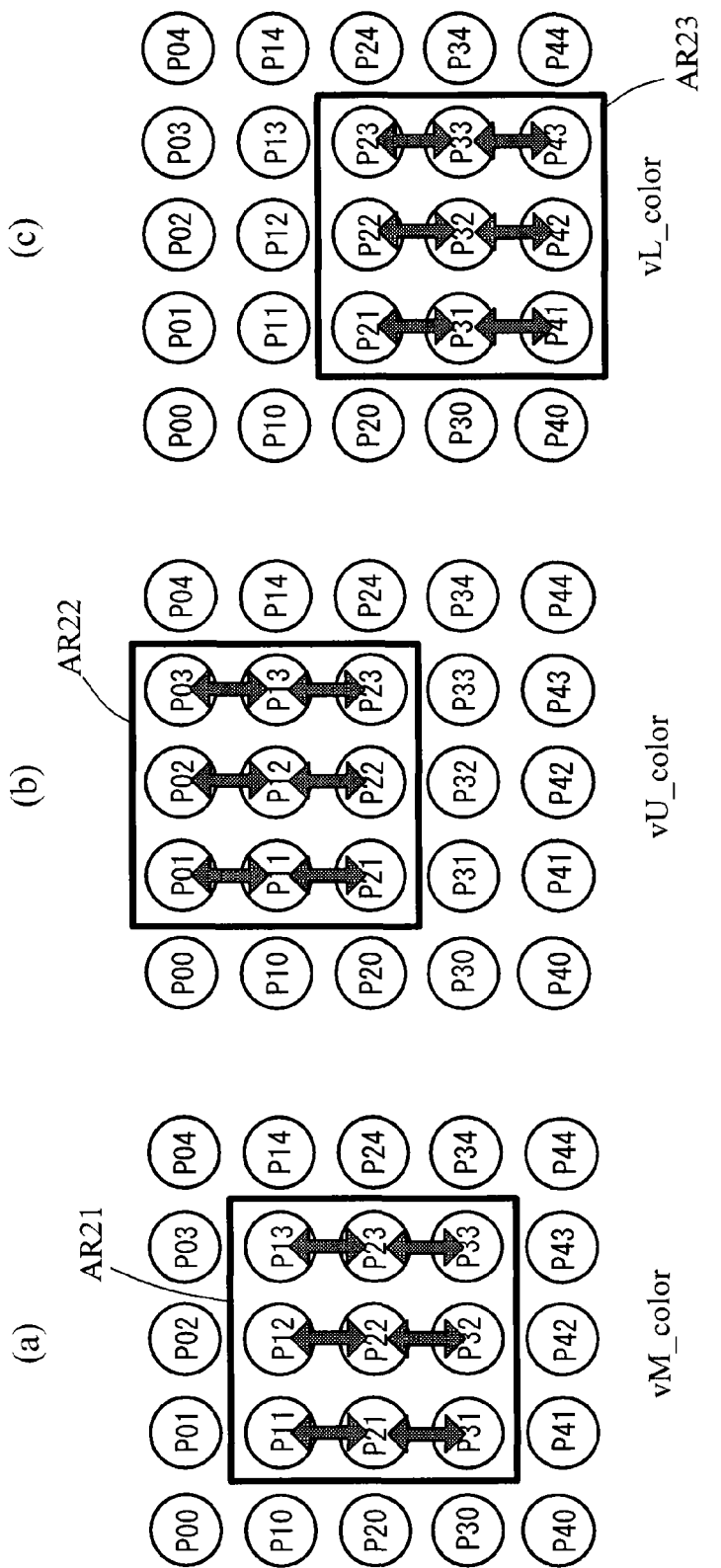
FIGS. 5(a), (b) and (c) are views for describing a process of obtaining a vertical evaluation value.

The saturation evaluation value calculation unit 3 carries out a process expressed by the following equation in an area AR 21 of three pixels by three pixels which includes a pixel P22 as a central pixel as shown in FIG. 5(*a*), to thereby obtain a first vertical evaluation value vM_color.

vM_color =

$(abs(P11 - P21) + abs(P21 - P31) + (abs(P12 - P22) + abs(P22 - P32)) \times$ $2 + abs(P13 - P23) + abs(P23 - P33))/8$ It is noted that the above equation includes a term which is multiplied by a coefficient "two", in order to equalize cumulative ratios of differences between pixels. Five pixels P11, P31, P22, P13, and P33 are pixels for a first color component (W), two pixels P21 and P23 are pixels for a second color component (Ye), and two pixels P12 and P32 are pixels for a third color component (R). Accordingly, the number of operations of "the first-color component pixel minus the second-color component pixel" is "four", and the number of operations of "the first-color component pixel minus the third-color component pixel" is "two". Hence, "(abs(P12−P22)+abs(P22−P32))" is multiplied by "two". It is additionally noted that the coefficient used for multiplication is not limited to "two", and may be another value.

Also, the saturation evaluation value calculation unit 3 carries out a process expressed by the following equation in an area AR22 of three pixels by three pixels which includes a pixel P12 as a central pixel as shown in FIG. 5(*b*), to thereby obtain a second vertical evaluation value vU_color.

vU_color =

$(abs(P01 - P11) + abs(P11 - P21) + (abs(P02 - P12) + abs(P12 - P22)) \times$ $2 + abs(P03 - P13) + abs(P13 - P23))/8$ It is noted the above equation includes a term multiplied by a coefficient, "two" for the same reasons described above regarding the process for obtaining the first vertical evaluation value vM_color.

Further, the saturation evaluation value calculation unit 3 carries out a process expressed by the following equation in an area AR23 of three pixels by three pixels which includes a pixel P32 as a central pixel as shown in FIG. 5(*c*), to thereby obtain a third vertical evaluation value vL_color.

vL_color =

$(abs(P21 - P31) + abs(P31 - P41) + (abs(P22 - P32) + abs(P32 - P42)) \times$ $2 + abs(P23 - P33) + abs(P33 - P43))/8$ It is noted the above equation includes a term multiplied by a coefficient, "two" for the same reasons described above regarding the process for obtaining the first vertical evaluation value vM_color.

The saturation evaluation value calculation unit 3 carries out a process expressed by the following equation on the first, second, and third vertical evaluation values which have been obtained by the above-described processes, to thereby calculate the vertical evaluation value v_color.

v_color=min(vM_color,vU_color,vL_color)

It is additionally noted that the function "min( )", is a function for obtaining the smallest value of elements.

<<(4) Horizontal Evaluation Value h_color>>

Figure 6:
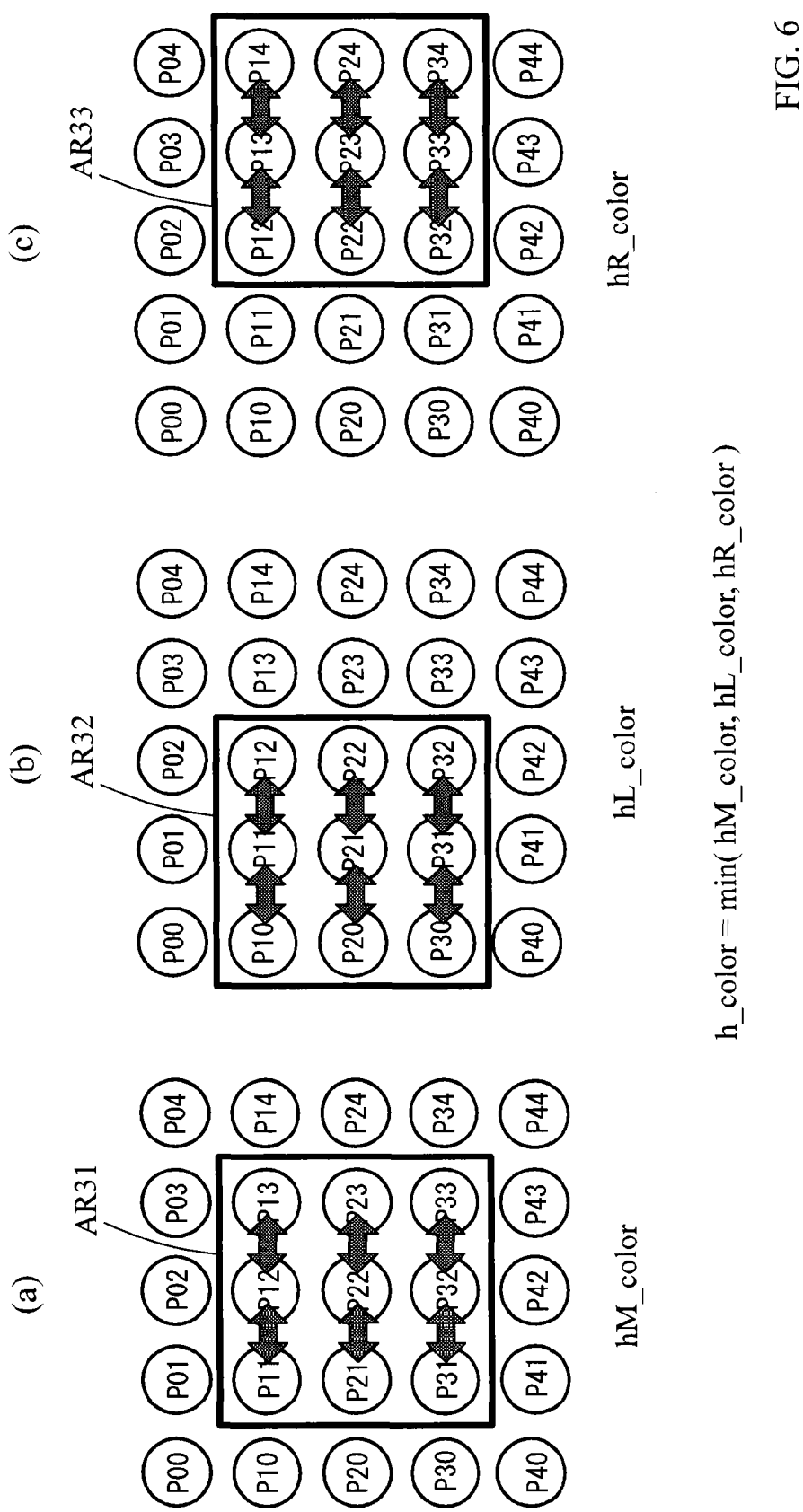
FIGS. 6(a), (b) and (c) are views for describing a process of obtaining a horizontal evaluation value.

Next, a process of calculating the horizontal evaluation value h_color will be described with reference to FIGS. 6(*a*), (*b*), and (*c*).

The saturation evaluation value calculation unit 3 carries out a process expressed by the following equation in an area AR 31 of three pixels by three pixels which includes a pixel P22 as a central pixel as shown in FIG. 6(a), to thereby obtain a first horizontal evaluation value hM_color.

$$hM\_color = \\ (abs(P11-P12)+abs(P12-P13)+(abs(P21-P22)+abs(P22-P23))\times \\ 2+abs(P31-P32)+abs(P32-P33))/8$$

It is noted that the above equation includes a term which is multiplied by a coefficient "two", in order to equalize cumulative ratios of differences between pixels. Five pixels P11, P31, P22, P13, and P33 are pixels for a first color component (W), two pixels P21 and P23 are pixels for a second color component (Ye), and two pixels P12 and P32 are pixels for a third color component (R). Accordingly, the number of operations of "the first-color component pixel minus the third-color component pixel" is "four", and the number of operations of "the first-color component pixel minus the second-color component pixel" is "two". Hence, "(abs(P21−P22)+abs(P22−P23))" is multiplied by "two". It is additionally noted that the coefficient used for multiplication is not limited to "two", and may be another value.

Also, the saturation evaluation value calculation unit 3 carries out a process expressed by the following equation in an area AR32 of three pixels by three pixels which includes a pixel P21 as a central pixel as shown in FIG. 6(b), to thereby obtain a second horizontal evaluation value hL_color.

$$hL\_color = \\ (abs(P10-P11)+abs(P11-P12)+(abs(P20-P21)+abs(P21-P22))\times \\ 2+abs(P30-P31)+abs(P31-P32))/8$$

It is noted the above equation includes a term multiplied by a coefficient, "two" for the same reasons described above regarding the process for obtaining the first horizontal evaluation value hM_color.

Further, the saturation evaluation value calculation unit 3 carries out a process expressed by the following equation in an area AR33 of three pixels by three pixels which includes a pixel P23 as a central pixel as shown in FIG. 6(c), to thereby obtain a third horizontal evaluation value hR_color.

$$hR\_color = \\ (abs(P12-P13)+abs(P13-P14)+(abs(P22-P23)+abs(P23-P24))\times \\ 2+abs(P32-P33)+abs(P33-P34))/8$$

It is noted the above equation includes a term multiplied by a coefficient, "two" for the same reasons described above regarding the process for obtaining the first horizontal evaluation value hM_color.

The saturation evaluation value calculation unit 3 carries out a process expressed by the following equation on the first, second, and third horizontal evaluation values which have been obtained by the above-described processes, to thereby calculate the horizontal evaluation value h_color.

$$h\_color=min(hM\_color,hL\_color,hR\_color)$$

It is additionally noted that the function "min( )", is a function for obtaining the smallest value of elements.

After the above-described processes, the saturation evaluation value calculation unit 3 carries out a process expressed by the following equation, to thereby obtain the saturation evaluation value L.

$$L=min(diff\_ave\_color,v\_color,h\_color)$$

It is additionally noted that the function "min( )", is a function for obtaining the smallest value of elements.

Specifically, the saturation evaluation value calculation unit 3 employs one of the three evaluation values, (1) the average color component difference evaluation value diff_ave_color, (2) the vertical evaluation value v_color, and (3) the horizontal evaluation value h_color, which is the smallest, as the saturation evaluation value L.

Figure 7:
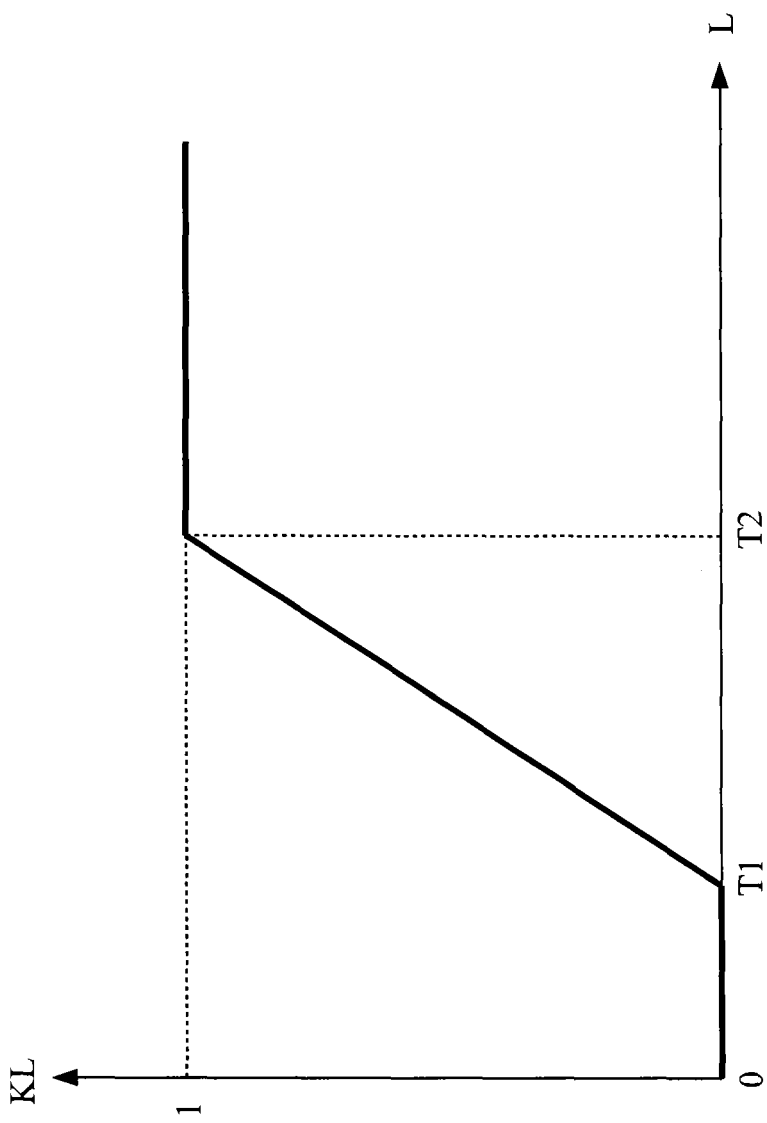
FIG. 7 shows a relationship between a saturation evaluation value L and a saturation evaluation coefficient KL.

The saturation evaluation value calculation unit 3 calculates the saturation evaluation coefficient KL by normalizing the saturation evaluation value L of an observed pixel, which value has been obtained by the above-described processes. FIG. 7 shows an example of input/output characteristics of a function for normalizing the saturation evaluation value L of an observed pixel to calculate the saturation evaluation coefficient KL. The saturation evaluation value calculation unit 3 carries out a process expressed by the following equation using two threshold values T1 and T2, for example, to thereby obtain the saturation evaluation coefficient KL.

KL=f(L), where the function f(x) satisfies:

$$f(x)=0 \text{ when } x \leq T1;$$

$$f(x)=(x-T1)/(T2-T1) \text{ when } T1 \leq x \leq T2; \text{ and}$$

$$f(x)=1 \text{ when } x \geq T2.$$

It is noted that the function f(x) is not limited to the above expressions, and may be any other function that can convert the saturation evaluation value L from zero to one (broadly speaking, such as a function which allows the saturation evaluation coefficient to monotonously increase in proportion to the saturation evaluation value L).

As a result of the above-described processes, the saturation evaluation value L is converted into the saturation evaluation coefficient KL which satisfies "0≤KL≤1".

Moreover, the two threshold values T1 and T2 are set in the neighborhood of a border between a gray-image area (low-saturation image area) and a color-image area (high-saturation image area). Thus, optimum values can be determined based on results of experiments or experiences. However, it is preferable that the threshold values T1 and T2 are variable parameters which vary depending on characteristics of each input image. Characteristics of each input image are determined by conditions for shooting of the image capture apparatus 1000, such as an exposure time and an f number, for example. Also, characteristics of an image sensor (a CCD image sensor or a CMOS image sensor), optical characteristics of lenses, and the like may be taken into account in determining characteristics of each input image.

The saturation evaluation coefficient KL which is calculated by the saturation evaluation value calculation unit 3 in the above-described manner is output to the pixel interpolation method determination unit 5.

(1.2.3 Process of Calculating Color Correlation Value)

Next, a process of calculating a color correlation value will be described.

The color correlation value calculation unit 2 calculates a correlation value for a color-image area (a correlation value for high-saturation image area) for each pixel, based on the image signal D_raw (image D_raw) output from the signal processor unit C2. Details thereof will be now provided.

The color correlation value calculation unit 2 calculates the following four correlation values for a color-image area, with respect to an observed pixel (pixel being processed) on the image D_raw output from the signal processor unit C2.
(A1) A color-image vertical correlation value Cv_color
(A2) A color-image horizontal correlation value Ch_color
(A3) A color-image first diagonal correlation value Cd1_color
(A4) A color-image second diagonal correlation value Cd2_color
Processes of calculating the above-cited correlation values for a color-image area, (A1), (A2), (A3), and (A4) will be described below.

<<(A1) Color-Image Vertical Correlation Value Cv_color>>

First, a process of calculating the color-image vertical correlation value Cv_color will be discussed. The following process of calculating the color-image vertical correlation value Cv_color is common to all color components that a pixel can have.

Figure 8:
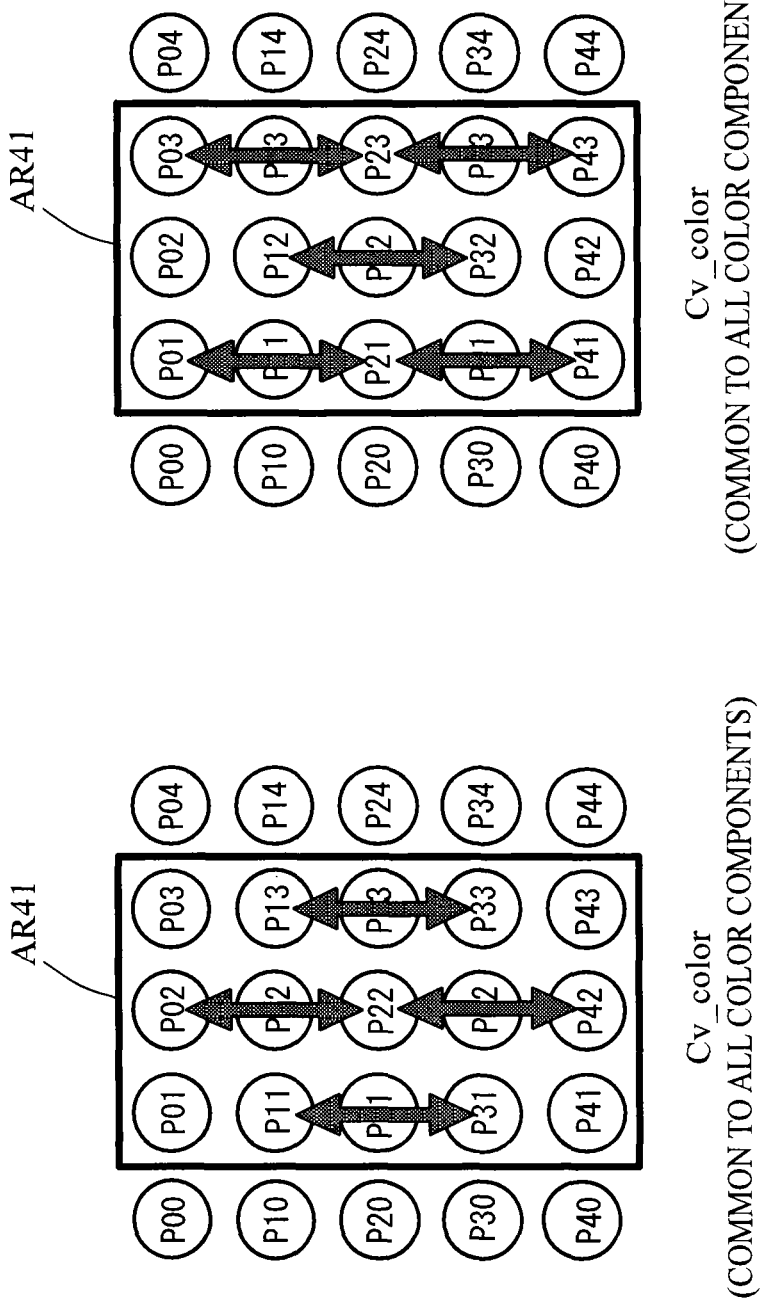
FIG. 8 is a view for describing a process of calculating a color-image vertical correlation value Cv_color.

FIG. 8 is a view for describing the process of calculating the color-image vertical correlation value Cv_color, and shows a matrix area of five pixels by five pixels which centers on a central pixel P22. It is additionally noted that two pixels pointed by arrows in the drawing are pixels on which difference processing is to be carried out.

As shown in FIG. 8, the color correlation value calculation unit 2 calculates an absolute value of a difference in pixel value of each pair of pixels which are vertically adjacent to each other and have the same color in an area AR41 including pixels P01-P03, P11-P13, P21-P23, P31-P33, and P41-P43, and obtains an average (weighted average) of calculated absolute values of differences. In other words, the color correlation value calculation unit 2 carries out a process expressed by the following equations, to thereby obtain the color-image vertical correlation value Cv_color.

$$\text{sum} = \text{abs}(P02 - P22) + \text{abs}(P22 - P42) + \text{abs}(P11 - P31) + \text{abs}(P13 - P33) +$$
$$\text{abs}(P12 - P32) \times 2 + (\text{abs}(P01 - P21) + \text{abs}(P21 - P41) +$$
$$\text{abs}(P03 - P23) + \text{abs}(P23 - P43))/2$$
$$Cv\_color = \text{sum}/8$$

It is noted that in the above equation, "abs(P12–P32)" is multiplied by a coefficient, "two", and "(abs(P01–P21)+abs(P21–P41)+abs(P03–P23)+abs(P23–P43))" is multiplied by a coefficient, "½". Such multiplications are performed in order to conduct weighting in accordance with a distance from the central pixel (distance on an image). Additionally, the coefficients used for multiplications (weighting coefficients) are not limited to the above values, and may be other values.

<<(A2) Color-Image Horizontal Correlation Value Ch_color>>

Next, a process of calculating the color-image horizontal correlation value Ch_color will be discussed with reference to FIG. 9. The following process of calculating the color-image horizontal correlation value Ch_color is common to all color components that a pixel can have.

Figure 9:
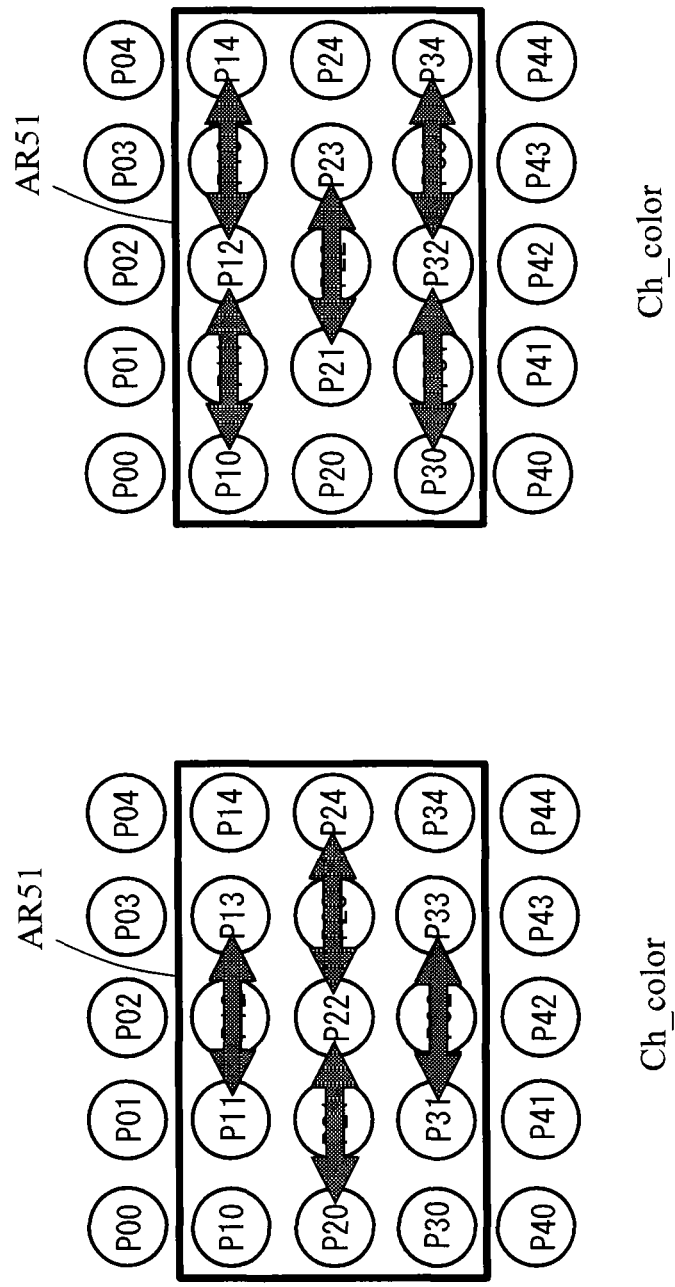
FIG. 9 is a view for describing a process of calculating a color-image horizontal correlation value Ch_color.

FIG. 9 is a view for describing the process of calculating the color-image horizontal correlation value Ch_color, and shows a matrix area of five pixels by five pixels which centers on a central pixel P22. It is additionally noted that two pixels pointed by arrows in the drawing are pixels on which difference processing is to be carried out.

As shown in FIG. 9, the color correlation value calculation unit 2 calculates an absolute value of a difference in pixel value of each pair of pixels which are horizontally adjacent to each other and have the same color in an area AR51 including pixels P10-P14, P20-P24, and P30-P34, and obtains an average (weighted average) of calculated absolute values of differences. In other words, the color correlation value calculation unit 2 carries out a process expressed by the following equations, to thereby obtain the color-image horizontal correlation value Ch_color.

$$\text{sum} =$$
$$\text{abs}(P20 - P22) + \text{abs}(P22 - P24) + \text{abs}(P11 - P13) + \text{abs}(P31 - P33) +$$
$$(\text{abs}(P10 - P12) + \text{abs}(P12 - P14) + \text{abs}(P30 - P32) +$$
$$\text{abs}(P32 - P34))/2 + \text{abs}(P21 - P23) \times 2$$
$$Ch\_color = \text{sum}/8$$

It is noted that in the above equations, "abs(P21–P23)" is multiplied by a coefficient, "two", and "(abs(P10–P12)+abs(P12–P14)+abs(P30–P32)+abs(P32–P34))" is multiplied by a coefficient, "½". Such multiplications are performed in order to conduct weighting in accordance with a distance from the central pixel (distance on an image). Additionally, the coefficients used for multiplications (weighting coefficients) are not limited to the above values, and may be other values.

<<(A3) Color-Image First Diagonal Correlation Value Cd1_color>>

Next, a process of calculating the color-image first diagonal correlation value Cd1_color will be discussed. Mathematical equations used for calculating the color-image first diagonal correlation value Cd1_color vary depending on a color component of an observed pixel.

{Case where a Pixel being Processed is a Second- or Third-Color Component Pixel}

Figure 10:
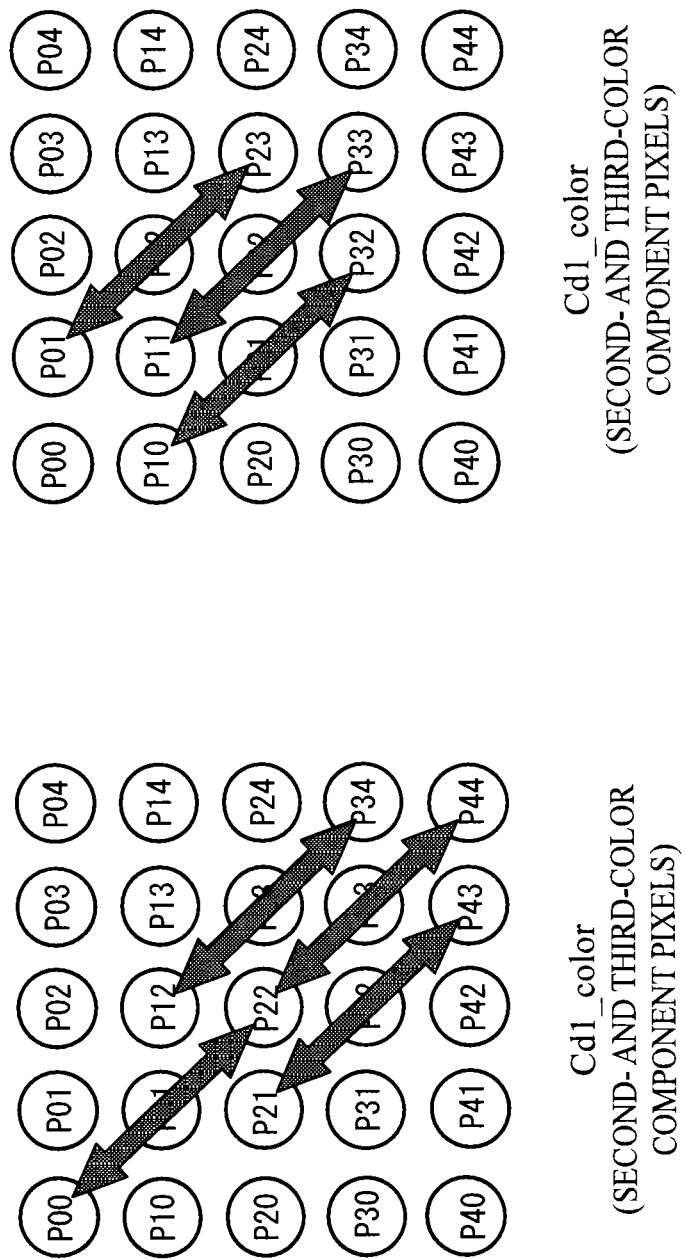
FIG. 10 is a view for describing a process of calculating a color-image first diagonal correlation value Cd1_color in a case where a pixel being processed is a second- or third-color component pixel.

FIG. 10 is a view for describing the process of calculating the color-image first diagonal correlation value Cd1_color in a case where an observed pixel is a second-color component pixel (Ye) or a third-color component pixel (R). FIG. 10 shows a matrix area of five pixels by five pixels which centers on a central pixel P22. It is additionally noted that two pixels pointed by arrows in the drawing are pixels on which difference processing is to be carried out.

As shown in FIG. 10, the color correlation value calculation unit 2 calculates an absolute value of a difference in pixel value of each pair of pixels which are adjacent to each other in a first diagonal direction and have the same color, and obtains an average (weighted average) of calculated absolute values of differences. In other words, the color correlation value calculation unit 2 carries out a process expressed by the following equations, to thereby obtain the color-image first diagonal correlation value Cd1_color.

$$\text{sum} =$$
$$\text{abs}(P00 - P22) + \text{abs}(P22 - P44) + \text{abs}(P12 - P34) + \text{abs}(P21 - P43) +$$
$$\text{abs}(P11 - P33) \times 2 + \text{abs}(P10 - P32) + \text{abs}(P01 - P23)$$
$$Cd1\_color = \text{sum}/8$$

It is noted that in the above equation, "abs(P11–P33)" is multiplied by a coefficient, "two". Such multiplication is performed in order to conduct weighting in accordance with a distance from the central pixel (distance on an image). Additionally, the coefficient used for multiplication (weighting coefficient) is not limited to the above value, and may be another value.

{Case where a Pixel being Processed is a First-Color Component Pixel}

Figure 11:
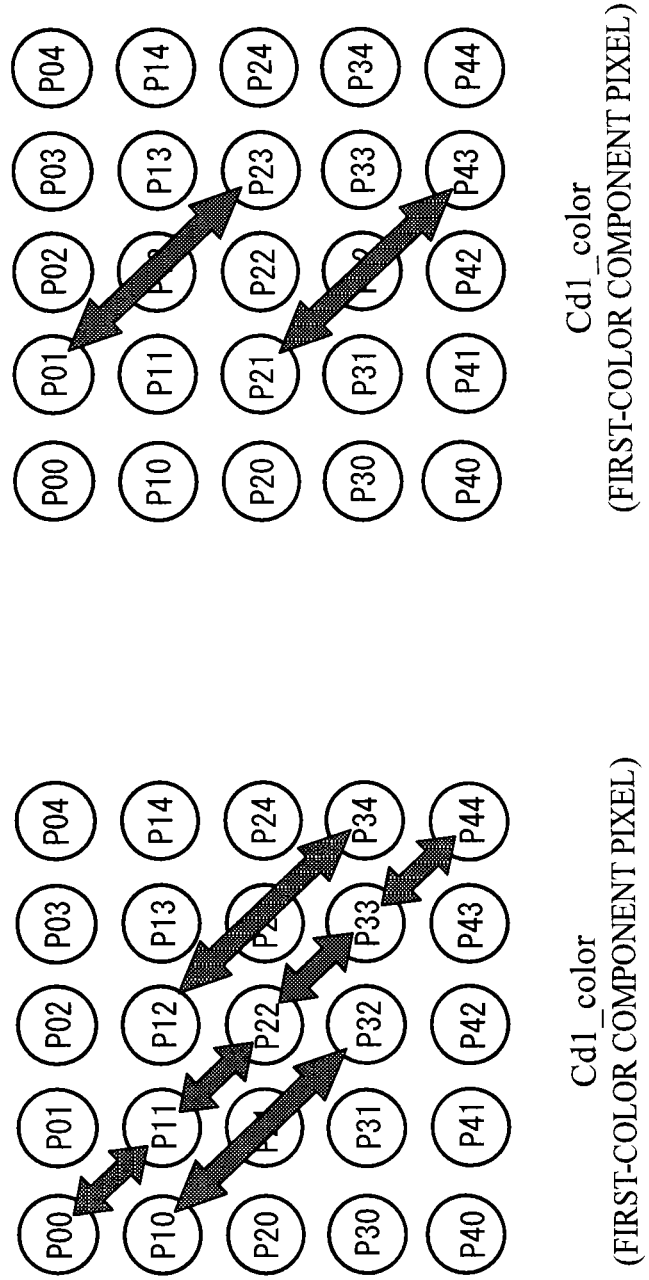
FIG. 11 is a view for describing a process of calculating a color-image first diagonal correlation value Cd1_color in a case where a pixel being processes is a first-color component pixel.

FIG. 11 is a view for describing the process of calculating the color-image first diagonal correlation value Cd1_color in a case where an observed pixel is a first-color component pixel (W). FIG. 11 shows a matrix area of five pixels by five pixels which centers on a central pixel P22. It is additionally noted that two pixels pointed by arrows in the drawing are pixels on which difference processing is to be carried out.

As shown in FIG. 11, the color correlation value calculation unit 2 calculates an absolute value of a difference in pixel value of each pair of pixels which are adjacent to each other in a first diagonal direction and have the same color, and obtains an average (weighted average) of calculated absolute values of differences. In other words, the color correlation value calculation unit 2 carries out a process expressed by the following equations, to thereby obtain the color-image first diagonal correlation value Cd1_color.

$$\text{sum} = \text{abs}(P00 - P11) + (\text{abs}(P11 - P22) + \text{abs}(P22 - P33)) \times 2 +$$
$$\text{abs}(P33 - P44) + \text{abs}(P12 - P34) +$$
$$\text{abs}(P10 - P32) + \text{abs}(P01 - P23) + \text{abs}(P21 - P43)$$
$$\text{Cd1\_color} = \text{sum}/10$$

It is noted that in the above equation, "abs(P11–P22)+abs(P22–P33)" is multiplied by a coefficient, "two". Such multiplication is performed in order to conduct weighting in accordance with a distance from the central pixel (distance on an image). Additionally, the coefficient used for multiplication (weighting coefficient) is not limited to the above value, and may be another value.

<<(A4) Color-Image Second Diagonal Correlation Value Cd2_color>>

Next, a process of calculating the color-image second diagonal correlation value Cd2_color will be discussed. Mathematical equations used for calculating the color-image second diagonal correlation value Cd2_color vary depending on a color component of an observed pixel.

{Case where a Pixel being Processed is a Second- or Third-Color Component Pixel}

Figure 12:
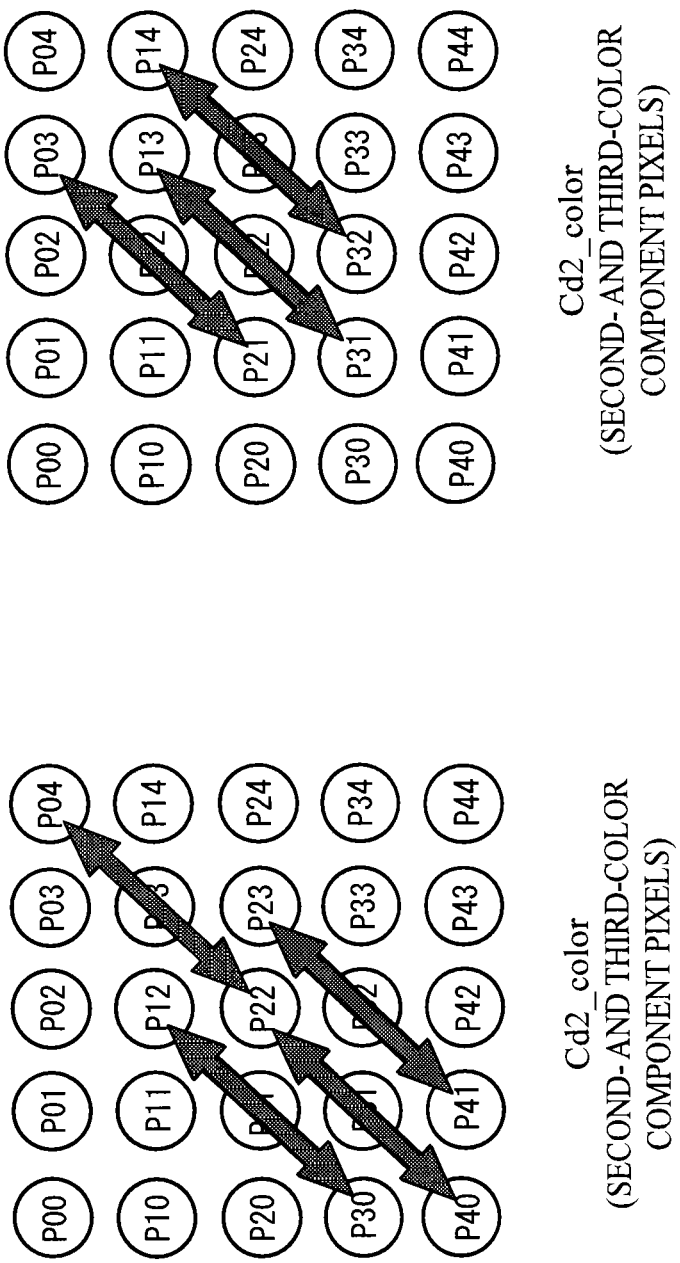
FIG. 12 is a view for describing a process of calculating a color-image second diagonal correlation value Cd2_color in a case where a pixel being processed is a second- or third-color component pixel.

FIG. 12 is a view for describing the process of calculating the color-image second diagonal correlation value Cd2_color in a case where an observed pixel is a second-color component pixel (Ye) or a third-color component pixel (R). FIG. 12 shows a matrix area of five pixels by five pixels which centers on a central pixel P22. It is additionally noted that two pixels pointed by arrows in the drawing are pixels on which difference processing is to be carried out.

As shown in FIG. 12, the color correlation value calculation unit 2 calculates an absolute value of a difference in pixel value of each pair of pixels which are adjacent to each other in a second diagonal direction and have the same color, and obtains an average (weighted average) of calculated absolute values of differences. In other words, the color correlation value calculation unit 2 carries out a process expressed by the following equations, to thereby obtain the color-image second diagonal correlation value Cd2_color.

$$\text{sum} =$$
$$\text{abs}(P04 - P22) + \text{abs}(P22 - P40) + \text{abs}(P12 - P30) + \text{abs}(P23 - P41) +$$
$$\text{abs}(P13 - P31) \times 2 + \text{abs}(P03 - P21) + \text{abs}(P14 - P32)$$
$$\text{Cd2\_color} = \text{sum}/8$$

It is noted that in the above equation, "abs(P13–P31)" is multiplied by a coefficient, "two". Such multiplication is performed in order to conduct weighting in accordance with a distance from the central pixel (distance on an image). Additionally, the coefficient used for multiplication (weighting coefficient) is not limited to the above value, and may be another value.

{Case where a Pixel being Processed is a First-Color Component Pixel}

Figure 13:
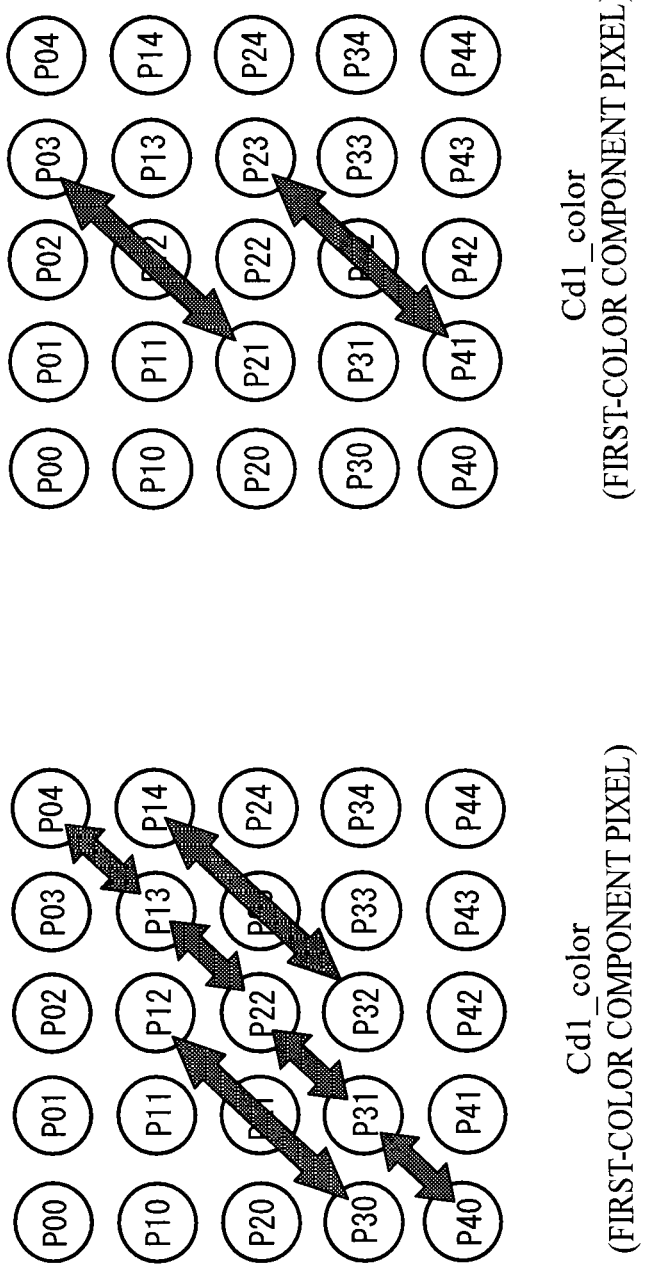
FIG. 13 is a view for describing a process of calculating a color-image second diagonal correlation value Cd2_color in a case where a pixel being processed is a first-color component pixel.

FIG. 13 is a view for describing the process of calculating the color-image second diagonal correlation value Cd2_color in a case where an observed pixel is a first-color component pixel (W). FIG. 13 shows a matrix area of five pixels by five pixels which centers on a central pixel P22. It is additionally noted that two pixels pointed by arrows in the drawing are pixels on which difference processing is to be carried out.

As shown in FIG. 13, the color correlation value calculation unit 2 calculates an absolute value of a difference in pixel value of each pair of pixels which are adjacent to each other diagonally in a second direction and have the same color, and obtains an average (weighted average) of calculated absolute values of differences. In other words, the color correlation value calculation unit 2 carries out a process expressed by the following equations, to thereby obtain the color-image second diagonal correlation value Cd2_color.

$$\text{sum} = \text{abs}(P04 - P13) + (\text{abs}(P13 - P22) + \text{abs}(P22 - P31)) \times 2 +$$
$$\text{abs}(P31 - P40) + \text{abs}(P12 - P30) +$$
$$\text{abs}(P14 - P32) + \text{abs}(P03 - P21) + \text{abs}(P23 - P41)$$
$$\text{Cd2\_color} = \text{sum}/10$$

It is noted that in the above equations, "abs(P13–P22)+abs(P22–P31)" is multiplied by a coefficient, "two". Such multiplication is performed in order to conduct weighting in accordance with a distance from the central pixel (distance on an image). Additionally, the coefficient used for multiplication (weighting coefficient) is not limited to the above value, and may be another value.

As a result of the above-described processes, the four color correlation values calculated by the color correlation value calculation unit 2, (A1) a color-image vertical correlation value Cv_color, (A2) a color-image horizontal correlation value Ch_color, (A3) a color-image first diagonal correlation value Cd1_color, and (A4) a color-image second diagonal correlation value Cd2_color, are output to the pixel interpolation method determination unit 5.

(1.2.4 Process of Calculating a Gray-Image Correlation Value)

Next, a process of calculating a gray-image correlation value will be described.

The gray correlation value calculation unit 4 calculates the following four correlation values for a gray-image area, with respect to an observed pixel (pixel being processed) on the image D1 output from the signal correction unit 1.

(B1) A gray-image vertical correlation value Cv_gray
(B2) A gray-image horizontal correlation value Ch_gray
(B3) A gray-image first diagonal correlation value Cd1_gray
(B4) A gray-image second diagonal correlation value Cd2_gray Processes of calculating the above-cited correlation values for a gray-image area, (B1), (B2), (B3), and (B4) will be described below.

<<(B1) Gray-Image Vertical Correlation Value Cv_gray>>

First, a process of calculating the gray-image vertical correlation value Cv_gray will be discussed, with reference to FIG. 14.

Figure 14:
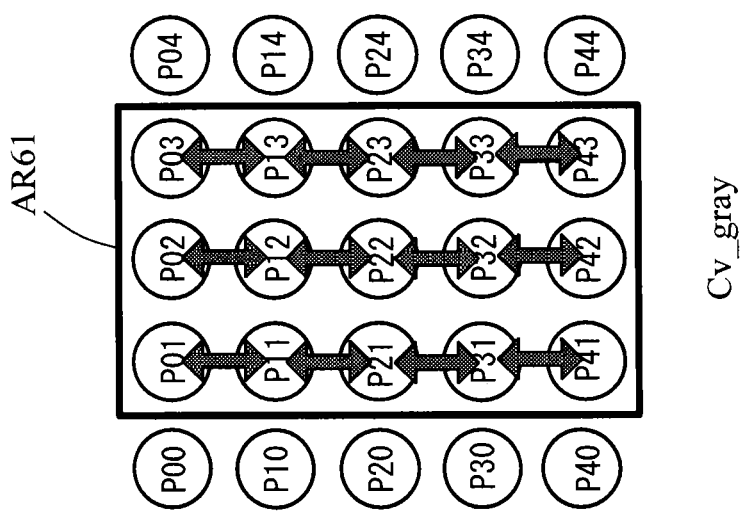
FIG. 14 is a view for describing a process of calculating a gray-image vertical correlation value Cv_gray.

FIG. 14 is a view for describing the process of calculating the gray-image vertical correlation value Cv_gray, and shows a matrix area of five pixels by five pixels which centers on a central pixel P22. It is additionally noted that two pixels pointed by arrows in the drawing are pixels on which difference processing is to be carried out.

As shown in FIG. 14, the gray correlation value calculation unit 4 calculates an absolute value of a difference in pixel value of each pair of pixels which are vertically adjacent to each other in an area AR61 including pixels P01-P03, P11-P13, P21-P23, P31-P33, and P41-P43, and obtains an average of calculated absolute values of differences. In other words, the gray correlation value calculation unit 4 carries out a process expressed by the following equations, to thereby obtain the gray-image vertical correlation value Cv_gray.

$$\text{sum} = \text{abs}(P02 - P12) + \text{abs}(P12 - P22) + \text{abs}(P22 - P32) +$$
$$\text{abs}(P32 - P42) + \text{abs}(P01 - P11) + \text{abs}(P11 - P21) +$$
$$\text{abs}(P21 - P31) + \text{abs}(P31 - P41) + \text{abs}(P03 - P13) +$$
$$\text{abs}(P13 - P23) + \text{abs}(P23 - P33) + \text{abs}(P33 - P43)$$
$$\text{Cv\_gray} = \text{sum}/6$$

<<(B2) Gray-Image Horizontal Correlation Value Ch_gray>>

Next, a process of calculating the gray-image horizontal correlation value Ch_gray will be discussed, with reference to FIG. 15.

Figure 15:
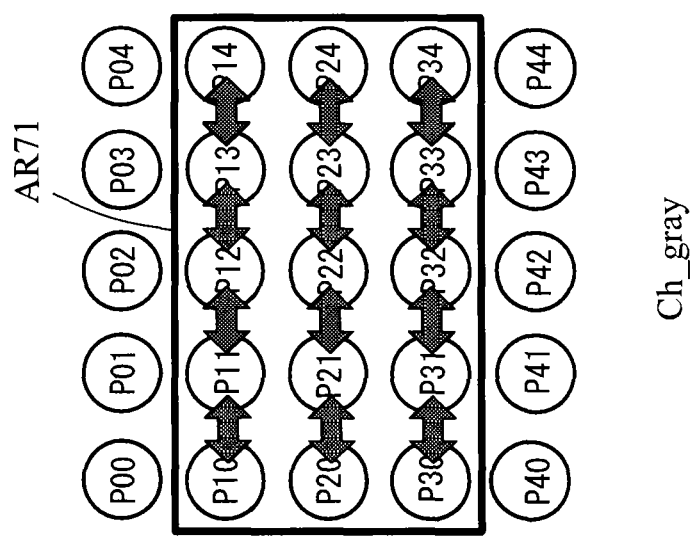
FIG. 15 is a view for describing a process of calculating a gray-image horizontal correlation value Ch_gray.

FIG. 15 is a view for describing the process of calculating the gray-image horizontal correlation value Ch_gray, and shows a matrix area of five pixels by five pixels which centers on a central pixel P22. It is additionally noted that two pixels pointed by arrows in the drawing are pixels on which difference processing is to be carried out.

As shown in FIG. 15, the gray correlation value calculation unit 4 calculates an absolute value of a difference in pixel value of each pair of pixels which are horizontally adjacent to each other in an area A71 including pixels P10-P14, P20-P24, and P30-P34, and obtains an average of calculated absolute values of differences. In other words, the gray correlation value calculation unit 4 carries out a process expressed by the following equations, to thereby obtain the gray-image horizontal correlation value Ch_gray.

$$\text{sum} = \text{abs}(P20 - P21) + \text{abs}(P21 - P22) + \text{abs}(P22 - P23) +$$
$$\text{abs}(P23 - P24) + \text{abs}(P10 - P11) + \text{abs}(P11 - P12) +$$
$$\text{abs}(P12 - P13) + \text{abs}(P13 - P14) + \text{abs}(P30 - P31) +$$
$$\text{abs}(P31 - P32) + \text{abs}(P32 - P33) + \text{abs}(P33 - P34)$$
$$\text{Ch\_gray} = \text{sum}/6$$

<<(B3) Gray-Image First Diagonal Correlation Value Cd1_gray>>

Next, a process of calculating the gray-image first diagonal correlation value Cd1_gray will be discussed, with reference to FIG. 16.

Figure 16:
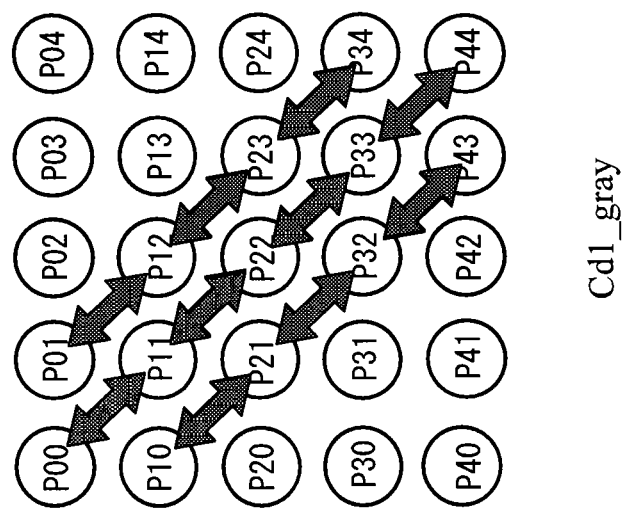
FIG. 16 is a view for describing a process of calculating a gray-image first diagonal correlation value Cd1_gray.

FIG. 16 is a view for describing the process of calculating the gray-image first diagonal correlation value Cd1_gray, and shows a matrix area of five pixels by five pixels which centers on a central pixel P22. It is additionally noted that two pixels pointed by arrows in the drawing are pixels on which difference processing is to be carried out.

As shown in FIG. 16, the gray correlation value calculation unit 4 calculates an absolute value of a difference in pixel value of each pair of pixels which are adjacent to each other in a first diagonal direction, and obtains an average of calculated absolute values of differences. In other words, the gray correlation value calculation unit 4 carries out a process expressed by the following equations, to thereby obtain the gray-image first diagonal correlation value Cd1_gray.

$$\text{sum} = \text{abs}(P00 - P11) + \text{abs}(P11 - P22) + \text{abs}(P22 - P33) +$$
$$\text{abs}(P33 - P44) + \text{abs}(P10 - P21) + \text{abs}(P21 - P32) +$$
$$\text{abs}(P32 - P43) + \text{abs}(P01 - P12) + \text{abs}(P12 - P23) + \text{abs}(P23 - P34)$$
$$\text{Cd1\_gray} = \text{sum}/5$$

<<(B4) Gray-Image Second Diagonal Correlation Value Cd2_gray>>

Next, a process of calculating the gray-image second diagonal correlation value Cd2_gray will be discussed, with reference to FIG. 17.

Figure 17:
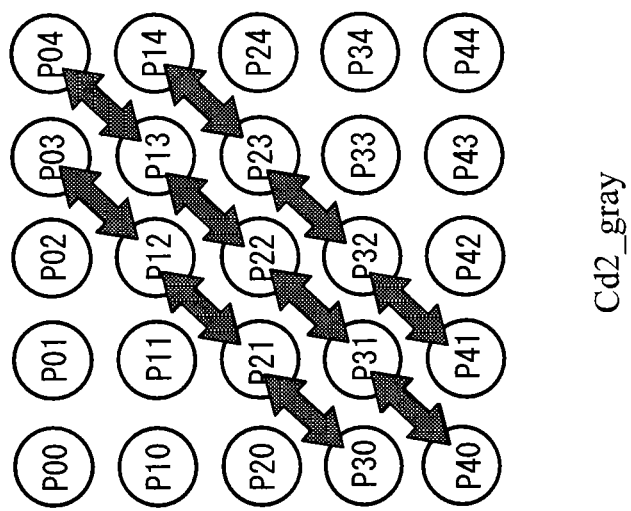
FIG. 17 is a view for describing a process of calculating a gray-image second diagonal correlation value Cd2_gray.

FIG. 17 is a view for describing the process of calculating the gray-image second diagonal correlation value Cd2_gray, and shows a matrix area of five pixels by five pixels which centers on a central pixel P22. It is additionally noted that two pixels pointed by arrows in the drawing are pixels on which difference processing is to be carried out.

As shown in FIG. 17, the gray correlation value calculation unit 4 calculates an absolute value of a difference in pixel value of each pair of pixels which are adjacent to each other in a second diagonal direction, and obtains an average of calculated absolute values of differences. In other words, the gray correlation value calculation unit 4 carries out a process expressed by the following equations, to thereby obtain the gray-image second diagonal correlation value Cd2_gray.

$$\text{sum} = \text{abs}(P04 - P13) + \text{abs}(P13 - P22) + \text{abs}(P22 - P31) +$$
$$\text{abs}(P31 - P40) + \text{abs}(P03 - P - 12) + \text{abs}(P12 - P21) +$$
$$\text{abs}(P21 - P30)\text{abs}(P14 - P23) + \text{abs}(P23 - P32) + \text{abs}(P32 - P41)$$
$$\text{Cd2\_gray} = \text{sum}/5$$

Additionally, a distance between pixels on which difference processing is to be carried out in the processes shown in FIGS. 14 and 15 (the process of calculating the gray-image vertical correlation value and the process of calculating the gray-image horizontal correlation value) is different from that in the processes shown in FIGS. 16 and 17 (the process calculating the gray-image first diagonal correlation value and the process of calculating a gray-image second diagonal correlation value). Nonetheless, in the above description, a multiplication using a coefficient which is set considering a distance between pixels is not performed. This is because a difference in a distance between pixels does not greatly vary. However, the above-described processes (the processes of calculating the gray-image correlation value) may include a process of assigning some weights to a difference in pixel value in accordance with a distance between pixels, for example (a difference in pixel value may be multiplied by a square root of "two", for example).

Further, the same scaling as used in the processes of calculating the correlation values for a color-image area are used in the process of calculating the correlation values for a gray-image area, in order to facilitate comparison. That is, a distance between pixels for which calculation is performed in FIGS. 14, 15, 16, and 17 is equal to a distance between pixels adjacent to each other. Accordingly, in the above-cited mathematical equations for calculating the correlation values for a gray-image area, each of differences in pixel value is multiplied by "two", to use the same scaling. As a result, a value ("⅙","⅕") which is the last value and is used for multiplication in each of the mathematical expressions for calculating the correlation values for a gray-image area is equal to a double of a value of a reciprocal of the cumulative number. However, the same scaling is not necessarily required because a correlation direction in a gray-image area is determined using only correlation values for a gray-image area.

In the above-described manner, the correlation values for a gray-image area (Cv_gray, Ch_gray, Cd1_gray, and Cd2_gray) which are obtained by the gray correlation value calculation unit 4 are output to the pixel interpolation method determination unit 5.

(1.2.5 Processes in Pixel Interpolation Method Determination Unit 5)

<<Selection of Correlation Determination Method and Pixel Interpolation Method>>

The pixel interpolation method determination unit 5 selects a correlation determination method and a pixel interpolation method for each pixel, based on a relationship between the saturation evaluation coefficient KL calculated by the saturation evaluation value calculation unit 3 and threshold values TH1 and TH2 (TH1≤TH2).

More specifically, selection of a correlation determination method is to select one of (1) determination of a correlation direction using the correlation values for a gray-image area, (2) determination of a correlation direction using the correlation values for a color-image area, and (3) determination of a correlation direction using the correlation values which are chosen, considering all the correlation values for a gray-image area and a color-image area.

Also, selection of a pixel interpolation method is to select either a pixel interpolation method for a gray-image area or a pixel interpolation method for a color-image area.

Figure 18:
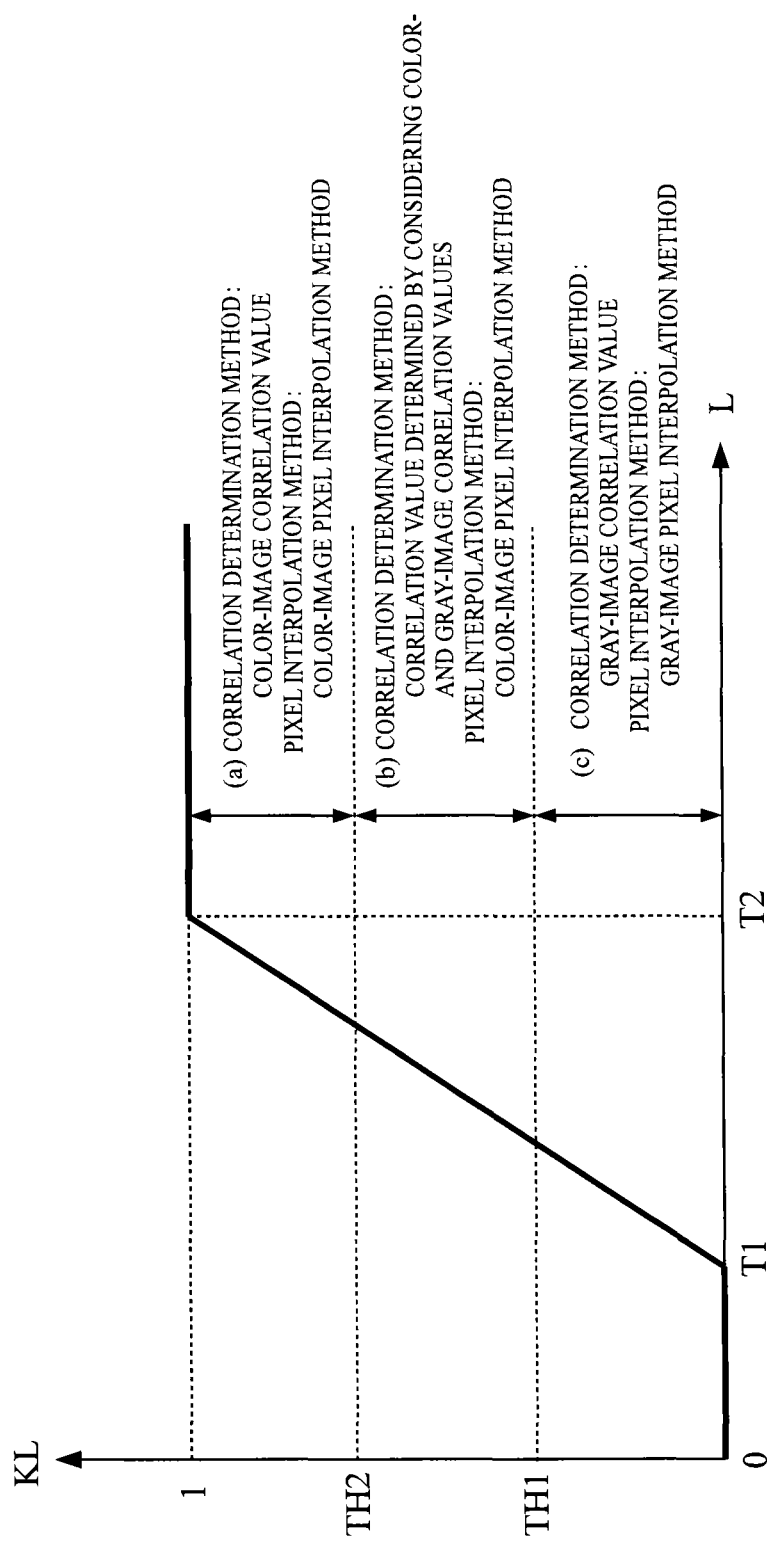
FIG. 18 is a view for showing classification of correlation determination methods and pixel interpolation methods which are selected according to a relationship between the saturation evaluation coefficient KL and the threshold values TH1 and TH2.

FIG. 18 shows classification of correlation determination methods and pixel interpolation methods which are selected depending on a relationship between the saturation evaluation coefficient KL and the threshold values TH1 and TH2. More specifically, the correlation determination methods and the pixel interpolation methods are classified into the following combinations (a), (b), and (c), as shown in FIG. 18.

First, (a) in a case of KL>TH2, a correlation direction is determined using the correlation values for a color-image area, and a pixel interpolation method for a color-image area is employed. Secondly, (b) in a case of TH1<KL≤TH2, a correlation direction is determined using the correlation values which are chosen, considering all the correlation values for a color-image area and a gray-image area, and a pixel interpolation method for a color-image area is employed. Thirdly, (c) in a case of KL≤TH1, a correlation direction is determined using the correlation values for a gray-image area, and a pixel interpolation method for a gray-image area is employed.

In the above-described manner, information about a pixel interpolation method which is determined for each pixel is output from the pixel interpolation method determination unit 5 to the interpolation unit 6.

(1.2.5.1 Process of Determining a Correlation Direction)

<<Selection of a Correlation Value for Determination>>

The pixel interpolation method determination unit 5 selects correlation values for determination Cv, Ch, Cd1 and Cd2 from (1) the four-direction correlation values for a color-image area Cv_color, Ch_color, Cd1_color, and Cd2_color which are calculated by the color correlation value calculation unit 2, and (2) the four-direction correlation values for a gray-image area Cv_gray, Ch_gray, Cd1_gray, and Cd2_gray which are calculated by the gray correlation value calculation unit 4, as follows. It is noted that the correlation values for determination are used for determining a correlation direction (a correlation direction which is referred to in carrying out a pixel interpolation process) of an observed pixel (pixel being processed).

(a) Correlation Value for Determination in a Case of KL>TH2

In this case, the pixel interpolation method determination unit 5 employs the correlation values for a color-image area as the correlation values for determination Cv, Ch, Cd1, and Cd2. In other words, the pixel interpolation method determination unit 5 determines that:

$Cv=Cv\_color;$ $Ch=Ch\_color;$ $Cd1=Cd1\_color;$ and $Cd2=Cd2\_color.$ (c) Correlation Value for Determination in a Case of KL≤TH1

In this case, the pixel interpolation method determination unit 5 employs the correlation values for a gray-image area as the correlation values for determination Cv, Ch, Cd1, and Cd2. In other words, the pixel interpolation method determination unit 5 determines that:

$Cv=Cv\_gray;$ $Ch=Ch\_gray;$ $Cd1=Cd1\_gray;$ and $Cd2=Cd2\_gray.$ (b) Correlation Value for Determination in a Case of TH<KL≤TH2

In this case, the pixel interpolation method determination unit 5 determines the correlation values Cv, Ch, Cd1, and Cd2, considering all the correlation values for a gray-image area and a color-image area. A process of determining the correlation values for determination Cv, Ch, Cd1, and Cd2 at that time will be discussed below with reference to flow charts of FIGS. 19 and 20.

Figure 19:
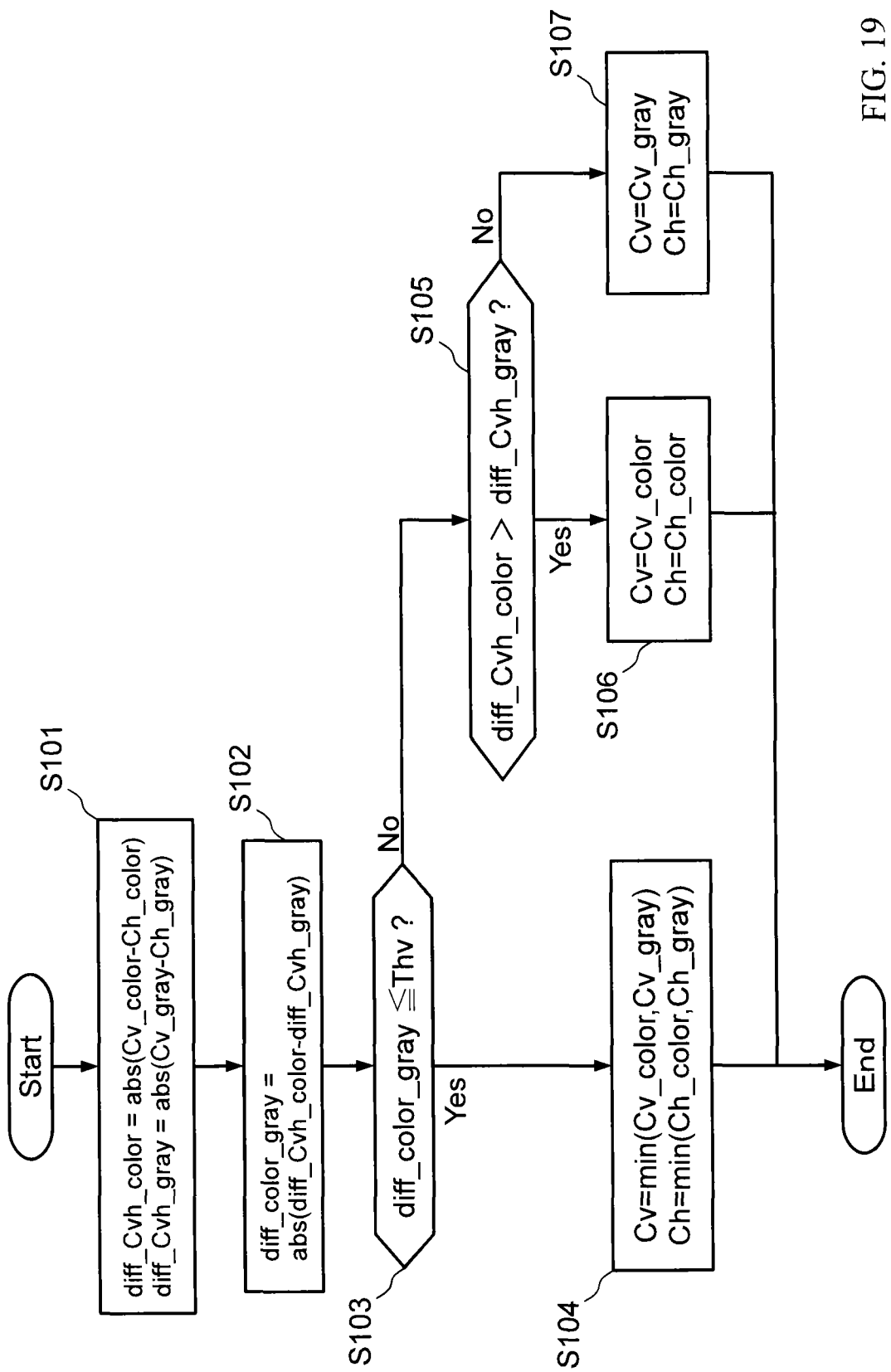
FIG. 19 is a flow chart showing processes for determining correlation values for determination Cv and Ch.

First, a process of determining the correlation values for determination Cv and Ch will be discussed with reference to the flow chart of FIG. 19.

(S101)

In a step S101, the pixel interpolation method determination unit 5 calculates an absolute value of a difference diff_Cvh_color between the color-image correlation values Cv_color and Ch_color, as expressed by the following equation.

$$\text{diff\_}Cvh\text{\_color}=abs(Cv\text{\_color}-Ch\text{\_color})$$

Also, the pixel interpolation method determination unit 5 calculates an absolute value of difference diff_Cvh_gray between the gray-image correlation values Cv_gray and Ch_gray, as expressed by the following equation.

$$\text{diff\_}Cvh\text{\_gray}=abs(Cv\text{\_gray}-Ch\text{\_gray})$$

(S102)

In a step S102, the pixel interpolation method determination unit 5 calculates an absolute value of a difference diff_color_gray between the absolute value of a difference diff_Cvh_color and the absolute value of difference diff_Cvh_gray, by the following equation.

$$\text{diff\_color\_gray}=abs(\text{diff\_}Cvh\text{\_color}-\text{diff\_}Cvh\text{\_gray})$$

(S103)

In a step S103, the pixel interpolation method determination unit 5 determines whether the absolute value of difference diff_color_gray calculated in the step S102 is smaller than, equal to, or larger than a threshold value Thv.

Then, if "diff_color_gray≤Thv" is satisfied, the pixel interpolation method determination unit 5 goes to a step S104. Otherwise, the pixel interpolation method determination unit 5 goes to a step S105.

(S104)

In a step S104, the pixel interpolation method determination unit 5 carries out a process expressed by the following equations, to thereby obtain the correlation values for determination Cv and Ch.

$$Cv=\min(Cv\text{\_color},Cv\text{\_gray})$$

$$Ch=\min(Ch\text{\_color},Ch\text{\_gray})$$

It is noted that "min( )" is a function for obtaining the smallest value of elements.

(S105, S106, and S107)

In a step S105, the pixel interpolation method determination unit 5 determines whether the absolute value of difference diff_Cvh_color is smaller than, equal to, or larger than the absolute value of difference diff_Cvh_gray.

Then, if "diff_Cvh_color>diff_Cvh_gray" is satisfied, the pixel interpolation method determination unit 5 determines that:

$$Cv=Cv\text{\_color; and}$$

$$Ch=Ch\text{\_color (step S106)}.$$

On the other hand, if "diff_Cvh_color>diff_Cvh_gray" is not satisfied, the pixel interpolation method determination unit 5 determines that:

$$Cv=Cv\text{\_gray; and}$$

$$Ch=Ch\text{\_gray (step S107)}.$$

As a result of the above-described processes, the pixel interpolation method determination unit 5 selects (determines) the correlation values for determination Cv and Ch.

In the above-described process, the case where the absolute value of difference diff_color_gray is equal to or smaller than the threshold value Thv occurs when a difference between the absolute value of difference diff_Cvh_color and the absolute value of difference diff_Cvh_gray is small. Thus, it is considered that the conditions for allowing occurrence of the foregoing case are met in a situation where there is no strong correlation in any of a vertical direction and a horizontal direction.

In the foregoing situation, the pixel interpolation method determination unit 5 compares the correlation value for a gray-image area and the correlation value for a color-image area in magnitude with respect to each of a vertical direction and a horizontal direction, and selects a smaller one of the correlation values, i.e., a correlation value indicating stronger correlation (step S104).

Also, in the above-described process, the case where the absolute value of difference diff_color_gray is larger than the threshold value Thv occurs when a difference between the absolute value of difference diff_Cvh_color and the absolute value of difference diff_Cvh_gray is large. Thus, it is considered that the conditions for allowing occurrence of the foregoing case are met in a situation where there is strong correlation in either a vertical direction or a horizontal direction.

In the foregoing situation, the pixel interpolation method determination unit 5 compares the absolute value of difference diff_Cvh_color and the absolute value of difference diff_Cvh_gray in magnitude, and selects one of the correlation values, which is related to a larger absolute value of difference (steps S105, S106, and S107).

Figure 20:
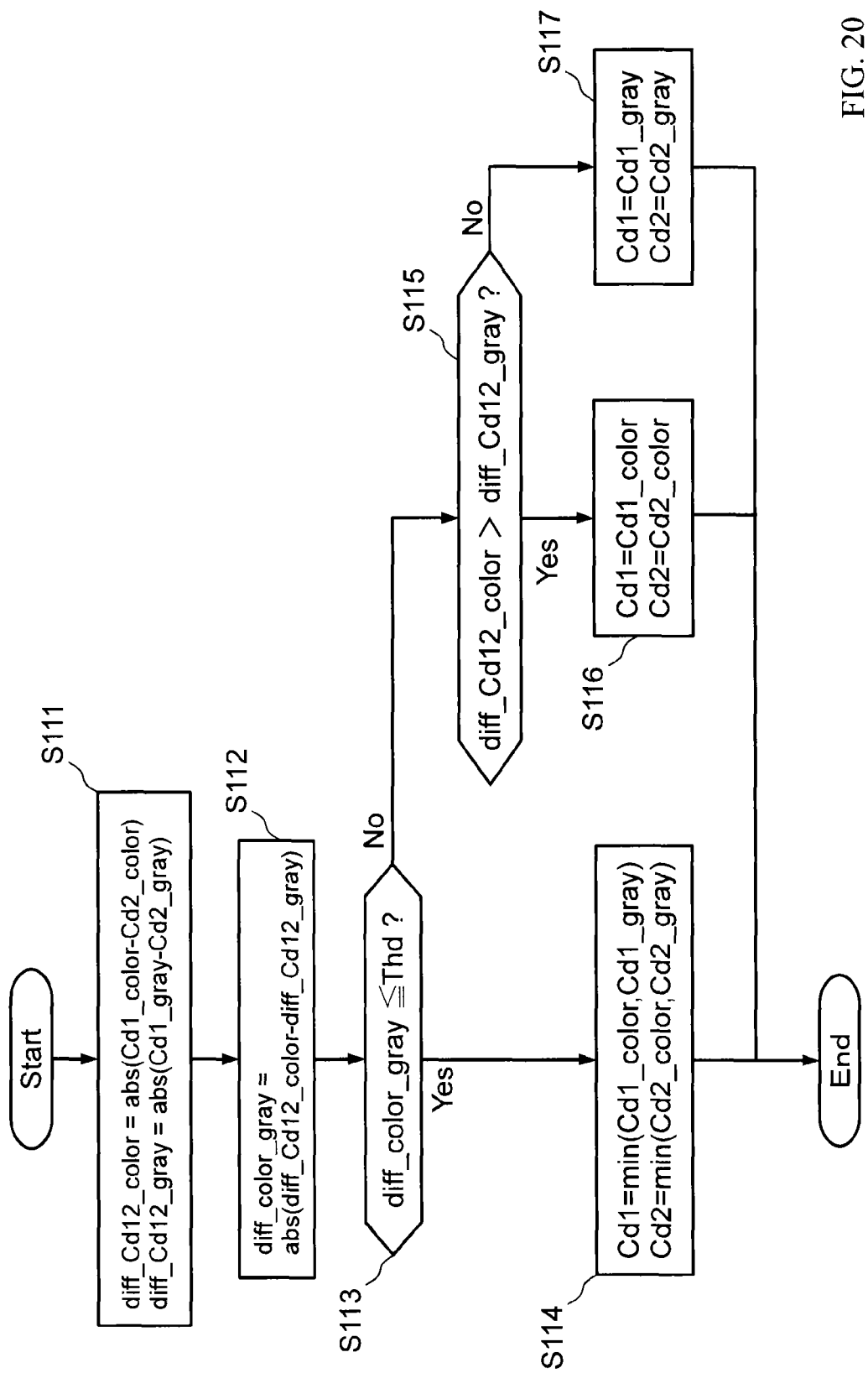
FIG. 20 is a flow chart showing processes for determining correlation values for determination Cd1 and Cd2.

Next, a method of determining the correlation values for determination Cd1 and Cd2 will be described below with reference to a flow chart of FIG. 20.

(S111)

In a step S111, the pixel interpolation method determination unit 5 calculates an absolute value of difference diff_Cd12_color between the correlation values for a color-image area Cd1_color and Cd2_color, as expressed by the following equation.

$$\text{diff\_}Cd12\text{\_color}=abs(Cd1\text{\_color}-Cd2\text{\_color})$$

Also, the pixel interpolation method determination unit 5 calculates an absolute value of difference diff_Cd12_gray between the correlation values for a gray-image area Cd1_gray and Cd2_gray, as expressed by the following equation.

$$\text{diff\_}Cd12\text{\_gray}=abs(Cd1\text{\_gray}-Cd2\text{\_gray})$$

(S112)

In a step S112, the pixel interpolation method determination unit 5 calculates an absolute value of difference diff_color_gray between the absolute value of difference diff_Cd12_color and the absolute value of difference diff_Cd12_gray, by the following equation.

$$\text{diff\_color\_gray}=abs(\text{diff\_}Cd12\text{\_color}-\text{diff\_}Cd12\text{\_gray})$$

(S113)

In a step S113, the pixel interpolation method determination unit 5 determines whether the absolute value of difference diff_color_gray which is calculated in the step S112 is smaller than, equal to, or larger than a threshold value Thd.

Then, if "diff_color_gray≤Thd" is satisfied, the pixel interpolation method determination unit 5 goes to a step S114. Otherwise, the pixel interpolation method determination unit 5 goes to a step S115.

(S114)

In the step S114, the pixel interpolation method determination unit 5 carries out processes expressed by the following equations, to thereby obtain the correlation values for determination Cd1 and Cd2.

$$Cd1 = \min(Cd1\_color, Cd1\_gray)$$

$$Cd2 = \min(Cd2\_color, Cd2\_gray)$$

It is noted that "min( )" is a function for obtaining the smallest value of elements.

(S115, S116, and S117)

In the step S115, the pixel interpolation method determination unit 5 determines whether the absolute value of difference diff_Cd12_color is smaller than, equal to, or larger than the absolute value of difference diff_Cd12_gray.

Then, if "diff_Cd12_color>diff_Cd12_gray" is satisfied, the pixel interpolation method determination unit 5 determines that:

$$Cd1 = Cd1\_color; \text{ and}$$

$$Cd2 = Cd2\_color \text{ (step S116)}.$$

On the other hand, if "diff_Cd12_color>diff_Cd12_gray" is not satisfied, the pixel interpolation method determination unit 5 determines that:

$$Cd1 = Cd1\_gray; \text{ and}$$

$$Cd2 = Cd2\_gray \text{ (step S117)}.$$

As a result of the above-described processes, the pixel interpolation method determination unit 5 selects (determines) the correlation values for determination Cd1 and Cd2.

In the above-described processes, the case where the absolute value of difference diff_color_gray is equal to or smaller than the threshold value Thd occurs when a difference between the absolute value of difference diff_Cd12_color and the absolute value of difference diff_Cd12_gray is small. Thus, it is considered that the conditions for allowing occurrence of the foregoing case are met in a situation where there is no strong correlation in any of a first diagonal direction and a second diagonal direction.

In the foregoing situation, the pixel interpolation method determination unit 5 compares the correlation value for a gray-image area and the correlation value for a color-image area in magnitude with respect to each of a first diagonal direction and a second diagonal direction, and selects a smaller one of the correlation values, i.e., a correlation value indicating stronger correlation (step S114).

Also, in the above-described processes, the case where the absolute value of difference diff_color_gray is larger than the threshold value Thd occurs when a difference between the absolute value of difference diff_Cd12_color and the absolute value of difference diff_Cd12_gray is large. Thus, it is considered that the conditions for allowing occurrence of the foregoing case are met in a situation where there is strong correlation in either a first diagonal direction or a second diagonal direction.

In the foregoing situation, the pixel interpolation method determination unit 5 compares the absolute value of difference diff_Cd12_color and the absolute value of difference diff_Cd12_gray in magnitude, and selects one of the correlation values, which is related to a larger absolute value of difference (steps S115, S116, and S117).

As a result of the above-described processes, the pixel interpolation method determination unit 5 determines the correlation values for determination Cv, Ch, Cd1, and Cd2 (correlation values for determination in a case of TH1<KL≤TH2), considering all the correlation values for a gray-image area and a color-image area.

The pixel interpolation method determination unit 5 performs the above-described operations, to thereby select (determine) the correlation values for determination Cv, Ch, Cd1, and Cd2 in each of the above-cited cases (a), (b), and (c).

As described above, various combinations of a correlation determination method and a pixel interpolation method in the first preferred embodiment are classified into three patterns according to a relationship between the saturation evaluation coefficient KL and the threshold values TH1 and TH2. That is, determination of whether it is a gray-image area (low-saturation image area) or a color-image area (high-saturation image area) with a single threshold value being set is not made. Instead, the two threshold values TH1 and TH2 are set, so that drastic change in pixel interpolation method in a border between a gray-image area and a color-image area can be eased. This makes it possible to effectively suppress occurrence of a sense of visual discomfort especially in an image area in the neighborhood of a border between a gray-image area and a color-image area on an image on which a pixel interpolation process has been carried out.

More specifically, in an image area in the neighborhood of a border between a gray-image area and a color-image area, while respective values of R, G, and B color components are almost equal to one another, more or less variation in value is found. Hence, there are two possible ways in determining a correlation direction. First, paying attention to the fact that variation among the respective values of R, G, and B color components is small, a correlation value is calculated using pixels which are as close to each other as possible, irrespective of what color component each of the pixels has. Secondly, paying attention to the fact that more or less variation among the respective values of R, G, and B color component is found, a correlation value is calculated with R, G, and B being distinguished from one another. Then, considering both of the two possible ways, an optimum correlation value is selected, so that accuracy in determination of a correlation direction can be enhanced. In contrast thereto, if variation among the respective values of R, G, and B color components is neglected and pixel interpolation is performed while treating an image area being processed as a gray-image area, a false color would probably be caused. In view of this, the image capture apparatus 1000 is designed so as to carry out a pixel interpolation process for a color-image area when pixel interpolation is required.

It is additionally stated that in the first preferred embodiment, the saturation evaluation coefficient KL obtained by normalizing the saturation evaluation value L is used, and determination of whether it is a gray-image area or a color-image area is made by comparison between the saturation evaluation coefficient KL and the threshold values TH1 and TH2. However, such manner is employed for the sake of convenience in processes. In essence, determination of whether it is a gray-image area or a color-image area is made by comparison between the saturation evaluation value L and the threshold values TH1 and TH2.

<<Processes for Determining a Correlation Direction in Each Pixel>>

Figure 21:
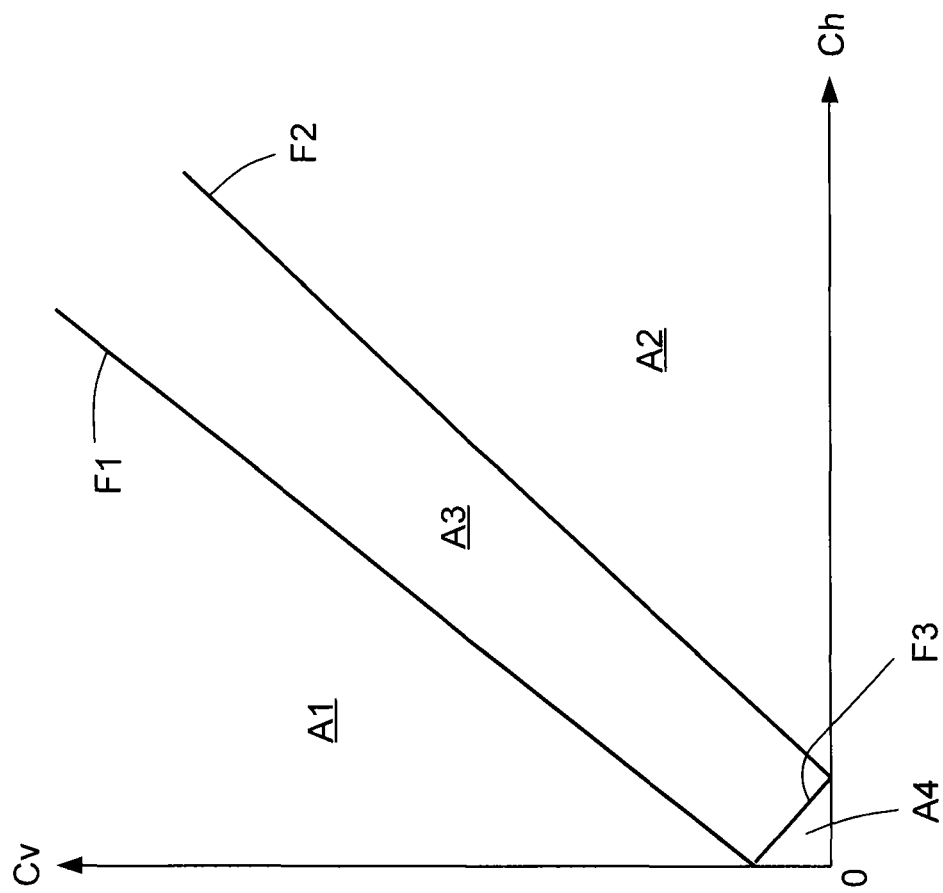
FIG. 21 is a graph showing relationship, for determining a correlation direction based on the correlation values for determination Cv and Ch.
Figure 22:
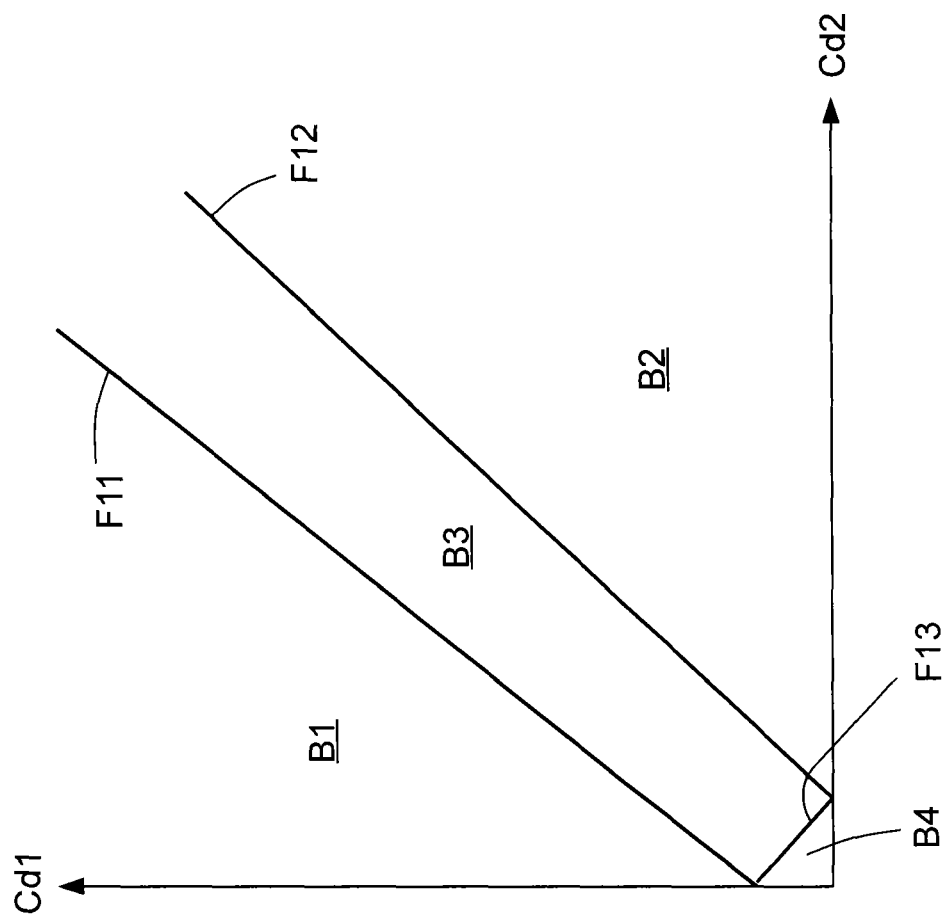
FIG. 22 is a graph showing relationship, for determining a correlation direction based on the correlation values for determination Cd1 and Cd2.

Next, the pixel interpolation method determination unit 5 determines a correlation direction for each pixel using a graph of FIG. 21 or FIG. 22 which shows a relationship, based on the correlation values for determination Cv, Ch, Cd1, and Cd2 which are obtained by the above-described processes.

FIG. 21 is a graph showing a relationship between the correlation values for determination Cv and Ch and correlation-direction determination areas A1, A2, A3, and A4. In FIG. 21, a lateral axis (X axis) represents the correlation value for determination Ch, and a longitudinal axis (Y axis) represents the correlation value for determination Cv. Also, as shown in FIG. 21, the correlation-direction determination areas A1, A2, A3, and A4 are defined by straight lines F1, F2, and F3. Specifically, the correlation-direction determination area A1 is surrounded by the Y axis and the straight line F1, the correlation-direction determination area A2 is surrounded by the X axis and the straight line F2, the correlation-direction determination area A3 is surrounded by the straight lines F1, F2, and F3, and the correlation-direction determination area A4 is surrounded by the X axis, the Y axis, and the straight line F3.

FIG. 22 is a graph showing a relationship between the correlation values for determination Cd1 and Cd2 and correlation-direction determination areas B1, B2, B3, and B4. In FIG. 22, a lateral axis (X axis) represents the correlation value for determination Cd2, and a longitudinal axis (Y axis) represents the correlation value for determination Cd1. Also, as shown in FIG. 22, the correlation-direction determination areas B1, B2, B3, and B4 are defined by straight lines F11, F12, and F13. Specifically, the correlation-direction determination area B1 is surrounded by the Y axis and the straight line F11, the correlation-direction determination area B2 is surrounded by the X axis and the straight line F12, the correlation-direction determination area B3 is surrounded by the straight lines F11, F12, and F13, and the correlation-direction determination area B4 is surrounded by the X axis, the Y axis, and the straight line F13.

The pixel interpolation method determination unit 5 determines a correlation direction by the following ways (1) and (2) for each pixel, using the graph in FIG. 21 or 22, based on the correlation values for determination Cv, Ch, Cd1, and Cd2.

(1) The pixel interpolation method determination unit 5 compares the four correlation values for determination Cv, Ch, Cd1, and Cd2, for each pixel. Then, if the correlation value for determination Cv or Ch is the smallest, in other words, if "Cv=min(Cv, Ch, Cd1, Cd2)" or "Ch=min(Cv, Ch, Cd1, Cd2)" is satisfied, a correlation direction is determined using the graph of FIG. 21.

More specifically, if a correspondence between the correlation values for determination (i.e., a coordinate point (Ch, Cv)) is included in the area A1, the pixel interpolation method determination unit 5 determines that a correlation direction of an observed pixel is a "horizontal direction".

Also, if a correspondence between the correlation values for determination (i.e., a coordinate point (Ch, Cv)) is included in the area A2, the pixel interpolation method determination unit 5 determines that a correlation direction of an observed pixel is a "vertical direction".

Also, if a correspondence between the correlation values for determination (i.e., a coordinate point (Ch, Cv)) is included in the area A3, the pixel interpolation method determination unit 5 determines that "there is no correlation in any direction" with respect to an observed pixel.

Also, if a correspondence between the correlation values for determination (i.e., a coordinate point (Ch, Cv)) is included in the area A4, the pixel interpolation method determination unit 5 determines that "there is strong correlation in both of a horizontal direction and a vertical direction" with respect to an observed pixel.

(2) The pixel interpolation method determination unit 5 compares the four correlation values for determination Cv, Ch, Cd1, and Cd2, for each pixel. Then, if the correlation value for determination Cd1 or Cd2 is the smallest, in other words, if "Cd1=min(Cv, Ch, Cd1, Cd2)" or "Cd2=min(Cv, Ch, Cd1, Cd2)" is satisfied, a correlation direction is determined using the graph of FIG. 22.

More specifically, if a correspondence between the correlation values for determination (i.e., a coordinate point (Cd2, Cd1)) is included in the area B1, the pixel interpolation method determination unit 5 determines that a correlation direction of an observed pixel is a "second diagonal direction (d2 direction)".

Also, if a correspondence between the correlation values for determination (i.e., a coordinate point (Cd2, Cd1)) is included in the area B2, the pixel interpolation method determination unit 5 determines that a correlation direction of an observed pixel is a "first diagonal direction (d1 direction)".

Also, if a correspondence between the correlation values for determination (i.e., a coordinate point (Cd2, Cd1)) is included in the area B3, the pixel interpolation method determination unit 5 determines that "there is no correlation in any direction" with respect to an observed pixel.

Also, if a correspondence between the correlation values for determination (i.e., a coordinate point (Cd2, Cd1)) is included in the area B4, the pixel interpolation method determination unit 5 determines that "there is strong correlation in both of a first diagonal direction and a second diagonal direction" with respect to an observed pixel.

A result of determination about a correlation direction (the information about a correlation direction Co_Dir) which is obtained for each pixel in the above-described manner is output from the pixel interpolation method determination unit 5 to the interpolation unit 6 and the correction unit 7.

Further, the information P_Mthd about a pixel interpolation method (a color-image pixel interpolation method or a gray-image pixel interpolation method) which is obtained for each pixel is output from the pixel interpolation method determination unit 5 to the interpolation unit 6.

It is additionally noted that the graphs referred to above are mere examples, and other graphs including areas which are defined by other straight lines can be employed.

(1.2.6 Processes in the Interpolation Unit 6)

In the interpolation unit 6, based on (1) the result of determination about a correlation direction and (2) a pixel interpolation method which are determined by the pixel interpolation method determination unit 5 for each pixel, (A) a pixel interpolation process is carried out on the image D_raw output from the signal processor unit C2 in a pixel interpolation process for a color-image area, for each pixel, and (B) a pixel interpolation process is carried out on the image D1 output from the signal correction unit 1 in a pixel interpolation process for a gray-image area, for each pixel.

(1.2.6.1 Pixel Interpolation Process for a Gray-Image Area)

In a case where a pixel interpolation method for an observed pixel, which is determined by the pixel interpolation method determination unit 5, is a "pixel interpolation method for a gray-image area", the gray-image interpolation unit 62 of the interpolation unit 6 carries out a pixel interpolation process using pixels provided in a correlation direction determined by the pixel interpolation method determination unit 5, irrespective of what color component the observed pixel has. Now, more specific description of a case where a pixel interpolation process is carried out by a "pixel interpolation method for a gray-image are" in the gray-image interpolation unit 62 will be provided.

<<Area A1: Horizontal Pixel Interpolation (for a Gray-Image Area)>>

In a case where a pixel interpolation method for an observed pixel, which is determined by the pixel interpolation method determination unit 5, is a "pixel interpolation method for a gray-image area" and a correlation direction regarding the observed pixel is determined to be a "horizontal direction" by the pixel interpolation method determination unit 5, the gray-image interpolation unit 62 achieves pixel interpolation of the observed pixel by carrying out a process expressed by the following equation.

$$Sout=(P21+2\times P22+P23)/4$$

That is, the gray-image interpolation unit 62 employs a value of a color component which is not included in the observed pixel, as "Sout". For example, in a case where the observed pixel P22 is a W pixel, "Ye(P22)=R(P22)=Sout" where a value of Ye-color component and a value of R-color component of the observed pixel are "Ye(P22)" and "R(P22)", respectively, is satisfied.

<<Area A2: Vertical Pixel Interpolation (for a Gray-Image Area)>>

In a case where a pixel interpolation method for an observed pixel, which is determined by the pixel interpolation method determination unit 5, is a "pixel interpolation method for a gray-image area" and a correlation direction regarding the observed pixel is determined to be a "vertical direction" by the pixel interpolation method determination unit 5, the gray-image interpolation unit 62 achieves pixel interpolation of the observed pixel by carrying out a process expressed by the following equation.

$$Sout=(P12+2\times P22+P32)/4$$

That is, the gray-image interpolation unit 62 employs a value of a color component which is not included in the observed pixel, as "Sout". For example, in a case where the observed pixel P22 is a W pixel, "R(P22)=Ye(P22)=Sout" where a value of Ye-color component and a value of R-color component of the observed pixel are "Ye(P22)" and "R(P22)", respectively, is satisfied.

<<Area B2: First Diagonal Pixel Interpolation (for a Gray-Image Area)>>

In a case where a pixel interpolation method for an observed pixel, which is determined by the pixel interpolation method determination unit 5, is a "pixel interpolation method for a gray-image area" and a correlation direction regarding the observed pixel is determined to be a "first diagonal direction" by the pixel interpolation method determination unit 5, the gray-image interpolation unit 62 achieves pixel interpolation of the observed pixel by carrying out a process expressed by the following equation.

$$Sout=(P11+2\times P22+P33)/4$$

That is, the gray-image interpolation unit 62 employs a value of a color component which is not included in the observed pixel, as "Sout". For example, in a case where the observed pixel P22 is a W pixel, "Ye(P22)=R(P22)=Sout" where a value of Ye-color component and a value of R-color component of the observed pixel are "Ye(P22)" and "R(P22)", respectively, is satisfied.

<<Area B1: Second Diagonal Pixel Interpolation (for a Gray-Image Area)>>

In a case where a pixel interpolation method for an observed pixel, which is determined by the pixel interpolation method determination unit 5 is a "pixel interpolation method for a gray-image area" and a correlation direction regarding the observed pixel is determined to be a "second diagonal direction" by the pixel interpolation method determination unit 5, the gray-image interpolation unit 62 achieves pixel interpolation of the observed pixel by carrying out a process expressed by the following equation.

$$Sout=(P13+2\times P22+P31)/4$$

That is, the gray-image interpolation unit 62 employs a value of a color component which is not included in the observed pixel, as "Sout". For example, in a case where the observed pixel P22 is a W pixel, "Ye(P22)=R(P22)=Sout" where a value of Ye-color component and a value of R-color component of the observed pixel are "Ye(P22)" and "R(P22)", respectively, is satisfied.

<<Areas A3 and B3: Median Interpolation (for a Gray-Image Area)>>

In a case where a pixel interpolation method for an observed pixel, which is determined by the pixel interpolation method determination unit 5, is a "pixel interpolation method for a gray-image area" and the pixel interpolation method determination unit 5 determines that there is no correlation in any direction with respect to the observed pixel, the gray-image interpolation unit 62 achieves pixel interpolation of the observed pixel by carrying out a process expressed by the following equation.

$$Sout=P22$$

That is, the gray-image interpolation unit 62 employs a value of a color component which is not included in the observed pixel, as "Sout". For example, in a case where the observed pixel P22 is a W pixel, "Ye(P22)=R(P22)=Sout" where a value of Ye-color component and a value of R-color component of the observed pixel are "Ye(P22)" and "R(P22)", respectively, is satisfied.

<<Areas A4 and B4: Average Pixel Interpolation (for a Gray-Image Area)>>

In a case where a pixel interpolation method for an observed pixel, which is determined by the pixel interpolation method determination unit 5, is a "pixel interpolation method for a gray-image area" and the pixel interpolation method determination unit 5 determines that "there is strong correlation in both of a horizontal direction and a vertical direction" with respect to an observed pixel, the gray-image interpolation unit 62 achieves pixel interpolation of the observed pixel by carrying out a process expressed by the following equation.

$$Sout=(P11+P12+P13+P21+P22+P23+P31+P32+P33)/9$$

That is, the gray-image interpolation unit 62 employs a value of a color component which is not included in the observed pixel, as "Sout". For example, in a case where the observed pixel P22 is a W pixel, "Ye(P22)=R(P22)=Sout" where a value of Ye-color component and a value of R-color component of the observed pixel are "Ye(P22)" and "R(P22)", respectively, is satisfied.

An image signal on which the gray-image pixel interpolation process as described above has been carried out is output from the gray-image interpolation unit 62 to the signal reverse correction unit 63.

<Signal Reverse Correction Process>>

The signal reverse correction unit 63 carries out a correction process which is reverse to the correction process carried out by the signal correction unit 1, on the image signal output from the gray-image interpolation unit 62.

More specifically, the signal reverse correction unit 63 carries out processes expressed by the following equations where "Win1", "Yein1", and "Rin1" represent a W-color component pixel signal, a Ye-color component pixel signal, and an R-color component pixel signal, respectively, which are included in the image signal output from the gray-image interpolation unit 62.

$$Wout=Win/Gain\_sig\_W$$

$$Yeout=Yein/Gain\_sig\_Ye$$

$$Rout=Rin/Gain\_sig\_R$$

It is noted that the gain values Gain_sig_W, Gain_sig_Ye, and Gain_sig_R are identical to the correcting gains used in the signal correction process in the signal correction unit 1.

As a result of the above-described processes being carried out, it is possible to make a signal level of each of pixel signals of the image signal on which a gray-image pixel interpolation process has been carried out, equal to a signal level of each of pixel signals included in an image signal provided before the signal correction process is carried out in the signal correction unit 1.

The image signal on which the above-described signal reverse correction process has been carried out is output to the selector unit 64, by the signal reverse correction unit 63.

(1.2.6.2 Color-Image Pixel Interpolation Process)

In a case where a pixel interpolation method for an observed pixel, which is determined by the pixel interpolation method determination unit 5, is a "pixel interpolation method for a color-image area", the color-image interpolation unit 61 of the interpolation unit 6 carries out a pixel interpolation process using pixels provided in a correlation direction determined by the pixel interpolation method determination unit 5. It is noted that "Wout", "Yeout", and "Rout" respectively represent respective pixel values of a W-color component, a Ye-color component, and an R-color component of an observed pixel on which a pixel interpolation process has been carried out.

<<Horizontal Pixel Interpolation>>

In a case where an observed pixel is for a W-color component and the pixel interpolation method determination unit 5 determines that a correlation direction regarding the observed pixel is a "horizontal direction", the color-image interpolation unit 61 calculates Yeout using Ye-color component pixels provided in a horizontal direction relative to the observed pixel.

Figure 23:
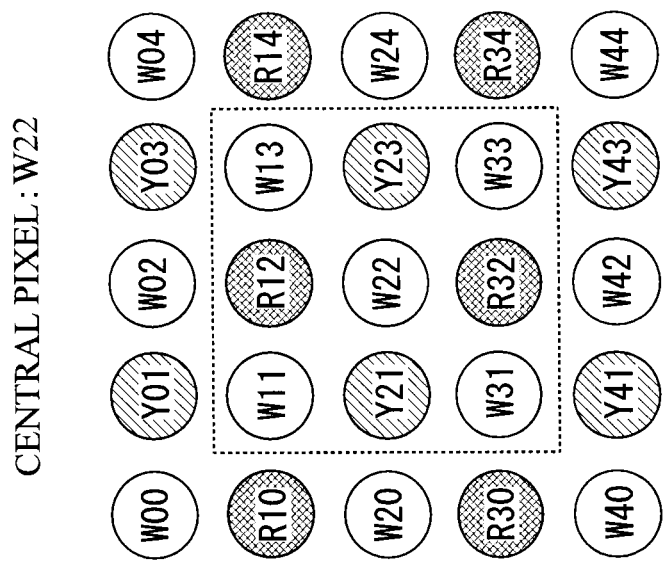
FIG. 23 shows a matrix area of five pixels by five pixels in a case where a central pixel (observed pixel) is a W-color component pixel.

FIG. 23 shows a matrix area of five pixels by five pixels in a case where a central pixel (observed pixel) is a W-color component pixel. The matrix area shown in FIG. 23 corresponds to the area AR1 shown in FIG. 4.

In FIG. 23, out of two-digit numbers following alphabets, "W", "Y", and "R", the first number (located closer to an alphabet) is a row number of a pixel in a matrix area, and the second number is a column number of a pixel in a matrix area. Thus, FIG. 23 shows a pixel array in a matrix area formed of 25 pixels P00 to P44 including the observed pixel W22 in a case where the central pixel P22 (W22) is a W-color component pixel. Also, in description of preferred embodiments and mathematical expressions, alphabets, "P", "W", "Y", and "R" may denote a pixel value. For example, a symbol "P11" denotes a pixel value of the pixel which is located in the first row and the first column, as well as the pixel its self which is located in the first row and the first column.

Referring to FIG. 23, in the case where the pixel W22 is an observed pixel, the color-image interpolation unit 61 calculates an average of pixels Y21 and Y23 provided in a horizontal direction relative to the pixel W22, to thereby obtain a pixel value Yeout of a Ye-color component in the pixel W22. Alternatively, the color-image interpolation unit 61 can obtain a pixel value Yeout of a Ye-color component by performing linear interpolation using the other Ye-color component pixels provided in a horizontal direction relative to the pixel W22, together with the pixels Y21 and Y22.

In the meantime, an R-color component pixel is not provided in a horizontal direction relative to the pixel W22. In such a situation, the color-image interpolation unit 61 obtains a pixel value Rout of an R-color component in the pixel W22, based on a rate of change (Laplacian) in pixel value of R-color components provided in a vertical direction relative to the pixel W22, which is perpendicular to a direction of interpolation (horizontal direction).

<<Vertical Pixel Interpolation (for a Color-Image Area)>>

In a case where an observed pixel is a W-color component pixel and the pixel interpolation method determination unit 5 determines that a correlation direction regarding the observed pixel is a "vertical direction", the color-image interpolation unit 61 calculates Rout using R-color component pixels provided in a vertical direction relative to the observed pixel.

Referring to FIG. 23, in the case where the pixel W22 is an observed pixel, the color-image interpolation unit 61 calculates an average of pixels R12 and R32 provided in a vertical direction relative to the pixel W22, to thereby obtain a pixel value Rout of an R-color component in the pixel W22. Alternatively, the color-image interpolation unit 61 can obtain a pixel value Rout of an R-color component by performing linear interpolation using the other R-color component pixels provided in a vertical direction relative to the pixel W22, together with the pixels R12 and R32.

In the meantime, a Ye-color component pixel is not provided in a vertical direction relative to the pixel W22. In such a situation, the color-image interpolation unit 61 obtains a pixel value Yeout of a Ye-color component in the pixel W22, based on a rate of change (Laplacian) in pixel value of Ye-color components provided in a horizontal direction relative to the pixel W22, which is perpendicular to a direction of interpolation (vertical direction).

<<First Diagonal Pixel Interpolation (for a Color-Image Area)>>

In a case where an observed pixel is a Ye-color component pixel and the pixel interpolation method determination unit 5 determines that a correlation direction regarding the observed pixel is a "first diagonal direction", the color-image interpolation unit 61 calculates Rout using R-color component pixels provided in a first diagonal direction relative to the observed pixel.

Figure 24:
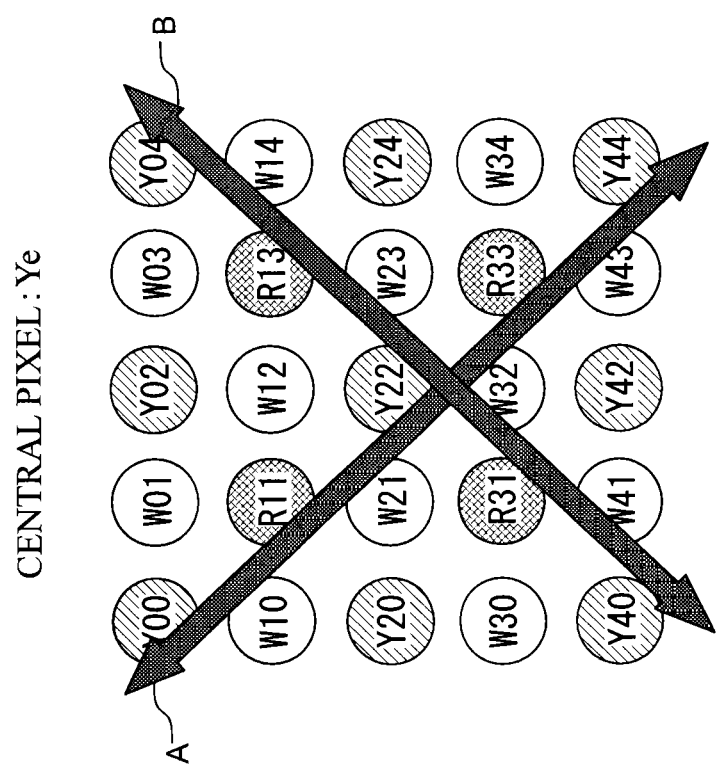
FIG. 24 shows a matrix area of five pixels by five pixels in a case where a central pixel (observed pixel) is a Ye-color component pixel.

FIG. 24 shows a matrix area of five pixels by five pixels in the case where a central pixel (observed pixel) is a Ye-color component pixel. The matrix area shown in FIG. 24 corresponds to the area AR2 shown in FIG. 4.

Referring to FIG. 24, in the case where the pixel Y22 is an observed pixel, the color-image interpolation unit 61 calculates an average of pixels R11 and R33 provided in a first diagonal direction (a direction indicated by an arrow "A" in FIG. 24) relative to the pixel Y22, to thereby obtain a pixel value Rout of an R-color component in the pixel Y22. Alternatively, the color-image interpolation unit 61 can obtain a pixel value Rout of an R-color component by performing linear interpolation using the other R-color component pixels provided in a first diagonal direction relative to the pixel Y22, together with the pixels R11 and R33.

In the meantime, a W-color component pixel is not provided in a first diagonal direction relative to the pixel Y22. In such a situation, the color-image interpolation unit 61 obtains a pixel value Wout of a W-color component in the pixel Y22, based on a rate of change (Laplacian) in pixel value of W-color components provided in a second diagonal direction (a direction indicated by an arrow "B" in FIG. 24) relative to the pixel Y22, which is perpendicular to a direction of interpolation (first diagonal direction).

<<Second Diagonal Pixel Interpolation (for a Color-Image Area)>>

In a case where an observed pixel is a Ye-color component pixel and the pixel interpolation method determination unit 5 determines that a correlation direction regarding the observed pixel is a "second diagonal direction", the color-image interpolation unit 61 calculates Rout using R-color component pixels provided in a second diagonal direction relative to the observed pixel.

Referring to FIG. 24, in the case where the pixel Y22 is an observed pixel, the color-image interpolation unit 61 calculates an average of pixels R13 and R31 provided in a second diagonal direction (a direction indicated by an arrow "B" in FIG. 24) relative to the pixel Y22, to thereby obtain a pixel value Rout of an R-color component in the pixel Y22. Alternatively, the color-image interpolation unit 61 can obtain a pixel value Rout of an R-color component by performing linear interpolation using the other R-color component pixels provided in a second diagonal direction relative to the pixel Y22, together with the pixels R13 and R31.

In the meantime, a W-color component pixel is not provided in a second diagonal direction relative to the pixel Y22. In such a situation, the color-image interpolation unit 61 obtains a pixel value Wout of a W-color component in the pixel Y22, based on a rate of change (Laplacian) in pixel value of W-color components provided in a first diagonal direction (a direction indicated by an arrow "A" in FIG. 24) relative to the pixel Y22, which is perpendicular to a direction of interpolation (second diagonal direction).

It is noted that a pixel interpolation process is carried out in the same manner as described above in each of cases where an observed pixel is a W-color component pixel, a Ye-color component pixel, and an R-color component pixel.

<<Median Interpolation (for a Color-Image Area)>>

In a case where the pixel interpolation method determination unit 5 determines that "there is no correlation in any direction", with respect to an observed pixel, the color-image interpolation unit 61 performs median interpolation using pixels provided in an area of three pixels by three pixels, which centers on the observed pixel.

As shown in FIG. 24, in a case where the observe pixel is a pixel Y22, the color-image interpolation unit 61 calculates a median value of the pixels W12, W21, W23, and W32, to thereby obtain Wout of the pixel Y22. The color-image interpolation unit 61 calculates a median value of the pixels R11, R13, R31, and R33, to thereby obtain Rout of the pixel Y22. It is noted that median interpolation is performed in the same manner as described above also in a case where a central pixel (observed pixel) is a W-color component pixel or an R-color component pixel. Also, pixels, a median value of which are to be calculated, may be provided in an area of five pixels by five pixels, which centers on an observed pixel.

<<Average Interpolation (for a Color-Image Area)>>

In a case where the pixel interpolation method determination unit 5 determines that "there is strong correlation in both of a horizontal direction and a vertical direction", with respect to an observed pixel, the color-image interpolation unit 61 performs average interpolation using pixels provided in an area of three pixels by three pixels, which centers on the observed pixel.

As shown in FIG. 24, in a case where the observe pixel is a pixel Y22, the color-image interpolation unit 61 calculates an average of the pixels W12, W21, W23, and w32, to thereby obtain Wout of the pixel Y22. The color-image interpolation unit 61 calculates an average of the pixels R11, R13, R31, and R33, to thereby obtain Rout of the pixel Y22. It is noted that average interpolation is performed in the same manner as described above also in a case where a central pixel (observed pixel) is a W-color component pixel or an R-color component pixel.

As a result of the above-described processes, the color-image interpolation unit 61 obtains Wout, Yeout, and Rout for each pixel. Then, an image formed of the obtained values, Wout, Yeout, and Rout (i.e., an image signal including pixels each of which has three-color component values (W-color component value, Ye-color component value, and R-color component value)) is output to the selector unit 64.

The selector unit 64 selects either the image signal output from the signal reverse correction unit 63 or the image signal output from the color-image interpolation unit 61, according to the information Co_Dir about a correlation direction and the information P_Mthd about a pixel interpolation method which are output from the pixel interpolation method determination unit 5. Then, the selected image signal is output to the correction unit 7, as the image signal D2.

For example, in a case where a correlation direction is a "vertical direction" and a "pixel interpolation method for a color-image pixel interpolation" is employed, an image signal obtained by carrying out a color-image pixel interpolation process in which a vertical direction is a correlation direction, is selected by the selector unit 64, and output to the correction unit 7.

It will be sufficient that the interpolation unit 6 is constructed so as to allow an image signal obtained using a correlation direction and a pixel interpolation method which are determined based on the information Co_Dir about a correlation direction and the information P_Mthd about a pixel interpolation method which are output from the pixel interpolation method determination unit 5, to be output from the interpolation unit 6 to the correction unit 7. Thus, the structure of the interpolation unit 6 is not limited to the structure shown in FIG. 1, and may be different.

Also, the interpolation unit 6 may be constructed so as to allow only a pixel interpolation process using a correlation direction and a pixel interpolation method which are determined based on the information Co_Dir about a correlation direction and the information P_Mthd about a pixel interpolation method which are output from the pixel interpolation method determination unit 5, to be carried out.

(1.2.7 Processes in Correction Unit 7)

Next, processes carried out by the correction unit 7 will be described.

The first matrix transformation unit 71 of the correction unit 7 carries out a matrix transformation process on the input image signal D2, so that the image signal D2 is converted into an image signal in an RGB color space.

More specifically, the first matrix transformation unit 71 carries out a process expressed by the following equation, [Equation 3] where "color1", "color2", and "color3" respectively represent a first-color component pixel signal (W), a second-color pixel component signal (Ye), and a third-color component pixel signal (R) of an image signal.

$$\begin{pmatrix} R \\ G \\ B \end{pmatrix} = \begin{pmatrix} 0 & 0 & 1 \\ 0 & 1 & -1 \\ 1 & -1 & 0 \end{pmatrix} \begin{pmatrix} color1 \\ color2 \\ color3 \end{pmatrix} + \begin{pmatrix} \text{offset\_R} \\ \text{offset\_G} \\ \text{offset\_B} \end{pmatrix} \quad \text{[Equation 3]}$$

As a result, an R-color component pixel signal, a G-color component pixel signal, and a B-color component pixel signal are obtained.

Is it noted that "offset_R", "offset_G", and "offset_B" represent offset values.

According to the first preferred embodiment, it is considered that "color1=W", "color2=Ye", and "color3=R". Thus, the above equation, [Equation 3] for converting a W-Ye-R color space into an RGB color space turns out to be the following equations.

$R = Rout$ $G = Yeout - Rout$ $B = Wout - Yeout$

It is noted that "R", "G", and "B" represent an R-color component value, a G-color component value, and a B-color component value in an RGB color space, respectively. Also, "Wout", "Yeout", and "Rout" represent a W-color component pixel signal, a Ye-color component pixel signal, and an R-color component pixel signal in a W-Ye-R color space (i.e., the image signal D2), respectively.

The above transformation matrix for converting a color space is determined according to colors of a three-color filter array. Hence, the first matrix transformation unit 71 can obtain an R-color component pixel signal, a G-color component pixel signal, and a B-color component pixel signal, whatever color the color filters forming the three-color filter array may have. In this case, a coefficient in the transformation matrix of the equation, [Equation 3] is appropriately changed according to each color filter.

An image signal including an R-color component pixel signal, a G-color component pixel signal, and a B-color component pixel signal which are obtained in the above-described manner, and further including a W-color component pixel signal included in the image signal D2, is output from the first matrix transformation unit 71 to the color space processing unit 72, as the image signal D3. Also, an R-color component pixel signal, a G-color component pixel signal, and a B-color component pixel signal included in the image signal D3 are output to the saturation obtaining unit 73.

The color space processing unit 72 converts the image signal D3 output from the first matrix transformation unit 71 into the image signal D4 in a YCbCr color space. Below, specific description about processes carried out by the color space processing unit 72 will be provided.

The brightness signal obtaining unit 721 of the color space processing unit 72 receives an R-color component pixel signal, a G-color component pixel signal, and a B-color component pixel signal which are output from the first matrix transformation unit 71 as shown in FIG. 3A. Then, the brightness signal obtaining unit 721 obtains a brightness signal Y0 by carrying out a process expressed by the following equation.

$Y0 = 0.299 \times R + 0.587 \times G + 0.114 \times B$

It is note that "R", "G", and "B" represent an R-color component value, a G-color component value, and B-color component value of an observed pixel, respectively.

A selection signal generation unit 722 generates a selection signal based on the information about a correlation direction and a pixel interpolation method for each pixel, which is output by the pixel interpolation method determination unit 5. More specifically, the selection signal is generated in the following manner. Please note that information about a color component of an observed pixel (pixel being processed) has already been input to the selection signal generation unit 722, though such matter is not shown in FIG. 3A.

A W-color component pixel signal, which is included in the image signal D3, can be used as a brightness signal of an observed signal. Hence, the selection signal generation unit 722 outputs a selection signal indicating which of a W-color component pixel signal, the brightness signal Y0, and an average (an average of a W-color component pixel signal and the brightness signal Y0) should be selected as the brightness of the observed pixel, to the brightness signal output unit 723. More specifically, the selection signal generation unit 722 carries out the following processes.

The selection signal generation unit 722 indicates selection of one of the W-color component pixel signal, the brightness signal Y0 and an average of the W-color component pixel signal and the brightness signal Y0, based on a color component of a filter of the observed pixel and a correlation direction of the observed pixel.

(1) When the observed pixel is a W-color component pixel, the selection signal generation unit 722 outputs a selection signal indicating selection of the W-color component pixel signal of the observed pixel, irrespective of a correlation direction of the observed pixel, to the brightness signal output unit 723.

(2) When the observed pixel is a Ye-color component pixel or an R-color component pixel and a correlation direction is either a horizontal direction or a vertical direction, the selection signal generation unit 722 indicates selection of the W-color component pixel signal of the observed pixel. The reasons for it is that to use a pixel value of a W-color component pixel could enhance accuracy of a brightness signal because a W-color component pixel is provided in a horizontal direction or a vertical direction relative to the observed pixel.

(3) When the observed pixel is a Ye-color component pixel or an R-color component pixel and a correlation value is either a first diagonal direction or a second diagonal direction, the selection signal generation unit 722 indicates selection of the brightness signal Y0 of the observed pixel. The reasons for it is that no W-color component pixel is provided in a first diagonal direction or a second diagonal direction relative to the observed pixel.

(4) When the observed pixel is a Ye-color component pixel or an R-color component pixel and there is no correlation in any direction, the selection signal generation unit 722 indicates selection of the brightness signal Y0 of the observed pixel.

(5) When the observed pixel is a Ye-color component pixel or an R-color component pixel and there is correlation in both of a horizontal direction and a vertical direction, the selection signal generation unit 722 indicates selection of an average of the W-color component pixel signal of the observed pixel and the brightness signal Y0

In the above-described manner, the selection signal output unit 723 generates a Y signal (Y component pixel signal) from a W signal (W-color comment pixel signal) and a Y0 signal in accordance with a selection signal generated by the selection signal generation unit 722, and outputs the generated Y signal (Y component pixel signal), to the second matrix transformation unit 75.

As described above, in the color space processing unit 72, a W-color signal (W-color component pixel signal) is employed as a Y component pixel signal (Yout signal) in a case where an observed pixel is a W pixel. Like this, also in a case where a correlation direction of an observed pixel is a "vertical direction" or a "horizontal direction", a W-color component pixel signal is employed as a Yout signal. In the other cases than cited above, Yout is obtained using the brightness signal Y0 which is obtained through conversion using an R-color component value, a G-color component value, and a B-color component value. Accordingly, the color space processing unit 72 can obtain a high-accuracy brightness signal component (Y component pixel signal).

Also, in the color space processing unit 72, a Cb component signal (Cb-color component pixel signal) and a Cr component signal (Cr-color component pixel signal) are obtained using a Y signal (Y component pixel signal), a R component signal (R-color component pixel signal), and a B component signal (B-color component pixel signal) by the subtracters 724 and 726 and the gain adjustment units 725 and 727. Thus, a Cb-color component pixel signal and a Cr-color component pixel signal are obtained using a high-accuracy Y component signal, so that the Cb-color component pixel signal and the Cr-color component pixel signal are accurate.

It is noted that the color space processing unit 72 may have the structure shown in FIG. 3B. In this case, an R-color component pixel signal, a G-color component pixel signal, and a B-color component pixel signal which are output from the first matrix transformation unit 71 are input to the color space conversion unit 721A. Then, the color space conversion unit 721A carries out a process (RGB-YCbCr conversion process) expressed by the following equations, to obtain a brightness component pixel signal Y0, a Cb-color component pixel signal, and a Cr-color component pixel signal.

$$Y0 = 0.299 \times R + 0.587 \times G + 0.114 \times B$$

$$Cr = 0.500 \times R - 0.419 \times G - 0.081 \times B$$

$$Cb = -0.169 \times R - 0.332 \times G + 0.500 \times B$$

The brightness component pixel signal Y0 which is obtained in the above-described manner is output from the color space conversion unit 721A to the brightness signal output unit 723, which then carries out the same processes as described above. Also, a Cb-color component pixel signal and a Cr-color component pixel signal which are obtained by the above-described processes are output from the color space conversion unit 721A to the color difference correction unit 74.

The saturation obtaining unit 73 obtains the saturation value S based on an R-color component pixel signal, a G-color component pixel signal, and a B-color component pixel signal which are included in the image signal D3 output from the first matrix transformation unit 71.

More specifically, the saturation obtaining unit 73 obtains the saturation value S (for each pixel) based on an R-color component pixel signal, a G-color component pixel signal, and a B-color component pixel signal, using a technique of converting an RGB color space into an HSV color space (H: hue, S: saturation, and V: brightness).

Then, the saturation value S (saturation signal S) obtained by the saturation obtaining unit 73 (for each pixel) is output to the color difference correction unit 74.

The color difference correction unit 74 carries out a color-difference component correction process on a Cb-color component pixel signal and a Cr-color component pixel signal which are output from the color space processing unit 72, based on the saturation value S output from the saturation obtaining unit 73.

More specifically, the saturation value S is compared with a threshold value THs. Then, (1) if S>THs, the color difference correction unit 74 considers that Cb'=Cb and Cr'=Cr, and outputs a Cb-color component pixel signal Cb' and a Cr-color component pixel signal Cr' to the second matrix transformation unit 75. On the other hand, (2) if S≤THs, the color difference correction unit 74 considers that Cb'=ks×Cb and Cr'=ks×Cr while 0≤ks≤1, and outputs a Cb-color component pixel signal Cb' and a Cr-color component pixel signal Cr' to the second matrix transformation unit 75.

In this case (in the case of S≤THs), the color difference correction unit 74 may alternatively consider that Cb'=0 and Cr'=0, in other words, a Cb-color component value and a Cr-color component value may be considered to be zero (achromatic-color signal). Then, a Cb-color component pixel signal Cb' and a Cr-color component pixel signal Cr' are output to the second matrix transformation unit 75.

Also in the above case (in the case of S≤THs), the color difference correction unit 74 may alternatively consider that Cb'=f(Cb) and Cr'f(Cr), and output a Cb-color component pixel signal Cb' and a Cr-color component pixel signal Cr' to the second matrix transformation unit 75. It is noted that the function f(x) may be any function that can reduce the level of an input signal x.

As described above, the color difference correction unit 74 performs correction of a color-difference component pixel signal based on the high-accuracy saturation value S which is obtained using the image signal D3 on which a high-accuracy pixel interpolation process has been carried out, so that side effects such as occurrence of a false color can be appropriately suppressed.

In the pixel interpolation unit 100, the signal correction unit 1 carries out a saturation evaluation value calculation process, a gray correlation value calculation process, and a gray-image pixel interpolation process, using the image signal D1, the level of which has been corrected. Further, in the pixel interpolation unit 100, also for a color-image pixel interpolation process, a pixel interpolation process is carried out taking into account a correlation direction, so that a high-accuracy pixel interpolation process can be achieved.

That is, a high-accuracy pixel interpolation process can be achieved in the pixel interpolation unit 100 as described above, so that the image signal D2 which has been subjected to a high-accuracy pixel interpolation process can be obtained.

Then, the saturation obtaining unit 73 calculates the saturation value S using the high-accuracy image signal D2 after a pixel interpolation process, so that the high-accuracy saturation value S can be obtained. Further, the color difference correction unit 74 carries out a correction process on a color-difference pixel signal based on the high-accuracy saturation value S as describe above. As a result, even if there is a strong possibility that an observed pixel is included in a gray-image area, a color component of the observed pixel can be appropriately reduced, to thereby appropriately prevent production of side effects such as occurrence of a false color.

The color-difference component signals Cb' and Cr' which are obtained in the above-described manner after a color-difference correction process are output to the second matrix transformation unit 75.

The second matrix transformation unit 75 carries out a process of converting a YCbCr color space into an RGB color space on a Y component pixel signal which is output from the color space processing unit 72, a Cb-color component pixel signal Cb' and a Cr-color component pixel signal Cr' which are corrected and output from the color difference correction unit 74. In other words, the second matrix transformation unit 75 carries out a process of converting an image signal in a YCbCr color space into an image signal in an RGB color space.

Then, the image signal Dout including an R-color component pixel signal, a G-color component pixel signal, and a B-color component pixel signal which are provided as a result of the above-described process of converting a color space are output from the second matrix transformation unit 75.

As described above, in the image capture apparatus 1000, the signal correction unit 1 performs correction of a signal level in accordance with arrangement of the three-color filters of the image capture unit C1, and carries out a saturation evaluation value calculation process and a gray correlation value calculation process using the image signal D1 provided after the correction. Also, in the image capture apparatus 1000, the pixel interpolation method determination unit 5 determines a correlation direction and a pixel interpolation method using the three color correlation values Cx_color obtained by the color correlation value calculation process, the three gray correlation values Cx_gray, and the saturation evaluation coefficient KL.

Then, the interpolation unit 6 carries out a pixel interpolation process for a color-image area or a gray-image area using pixels provided in a determined correlation direction by a determined pixel interpolation method and the determined correlation direction, in the image capture apparatus 1000.

Therefore, it is possible to achieve a high-accuracy pixel interpolation process whatever the three-color filter array may be like.

Thus, in the image capture apparatus 1000, it is possible to obtain the image signal D2 on which a high-accuracy pixel interpolation process has been carried out, whatever the three-color filter array of the image capture unit C1 may be like.

Further, in the image capture apparatus 1000, the high-accuracy saturation value S is obtained using the image signal D2 on which a high-accuracy pixel interpolation process has been carried out, and a color-difference component pixel signal of an image signal in a YCbCr color space which is obtained from the image signal D2 on which a high-accuracy pixel interpolation process has been carried out is corrected. As a result, it is possible to appropriately prevent production of side effects such as occurrence of a false color.

As is made clear from the above description, in the image capture apparatus 1000, it is possible to appropriately carry out a pixel interpolation process whatever the three-color filter array of the image capture unit C1 may be like.

Second Preferred Embodiment

Next, a second preferred embodiment will be described.

It is noted that in the second preferred embodiment, units which are similar to those in the above-described preferred embodiment will be denoted by the same reference numerals, and detailed description thereof will be omitted.

Figure 25:
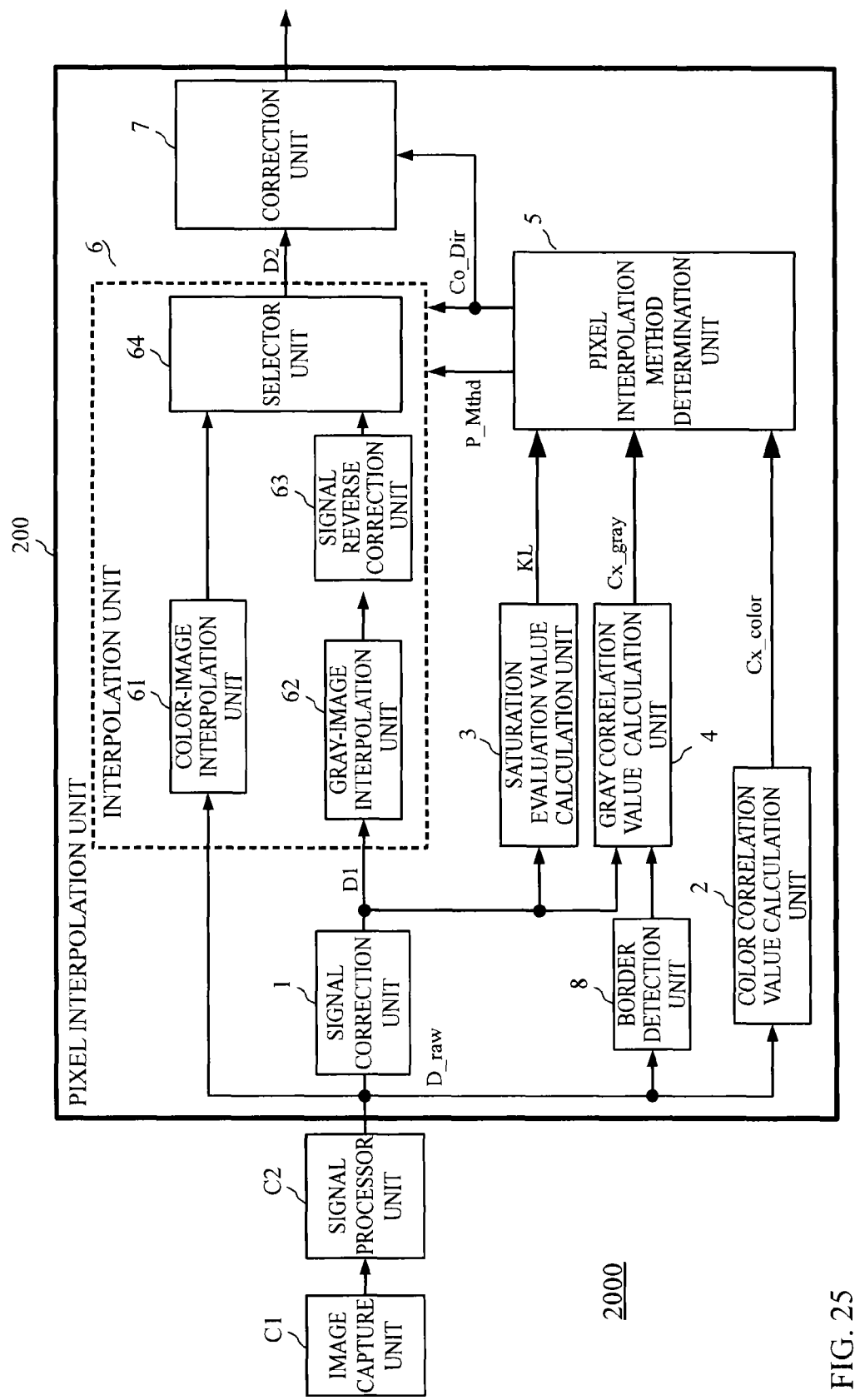
FIG. 25 is a schematic view of a structure of an image capture apparatus 2000 according to a second preferred embodiment.

FIG. 25 is a schematic view of a structure of an image capture apparatus 2000 according to the second preferred embodiment.

The image capture apparatus 2000 has the same structure as the image capture apparatus 1000 of the first preferred embodiment, except that the pixel interpolation unit 100 is replaced with a pixel interpolation unit 200.

The pixel interpolation unit 200 has the same structure as the (first) pixel interpolation unit 100, except that the gray correlation value calculation unit 4 is replaced with a gray correlation value calculation unit 4A and a border detection unit 8 is additionally included.

The border detection unit 8 receives the image signal D_raw (image D_raw), and detects a border between a gray-image area and a color-image area in the received image D_raw. Then, the border detection unit 8 outputs information about the detected border between color/gray-image areas, to the gray correlation value calculation unit 4A.

The gray correlation value calculation unit 4A receives the image signal D1 output from the signal correction unit 1 and the information about the detected border between color/gray-image areas, which is output from the border detection unit 8.

(2.1 Process of Calculating a Gray-Image Correlation Value)

A process of calculating a gray-image correlation value which is carried out by the gray correlation value calculation unit 4A will be described below.

The gray correlation value calculation unit 4A calculates the following four correlation values for a gray-image area, regarding an observed pixel (pixel being processed) on the image D1 output from the signal correction unit 1.

(B1) A gray-image vertical correlation value Cv_gray
(B2) A gray-image horizontal correlation value Ch_gray
(B3) A gray-image first diagonal correlation value Cd1_gray
(B4) A gray-image second diagonal correlation value Cd2_gray Processes of calculating the above-cited correlation values for a gray-image area, (B1), (B2), (B3), and (B4) will be described below.

<<(B1) Gray-Image Vertical Correlation Value Cv_gray>>

First, a process of calculating the gray-image vertical correlation value Cv_gray will be discussed, with reference to FIG. 26.

Figure 26:
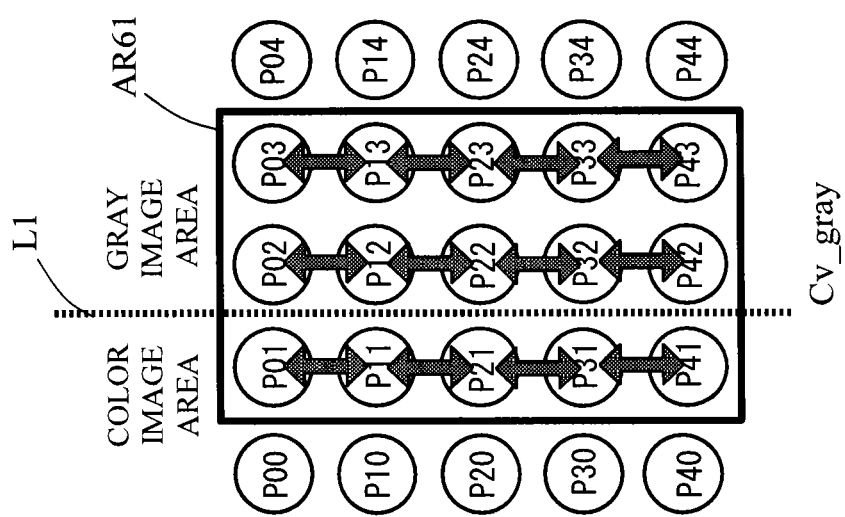
FIG. 26 is a view for describing a process of calculating a gray-image vertical correlation value Cv_gray.

FIG. 26 is a view for describing the process of calculating the gray-image vertical correlation value Cv_gray, and shows a matrix area of five pixels by five pixels which centers on a central pixel P22. It is additionally noted that two pixels pointed by arrows in the drawing are pixels on which difference processing is to be carried out.

As shown in FIG. 26, the gray correlation value calculation unit 4A calculates an absolute value of a difference in pixel value of each pair of pixels which are vertically adjacent to each other in an area AR61 formed of pixels P01-P03, P11-P13, P21-P23, P31-P33, and P41-P43, and obtains an average of calculated absolute values of differences. In other words, the gray correlation value calculation unit 4A carries out a process expressed by the following equations, to thereby obtain the gray-image vertical correlation value Cv_gray.

$$\text{sum} = \{abs(P02-P12) + abs(P12-P22) + abs(P22-P32) + abs(P32-P42)\} \times$$
$$gv + abs(P01-P11) + abs(P11-P21) +$$
$$abs(P21-P31) + abs(P31-P41) + abs(P03-P13) +$$
$$abs(P13-P23) + abs(P23-P33) + abs(P33-P43)$$
$$Cv\_gray = \text{sum}/(4 + gv \times 2)$$

That is, the gray correlation value calculation unit 4A can adjust weighting of a central column of the area AR61 using a gain value gv. For example, as shown in FIG. 26, in a case where an image area on the left of a dotted line L1 is a color-image area and an image area on the right of the dotted line L1 is a gray-image area, the gray correlation value calculation unit 4A determines that a color/gray border corresponds to the dotted line L1 based on the information about a color/gray border which is provided from the border detection unit 8, and sets the gain value gv so as to increase a ratio (weighting) of a difference value of the central column of the area AR61. For example, the gain value gv is set to "two" (gv=2). This allows evaluation to be achieved with increased importance being placed on the central column of the area AR61 in the gray correlation value calculation process.

Hence, it is possible to enhance accuracy in evaluation of a correlation value in a color/gray border. As a result, it is possible to appropriately suppress production of side effects such as occurrence of a false color in a color/gray border.

<<(B2) Gray-Image Horizontal Correlation Value Ch_gray>>

Next, a process of calculating the gray-image horizontal correlation value Ch_gray will be discussed, with reference to FIG. 27.

Figure 27:
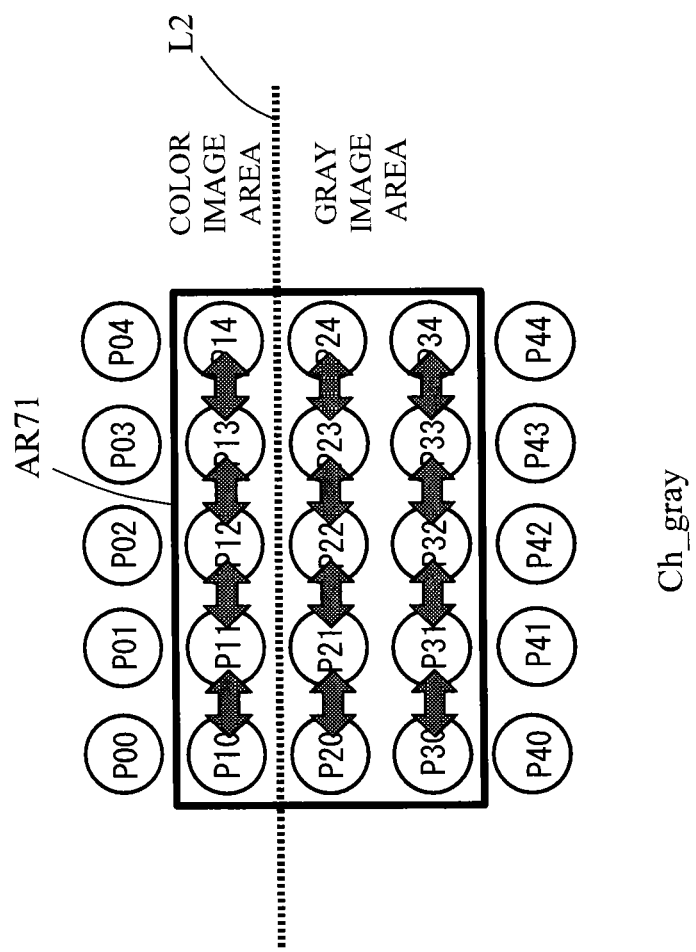
FIG. 27 is a view for describing a process of calculating a gray-image horizontal correlation value Ch_gray.

FIG. 27 is a view for describing the process of calculating the gray-image horizontal correlation value Ch_gray, and shows a matrix area of five pixels by five pixels which centers on a central pixel P22. It is additionally noted that two pixels pointed by arrows in the drawing are pixels on which difference processing is to be carried out.

As shown in FIG. 27, the gray correlation value calculation unit 4A calculates an absolute value of a difference in pixel value of each pair of pixels which are horizontally adjacent to each other in an area AR71 formed of pixels P10-P14, P20-P24, and P30-34, and obtains an average of calculated absolute values of differences. In other words, the gray correlation value calculation unit 4A carries out a process expressed by the following equations, to thereby obtain the gray-image horizontal correlation value Ch_gray.

$$sum =$$
$$abs\{(P20 - P21) + abs(P21 - P22) + abs(P22 - P23) + abs(P23 - P24)\} \times$$
$$gh + abs(P10 - P11) + abs(P11 - P12) +$$
$$abs(P12 - P13) + abs(P13 - P14) + abs(P30 - P31) +$$
$$abs(P31 - P32) + abs(P32 - P33) + abs(P33 - P34)$$
$$Ch\_gray = sum/(4 + gh \times 2)$$

That is, the gray correlation value calculation unit 4A can adjust weighting of a central row of the area AR71 using a gain value gh. For example, as shown in FIG. 27, in a case where an image area in the upside of a dotted line L2 is a color-image area and an image area in the downside of the dotted line L2 is a gray-image area, the gray correlation value calculation unit 4A determines that a color/gray border corresponds to the dotted line L2 based on the information about a color/gray border which is provided from the border detection unit 8, and sets the gain value gh so as to increase a ratio (weighting) of a difference value of the central row of the area AR71. For example, the gain value gh is set to "two" (gh=2). This allows evaluation to be achieved with increased importance being placed on the central row of the area AR71 in the gray correlation value calculation process. Hence, it is possible to enhance accuracy in evaluation of a correlation value in a color/gray border. As a result, it is possible to appropriately suppress production of side effects such as occurrence of a false color in a color/gray border.

<<(B3) Gray-Image First Diagonal Correlation Value Cd1_gray>>

Next, a process of calculating the gray-image first diagonal correlation value Cd1_gray will be discussed, with reference to FIG. 28.

Figure 28:
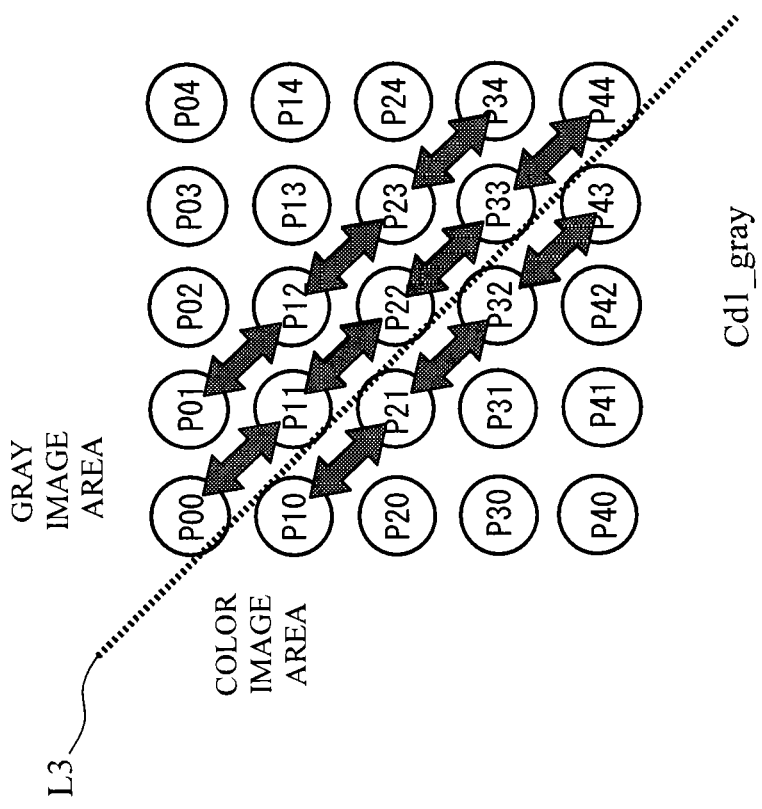
FIG. 28 is a view for describing a process of calculating a gray-image first diagonal correlation value Cd1_gray.

FIG. 28 is a view for describing a process of calculating the gray-image first diagonal correlation value Cd1_gray, and shows a matrix area of five pixels by five pixels which centers on a central pixel P22. It is additionally noted that two pixels pointed by arrows in the drawing are pixels on which difference processing is to be carried out.

As shown in FIG. 28, the gray correlation value calculation unit 4A calculates an absolute value of a difference in pixel value of each pair of pixels which are adjacent to each other in a first diagonal direction, and obtains an average of calculated absolute values of differences. In other words, the gray correlation value calculation unit 4A carries out a process expressed by the following equations, to thereby obtain the gray-image first diagonal correlation value Cd1_gray.

$$sum =$$
$$\{abs(P00 - P11) + abs(P11 - P22) + abs(P22 - P23) + abs(P33 - P34)\} \times$$
$$gd1 + abs(P10 - P21) + abs(P21 - P32) + abs(P32 - P43) +$$
$$abs(P01 - P12) + abs(P12 - P23) + abs(P23 - P34)$$
$$Cd1\_gray = sum/(3 + gd1 \times 2)$$

That is, the gray correlation value calculation unit 4A can adjust weighting of a central line (along which pixels P00-P44 are arranged in FIG. 28) using a gain value gd1. For example, as shown in FIG. 28, in a case where an image area on the left of a dotted line L3 is a color-image area and an image area in the right of the dotted line L3 is a gray-image area, the gray correlation value calculation unit 4A determines that a color/gray border corresponds to the dotted line L3 based on the information about a color/gray border which is provided from the border detection unit 8, and sets the gain value gd1 so as to increase a ratio (weighting) of a difference value of the central line (along which pixels P00-P44 are arranged in FIG. 28). For example, the gain value gd1 is set to "1.5" (gd1=1.5). This allows evaluation to be achieved with increased importance being placed on the central line in the gray correlation value calculation process. Hence, it is possible to enhance accuracy in evaluation of a correlation value in a color/gray border. As a result, it is possible to appropriately suppress production of side effects such as occurrence of a false color in a color/gray border.

<<(B4) Gray-Image Second Diagonal Correlation Value Cd2_gray>>

Next, a process of calculating the gray-image second diagonal correlation value Cd2_gray will be discussed, with reference to FIG. 29.

FIG. 29 is a view for describing the process of calculating the gray-image second diagonal correlation value Cd2_gray, and shows a matrix area of five pixels by five pixels which centers on a central pixel P22. It is additionally noted that two pixels pointed by arrows in the drawing are pixels on which difference processing is to be carried out.

As shown in FIG. 29, the gray correlation value calculation unit 4A calculates an absolute value of a difference in pixel value of each pair of pixels which are adjacent to each other in a second diagonal direction, and obtains an average of calculated absolute values of differences. In other words, the gray correlation value calculation unit 4A carries out a process expressed by the following equations, to thereby obtain the gray-image second diagonal correlation value Cd2_gray.

$$sum =$$
$$\{abs(P04 - P13) + abs(P13 - P22) + abs(P22 - P31) + abs(P31 - P40)\} \times$$
$$gd2 + abs(P03 - P12) + abs(P12 - P21) + abs(P21 - P30) +$$
$$abs(P14 - P23) + abs(P23 - P32) + abs(P32 - P41)$$
$$Cd2\_gray = sum/(3 + gd2 \times 2)$$

That is, the gray correlation value calculation unit 4A can adjust weighting of a central line (along which pixels P04-P40 are arranged in FIG. 29) using a gain value gd2. For example, as shown in FIG. 29, in a case where an image area on the left of a dotted line L4 is a color-image area and an image area in the right of the dotted line L4 is a gray-image area, the gray correlation value calculation unit 4A determines that a color/gray border corresponds to the dotted line L4 based on the information about a color/gray border which is provided from the border detection unit 8, and sets the gain value gd2 so as to increase a ratio (weighting) of a difference value of the central line (along which pixels P04-P40 are arranged in FIG. 29). For example, the gain value gd2 is set to "1.5" (gd2=1.5). This allows evaluation to be achieved with increased importance being placed on the central line in the gray correlation value calculation process. Hence, it is possible to enhance accuracy in evaluation of a correlation value in a color/gray border. As a result, it is possible to appropriately suppress production of side effects such as occurrence of a false color in a color/gray border.

After the above-described processes, the gray-image correlation values (Cv_gray, Ch_gray, Cd1_gray, and Cd2_gray) obtained by the gray correlation value calculation unit 4A are output to the pixel interpolation method determination unit 5.

As described above, in the image capture apparatus 2000 according to the second preferred embodiment, the gray correlation value calculation unit 4A is capable of adjusting the effectiveness (weighting) of correlation evaluation values in a central line, based on the information about a border between a color-image area and a gray-image area which is detected by the border detection unit 8. Therefore, in the image capture apparatus 2000, it is possible to effectively suppress occurrence of a false color which is likely to occur in a border between a color-image area and a gray-image area.

It is noted that a false color is more likely to occur when a border between a color-image area and a gray-image area extends in a vertical direction or a horizontal direction. Hence, it is preferable that each of the gain values gv and gh for adjusting which are used in calculating the gray-image vertical correlation value Cv_gray and the gray-image horizontal correlation value Ch_gray is larger than each of the gain values gd1 and gd2 for adjusting which are used in calculating the gray-image first diagonal correlation value Cd1_gray and the gray-image second diagonal correlation value Cd2_gray.

As is made clear from the above description, in the image capture apparatus 2000, as with the image capture apparatus 1000, it is possible to appropriately carry out a pixel interpolation process whatever the three-color filter array of the image capture unit C1 may be like. Further, it is possible to effectively suppress occurrence of a false color in a border between a color-image area and a gray-image area.

Other Preferred Embodiments

In the above-described preferred embodiments, it is assumed that a pixel interpolation process is achieved by performing an operation of real numbers in some parts. However, a pixel interpolation process can be achieved also by performing an operation of integers. Also, gain adjustment or a clipping process may be additionally performed as needed, in order to impose restriction in a case where a predetermined number of bits are used, or to accomplish processes within a predetermined dynamic range, in a pixel interpolation process.

Further, a part or a whole of each of the processes according to the above-described preferred embodiments may be implemented as an integrated circuit (LSI, a system LSI, or the like, for example).

A part or a whole of processes of each of functional blocks according to the above-described preferred embodiments may be implemented by programs. Then, a part or a whole of processes of each of functional blocks according to the above-described preferred embodiments is carried out by a central processing unit (CPU) in a computer. Also, respective programs for carrying out the processes are stored in a memory such as a hard disk or a ROM, and are carried out after being read out a RAM.

Also, each of the processes according to the above-described preferred embodiments may be implemented by hardware or software (including a case where each of the processes is implemented by an operating system (OS) or middleware, or implemented together with a predetermined library). Further, each of the processes may be implemented by mixed processing of software and hardware. Additionally, it is needless to say that adjustment of timing for carrying out each of the processes is necessary in a case where the image capture apparatus according to the above-described preferred embodiments is implemented by hardware. In the above-description of the preferred embodiments, details of adjustment of timing for various signals which are to be generated in actual design of hardware are omitted for the sake of convenience in description.

A sequence in which the processes are carried out in the above-described preferred embodiments is not necessarily limited to that described in the above-described preferred embodiments, and the sequence may be changed unless it goes out of a scope of the subject matter of the present invention.

A computer program which causes a computer to carry out the above-described processes and a computer-readable storage medium in which the computer program is stored are within the scope of the present invention. Examples of the computer-readable storage medium are a flexible disk, a hard disk, a CD-ROM, an MO, a DVD, a DVD-ROM, a DVD-RAM, a large capacity DVD, a next generation DVD, and a semiconductor memory.

However, a computer program is not limited to that stored in the above-cited storage media. A computer program transmitted via an electrical communication wire, a wireless or wired channel, or a network, notably, Internet, can be employed.

The term "unit" may be a concept that includes "circuitry". The circuitry may be embodied wholly or in part as software, hardware, or any combination thereof.

While the invention has been shown and described in detail, the foregoing description is in all aspects illustrative and not restrictive. It is therefore understood that numerous modifications and variations can be devised without departing from the scope of the invention.

What is claimed is:

1. A pixel interpolation apparatus for carrying out a pixel interpolation process on an image signal which is obtained by an image capture unit including color filters of a first color filter, a second color filter, and a third color filter in three different colors which are arranged in a predetermined pattern, the image signal including a first-color pixel signal obtained via the first color filter, a second-color pixel signal obtained via the second color filter, and a third-color pixel signal obtained via the third color filter, the pixel interpolation apparatus comprising:

a signal correction unit configured to correct a signal level of each of the first-color pixel signal, the second-color pixel signal, and the third-color pixel signal, in accordance with its corresponding color filter, and to output an image signal including the first-, second-, and third-color pixel signals which are corrected, as a first image signal;

a saturation evaluation value calculation unit configured to evaluate saturation of a predetermined image area in an image formed of the first image signal, based on the first image signal output from the signal correction unit, and to obtain a saturation evaluation value of the predetermined image area;

a gray correlation value calculation unit configured to obtain correlation degrees of a plurality of pairs of two directions which are perpendicular to each other on the image formed of the first image signal, using data of those pixels that are located in an image area including and surrounding an observed pixel which is being processed, as a gray correlation degree;

a color correlation value calculation unit configured to obtain correlation degrees of a plurality of pairs of two directions which are perpendicular to each other on the image formed of the image signal including the first-, second-, and third-color pixel signals, using data of those pixels that are located in an image area including and surrounding the observed pixel and are of the same color, as a color correlation degree;

a pixel interpolation method determination unit configured to determine a pixel interpolation method for the observed pixel, based on the saturation evaluation value obtained by the saturation evaluation value calculation unit, the gray correlation degree obtained by the gray correlation value calculation unit, and the color correlation degree obtained by the color correlation value calculation unit;

an interpolation unit configured to carry out a pixel interpolation process on the observed pixel by the pixel interpolation method determined by the pixel interpolation method determination unit, to obtain a second image signal which is a signal provided after the pixel interpolation process; and a correction unit configured to perform color space conversion on the second image signal obtained by the interpolation unit in accordance with an arrangement pattern of the color filters, to obtain a predetermined output image signal.

2. The pixel interpolation apparatus according to claim 1, wherein
the interpolation unit includes:
a color-image interpolation unit configured to carry out a color-image pixel interpolation process on the image formed of the image signal including the first-, second-, and third-color pixel signals when the pixel interpolation method determination unit determines to carry out a pixel interpolation process by a color-image pixel interpolation method;
a gray-image interpolation unit configured to carry out a gray-image pixel interpolation process on the image formed of the first image signal output from the signal correction unit when the pixel interpolation method determination unit determines to carry out a pixel interpolation process by a gray-image pixel interpolation method;
a signal reverse correction unit configured to perform reverse correction of signal level, on the image signal on which the gray-image interpolation unit carries out the gray-image pixel interpolation process, such that a signal level which is corrected by the signal correction unit is almost equal to a signal level provided before being corrected; and
a selector unit configured to obtain an image signal which is processed by the color-image interpolation unit as the second image signal when the pixel interpolation method determination unit determines to carry out a pixel interpolation process by the color-image pixel interpolation method, while to obtain an image signal which is processed by the signal reverse correction unit as the second image signal when the pixel interpolation method determination unit determines to carry out a pixel interpolation process by the gray-image pixel interpolation method, and to output the obtained second image signal to the correction unit.

3. The pixel interpolation apparatus according to claim 1, wherein
the correction unit includes:
a first matrix transformation unit configured to perform color space conversion on the second image signal obtained by the interpolation unit in accordance with an arrangement pattern of the color filters, to obtain an image signal in an RGB color space;
a color-space processing unit configured to convert the image signal in an RGB color space which is obtained by the first matrix transformation unit, into an image signal in a YCbCr color space;
a saturation obtaining unit configured to obtain a saturation signal from the image signal in an RGB color space which is obtained by the first matrix transformation unit;
a color difference correction unit configured to carry out a correction process on a Cb-color component signal and a Cr-color component signal in the image signal in a YCbCr color space which is obtained by the color-space processing unit, based on the saturation signal obtained by the saturation obtaining unit; and
a second matrix transformation unit configured to perform color space conversion on a Y component signal in the image signal in a YCbCr color space which is obtained by the color-space processing unit and on the Cb- and Cr-color component signals which are corrected by the color difference correction unit, to obtain an image signal in an RGB color space.

4. The pixel interpolation apparatus according to claim 1, further comprising
a border detection unit configured to detect a border between a color-image area and a gray-image area on the image formed of the image signal including the first-, second-, and third-color pixel signals, wherein
when the border between the color-image area and the gray-image area which is detected by the border detection unit is included in an image area for gray correlation degree calculation, the gray correlation value calculation unit assigns greater weights upon pixels which are provided on a line parallel to a correlation direction in which the gray correlation degree calculation is to be performed and are included in a central area of the image area for the gray correlation degree calculation, to obtain the gray correlation degree while enhancing effectiveness of the pixels in the gray correlation degree calculation.

5. The pixel interpolation apparatus according to claim 1, wherein
the gray correlation value calculation unit obtains correlation degrees in a horizontal direction and a vertical direction and correlation degrees in a first diagonal direction and a second diagonal direction which is perpendicular to the first diagonal direction, on the image formed of the first image signal, and the color correlation value calculation unit obtains correlation degrees in a horizontal direction and a vertical direction and correlation degrees in a first diagonal direction and a second diagonal direction which is perpendicular to the first diagonal direction, on the image formed of the image signal including the first-, second-, and third-color pixel signals.

6. The pixel interpolation apparatus according to claim 1, wherein the saturation evaluation value calculation unit evaluates saturation of an image area of five pixels by five pixels which centers on the observed pixel, to obtain a saturation evaluation value of the image area, the gray correlation value calculation unit obtains the gray correlation degree in an image area of five pixels by five pixels which centers on the observed pixel, and the color correlation value calculation unit obtains the color correlation degree in an image area of five pixels by five pixels which centers on the observed pixel.

7. The pixel interpolation apparatus according to claim 6, wherein the saturation evaluation value calculation unit carries out a process expressed by an equation of:

$$\begin{pmatrix} \text{color\_diff0} \\ \text{color\_diff1} \end{pmatrix} = \begin{pmatrix} k01 & k02 & k03 \\ k11 & k12 & k12 \end{pmatrix} \begin{pmatrix} \text{p00\_color1} \\ \text{p01\_color2} \\ \text{p10\_color3} \end{pmatrix} + \begin{pmatrix} \text{offset0} \\ \text{offset1} \end{pmatrix}$$

where an average of pixel values of first-color component pixels included in the image area of three pixels by three pixels which centers on the observed pixel is "p00_color1", an average of pixel values of second-color component pixels included in the image area of three pixels by three pixels which centers on the observed pixel is "p01_color2", an average of pixel values of third-color component pixels included in the image area of three pixels by three pixels which centers on the observed pixel is "p10_color3", coefficients for obtaining a predetermined color difference value are "k01", "k02", "k03", "k11", "k12", and "k13", and offset values are "offset0" and "offset1", to thereby obtain two color difference values color_diff0 and color_diff1, the saturation evaluation value calculation unit carries out a process expressed by an equation of "diff_ave_color=abs(color_diff0)+abs(color_diff1) where "abs(x)" is a function for obtaining an absolute value of "x", to thereby obtain an average color component difference evaluation value diff_ave_color, and the saturation evaluation value calculation unit obtains the saturation evaluation value of the image area using the obtained average color component difference evaluation value diff_ave_color.

8. The pixel interpolation apparatus according to claim 7, wherein the saturation evaluation value calculation unit
the saturation evaluation value calculation unit (1) selects a plurality of pairs of pixels which are vertically adjacent to each other in the image area of three pixels by three pixels which centers on the observed pixel, calculates a difference in pixel value between each of the selected pairs of pixels, and obtains a vertical evaluation value v_color based on the calculated difference in pixel value between each of the selected pairs of pixels, the saturation evaluation value calculation unit (2) selects a plurality of pairs of pixels which are horizontally adjacent to each other in the image area of three pixels by three pixels which centers on the observed pixel, calculates a difference in pixel value between each of the selected pairs of pixels, and obtains a horizontal evaluation value h_color based on the calculated difference in pixel value between each of the selected pairs of pixels, the saturation evaluation value calculation unit obtains the saturation evaluation value of the image area, based on at least one of the average color difference evaluation value diff_ave_color, the vertical evaluation value v_color, and the horizontal evaluation value h_color.

9. The pixel interpolation apparatus according to claim 3, wherein the first-color pixel signal is a white pixel signal, and
the color space processing unit includes:
a brightness signal obtaining unit configured to obtain a brightness signal from the image signal in an RGB color space; and
a brightness signal output unit configured to select, when a direction where there is strong correlation is determined based on the correlation degrees, a signal used as a Y component signal of the image signal in a YCbCr color space, from the brightness signal obtained by the brightness signal obtaining unit and the white pixel signal included in the second image signal, based on the direction where there is strong correlation and a type of a color filter provided in a position of the observed pixel.

10. The pixel interpolation apparatus according to claim 1, wherein the predetermined pattern is a pattern in which two first-color filters, one second-color filter, and one third-color filter are arranged in an area of two pixels by two pixels, and the two first-color filters are filters for a white component and are arranged diagonally relative to each other in the area of two pixels by two pixels.

11. An image capture apparatus comprising:
an image capture unit including color filters in three different colors which are arranged in a predetermined pattern, the image capture unit being configured to capture an image signal from light of a subject; and
the pixel interpolation apparatus recited in claim 1, for carrying out a pixel interpolation process on the image signal.

12. A pixel interpolation method for carrying out a pixel interpolation process on an image signal which is obtained by an image capture unit including color filters of a first color filter, a second color filter, and a third color filter in three different colors which are arranged in a predetermined pattern, the image signal including a first-color pixel signal obtained via the first color filter, a second-color pixel signal obtained via the second color filter, and a third-color pixel signal obtained via the third color filter, the pixel interpolation method comprising:

correcting a signal level of each of the first-color pixel signal, the second-color pixel signal, and the third-color pixel signal, in accordance with its corresponding color filter, and outputting an image signal including the first-, second-, and third-color pixel signals which are corrected, as a first image signal;

evaluating saturation of a predetermined image area in an image formed of the first image signal, based on the output first image signal, and obtaining a saturation evaluation value of the predetermined image area;

obtaining correlation degrees of a plurality of pairs of two directions which are perpendicular to each other on the image formed of the first image signal, using data of those pixels that are located in an image area including and surrounding an observed pixel which is being processed, as a gray correlation degree;

obtaining correlation degrees of a plurality of pairs of two directions which are perpendicular to each other on the image formed of the image signal including the first-, second-, and third-color pixel signals, using data of those pixels that are located in an image area including and surrounding the observed pixel and are of the same color, as a color correlation degree;

determining a pixel interpolation method for the observed pixel, based on the obtained saturation evaluation value, the obtained gray correlation degree, and the obtained color correlation degree;

carrying out a pixel interpolation process on the observed pixel by the determined pixel interpolation method, to obtain a second image signal which is a signal provided after the pixel interpolation process; and performing color space conversion on the obtained second image signal in accordance with an arrangement pattern of the color filters, to obtain a predetermined output image signal.

13. An integrated circuit for carrying out a pixel interpolation process on an image signal which is obtained by an image capture unit including color filters of a first color filter, a second color filter, and a third color filter in three different colors which are arranged in a predetermined pattern, the image signal including a first-color pixel signal obtained via the first color filter, a second-color pixel signal obtained via the second color filter, and a third-color pixel signal obtained via the third color filter, the integrated circuit comprising:

a signal correction unit configured to correct a signal level of each of the first-color pixel signal, the second-color pixel signal, and the third-color pixel signal, in accordance with its corresponding color filter, and to output an image signal including the first-, second-, and third-color pixel signals which are corrected, as a first image signal;

a saturation evaluation value calculation unit configured to evaluate saturation of a predetermined image area in an image formed of the first image signal, based on the first image signal output from the signal correction unit, and to obtain a saturation evaluation value of the predetermined image area;

a gray correlation value calculation unit configured to obtain correlation degrees of a plurality of pairs of two directions which are perpendicular to each other on the image formed of the first image signal, using data of those pixels that are located in an image area including and surrounding an observed pixel which is being processed, as a gray correlation degree;

a color correlation value calculation unit configured to obtain correlation degrees of a plurality of pairs of two directions which are perpendicular to each other on the image formed of the image signal including the first-, second-, and third-color pixel signals, using data of those pixels that are located in an image area including and surrounding the observed pixel and are of the same color, as a color correlation degree;

a pixel interpolation method determination unit configured to determine a pixel interpolation method for the observed pixel, based on the saturation evaluation value obtained by the saturation evaluation value calculation unit, the gray correlation degree obtained by the gray correlation value calculation unit, and the color correlation degree obtained by the color correlation value calculation unit;

an interpolation unit configured to carry out a pixel interpolation process on the observed pixel by the pixel interpolation method determined by the pixel interpolation method determination unit, to obtain a second image signal which is a signal provided after the pixel interpolation process; and a correction unit configured to perform color space conversion on the second image signal obtained by the interpolation unit in accordance with an arrangement pattern of the color filters, to obtain a predetermined output image signal.

* * * * *